March 2, 1954
W. ZECKENDORF ET AL
2,670,859
AUTOMOBILE PARKING SYSTEM
Filed July 1, 1949
36 Sheets-Sheet 12
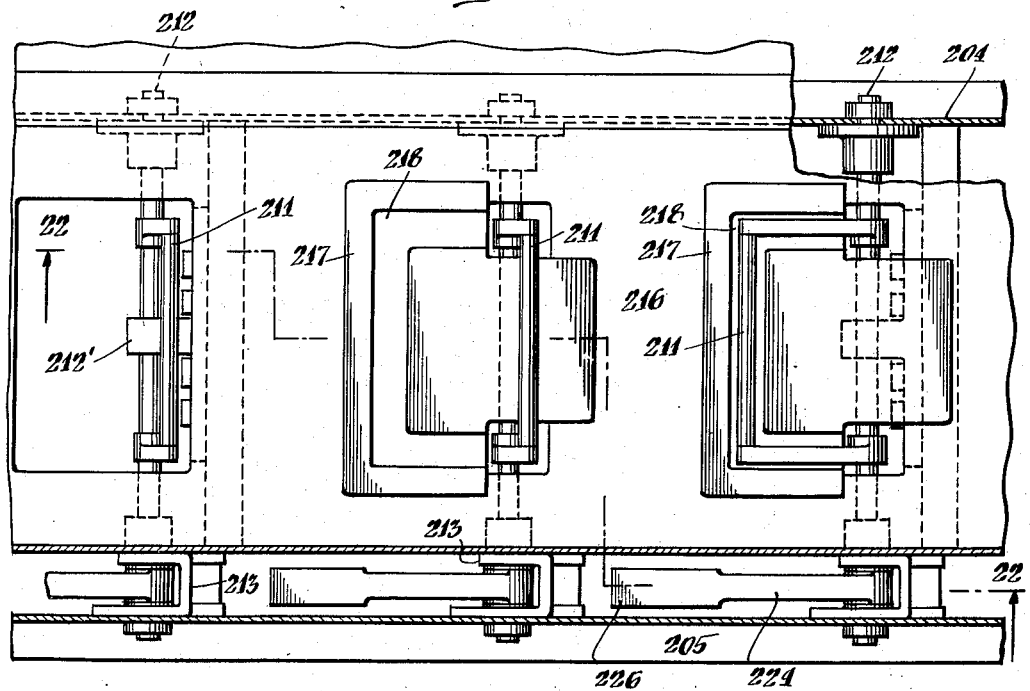
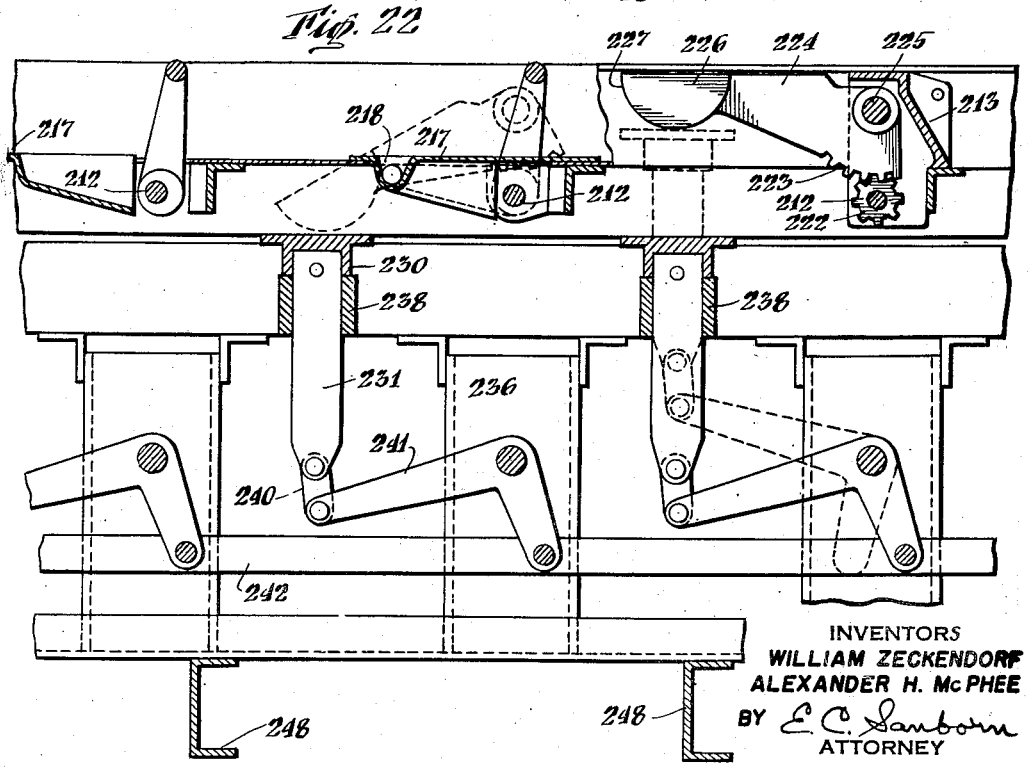
INVENTORS
WILLIAM ZECKENDORF
ALEXANDER H. McPHEE
BY E. C. Sanborn
ATTORNEY

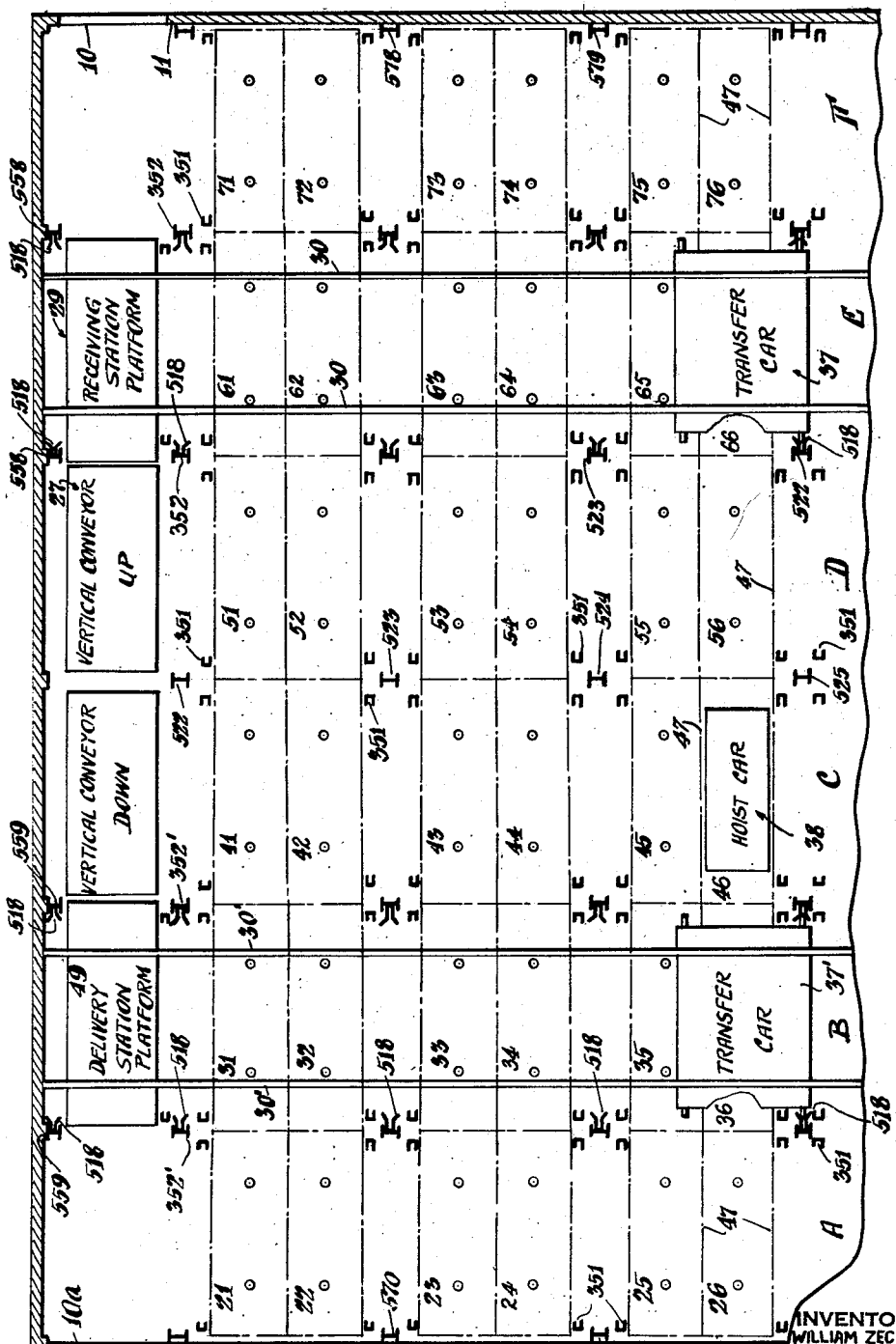

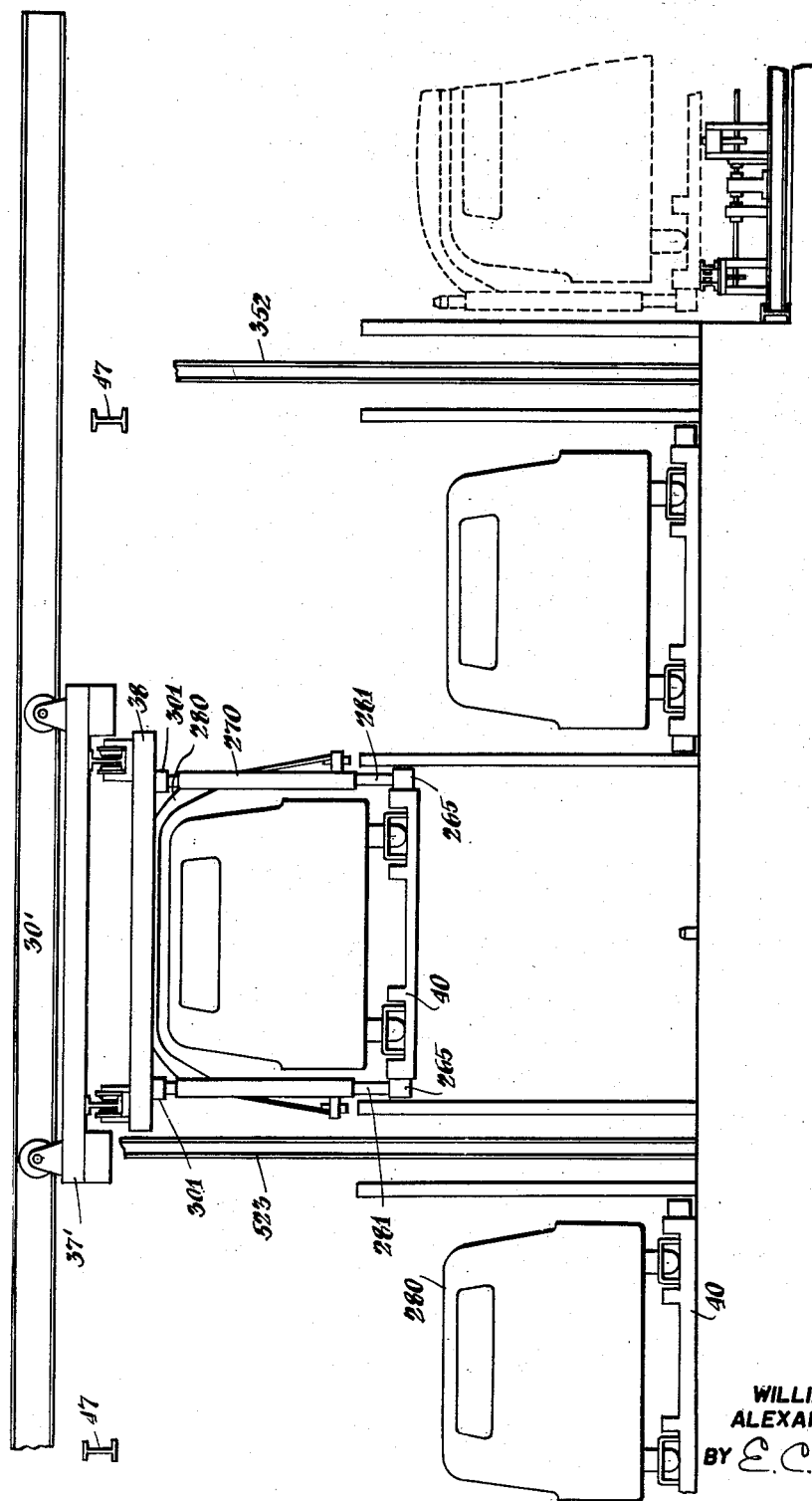

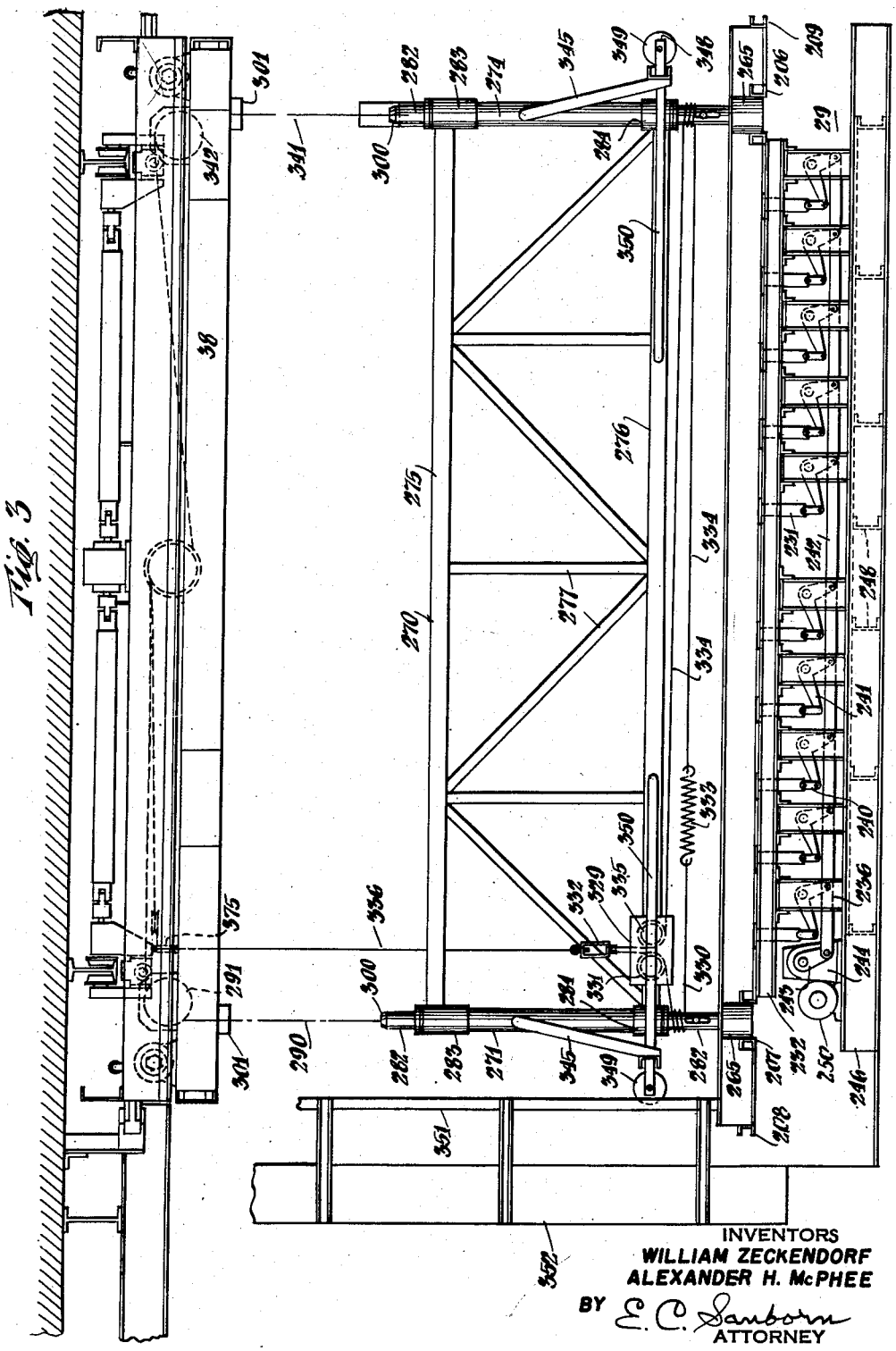

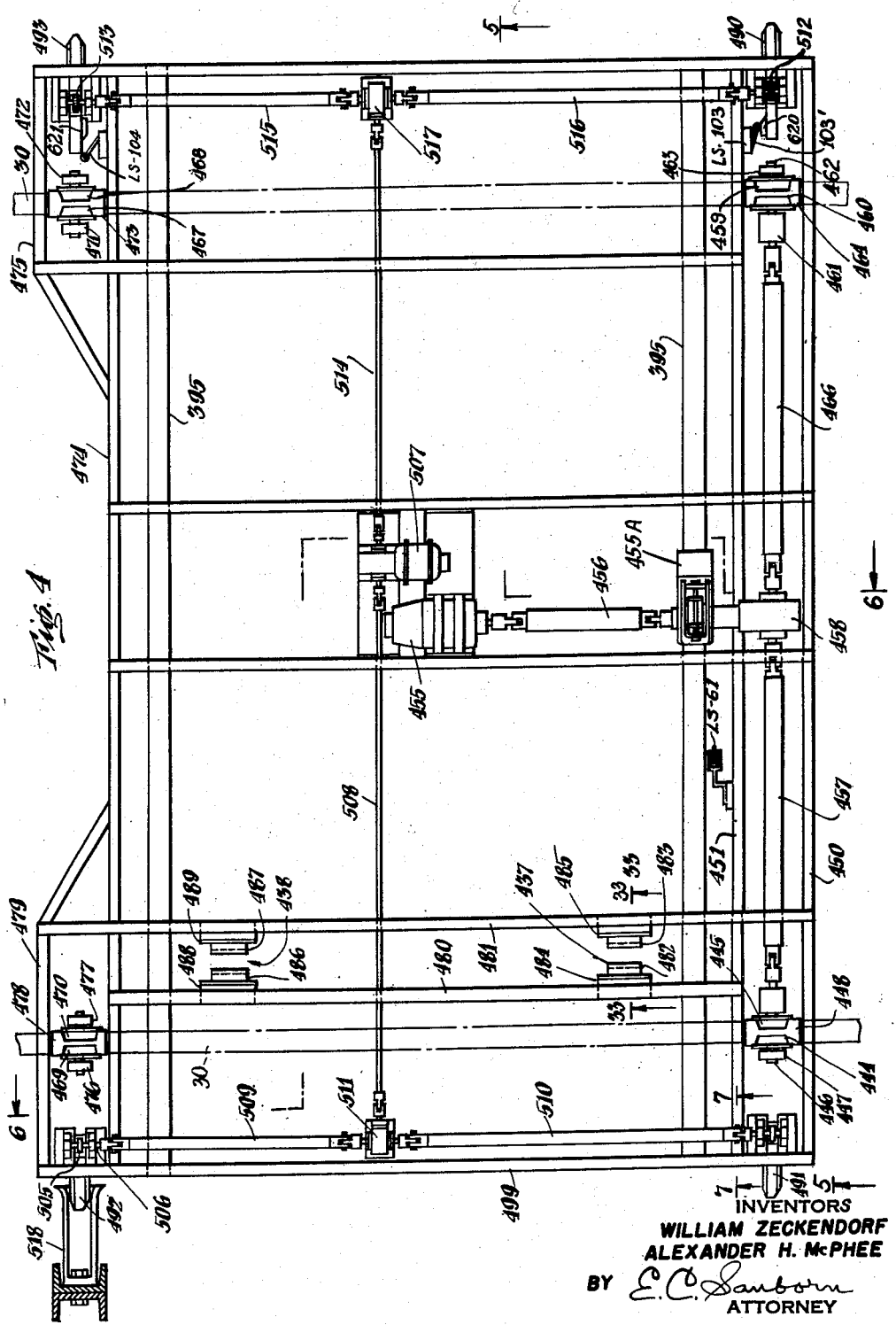

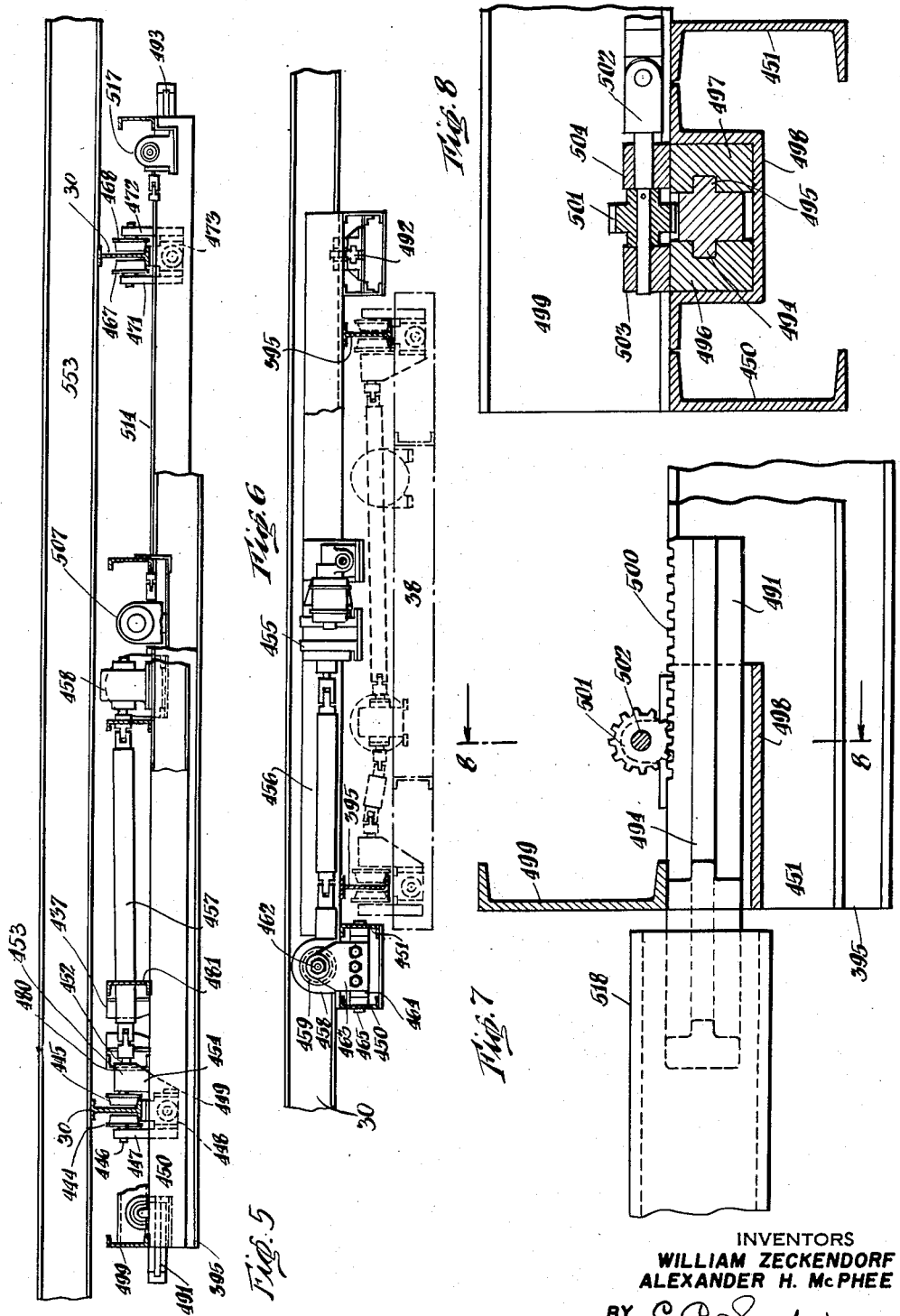

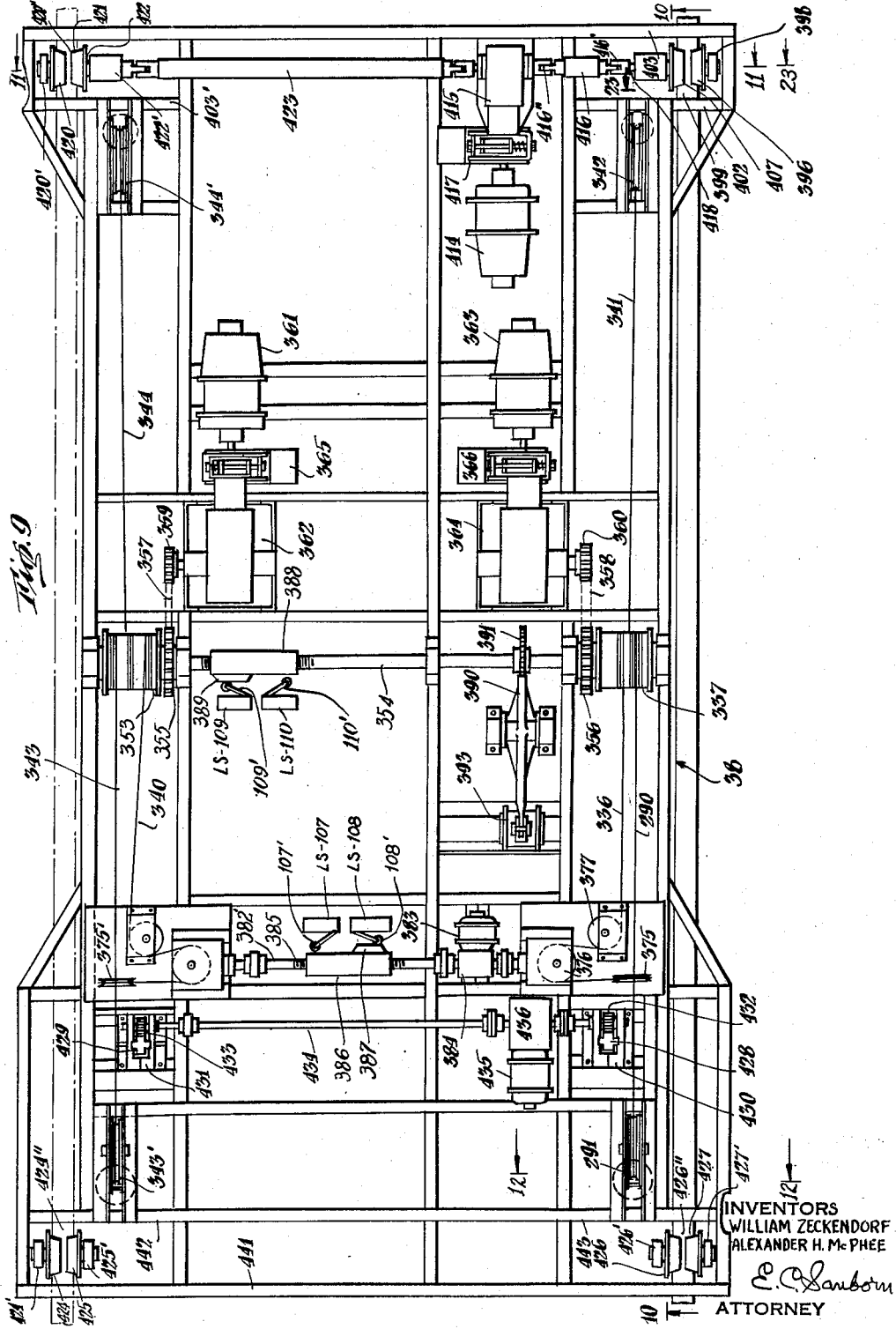

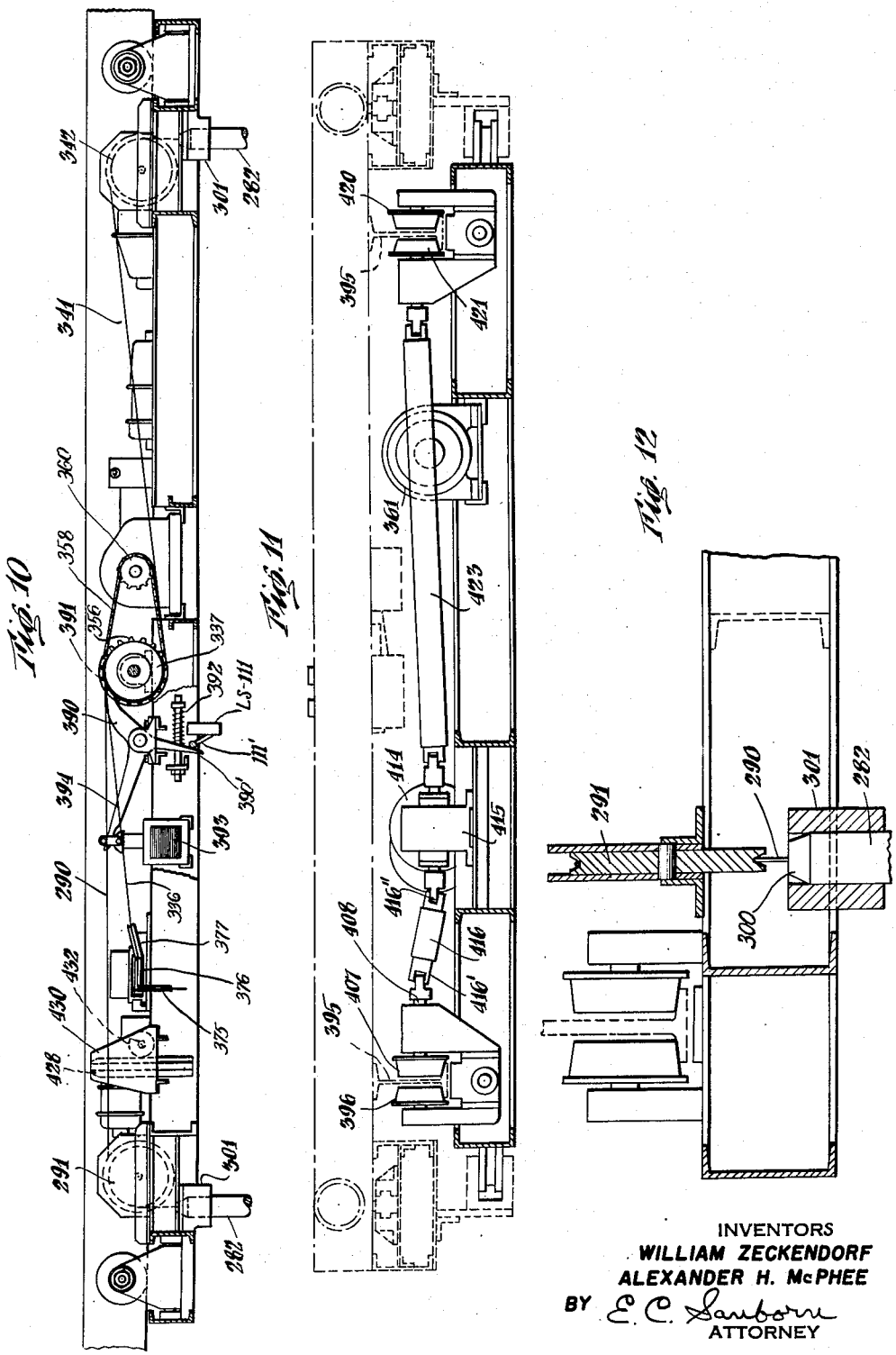

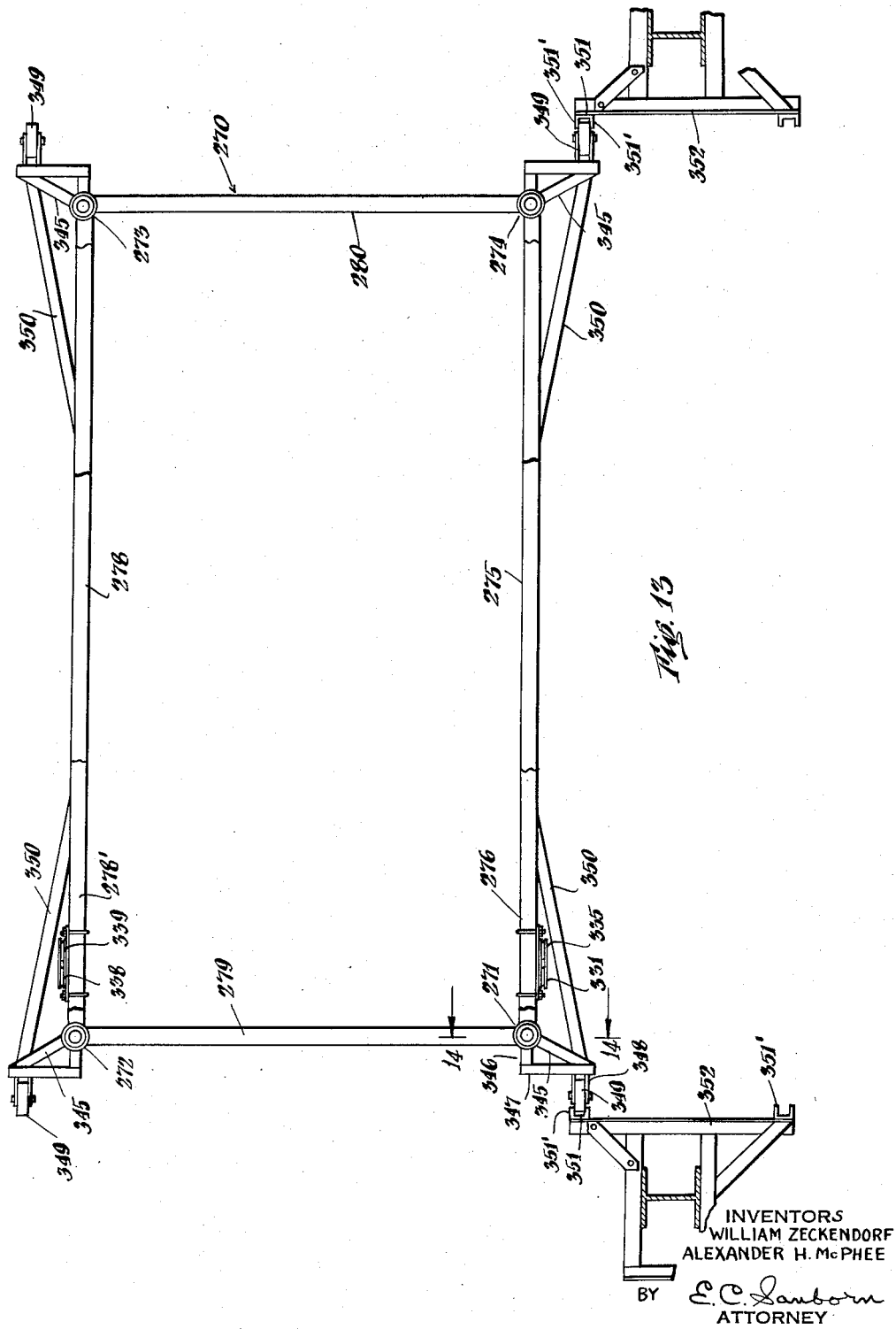

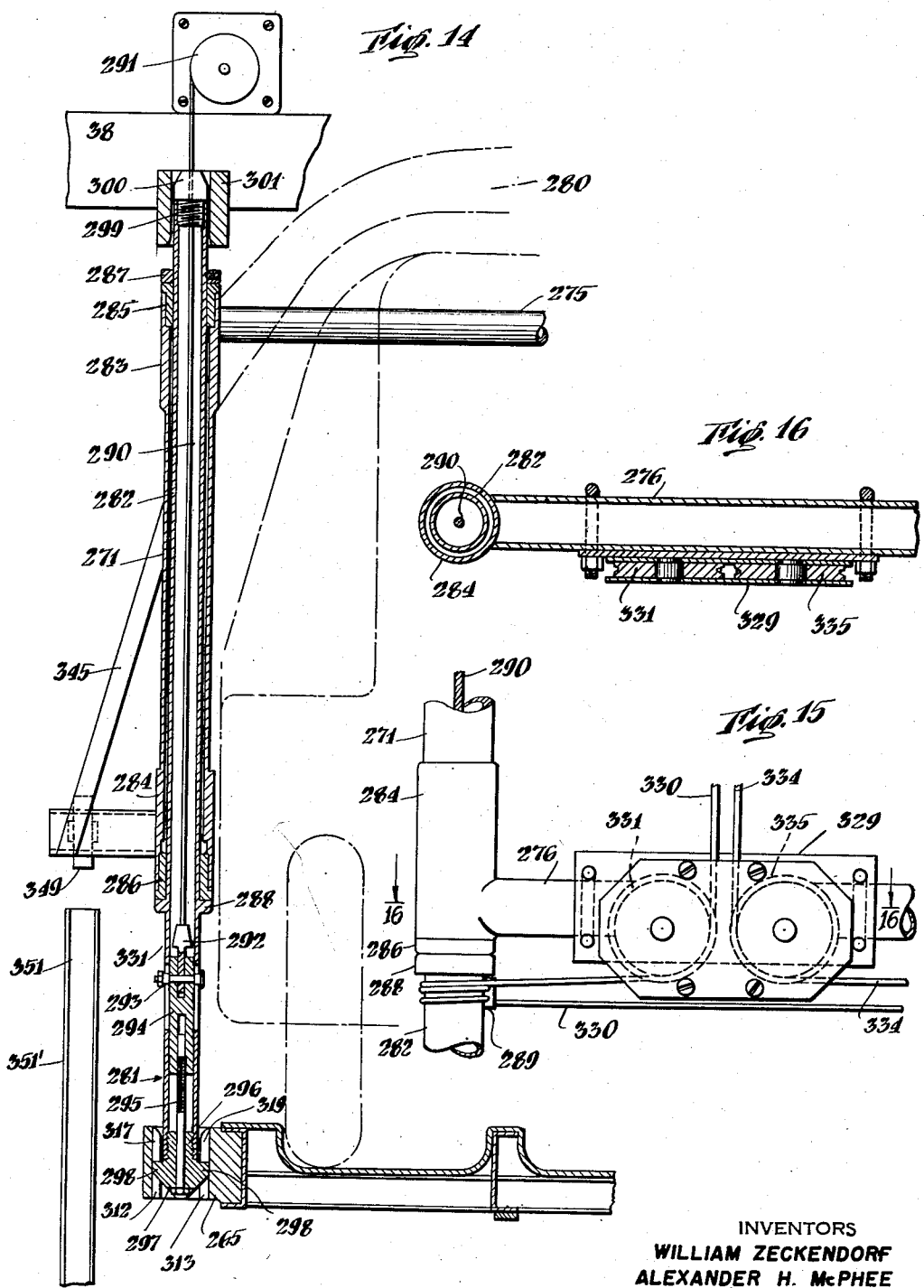

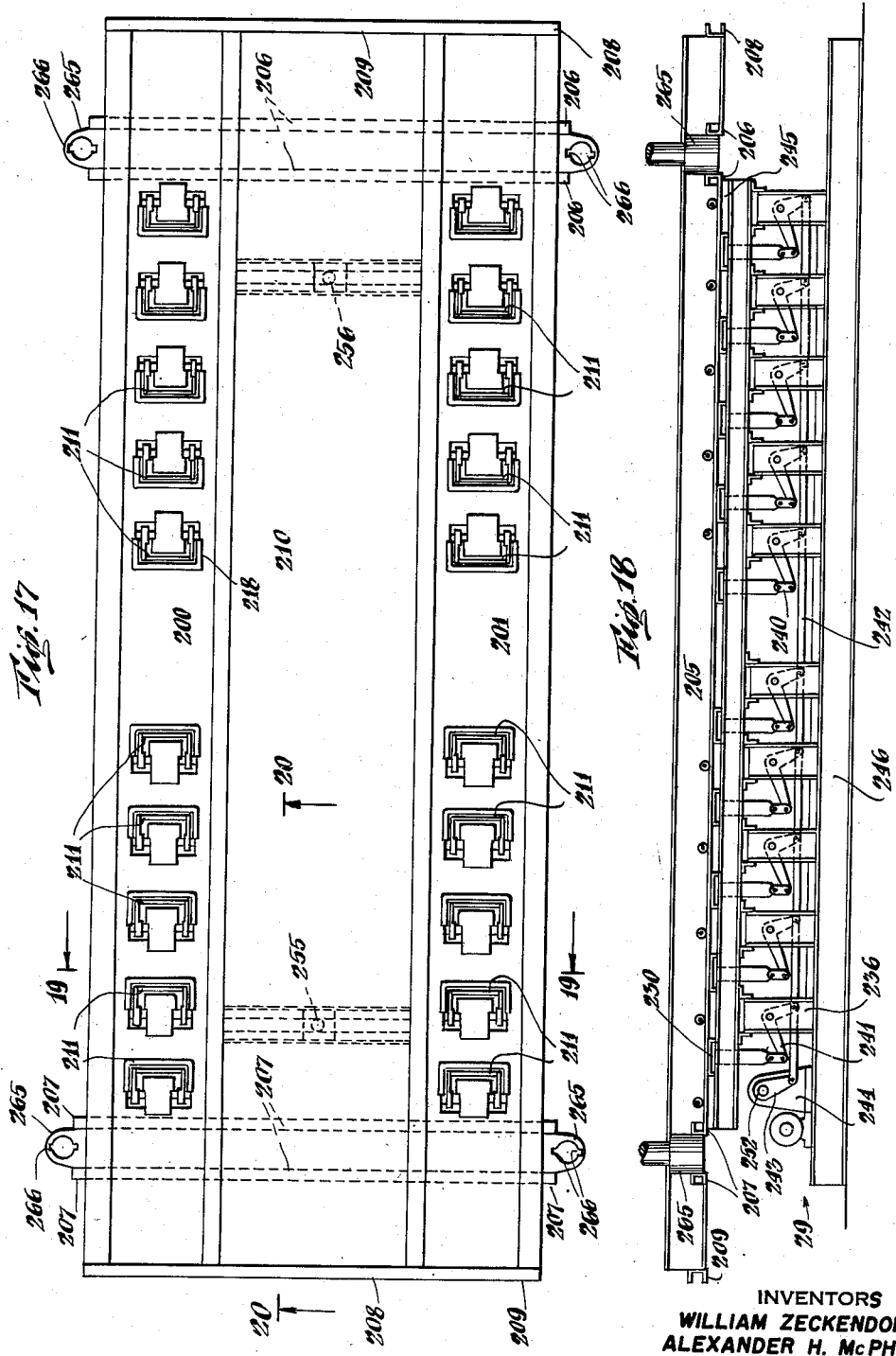

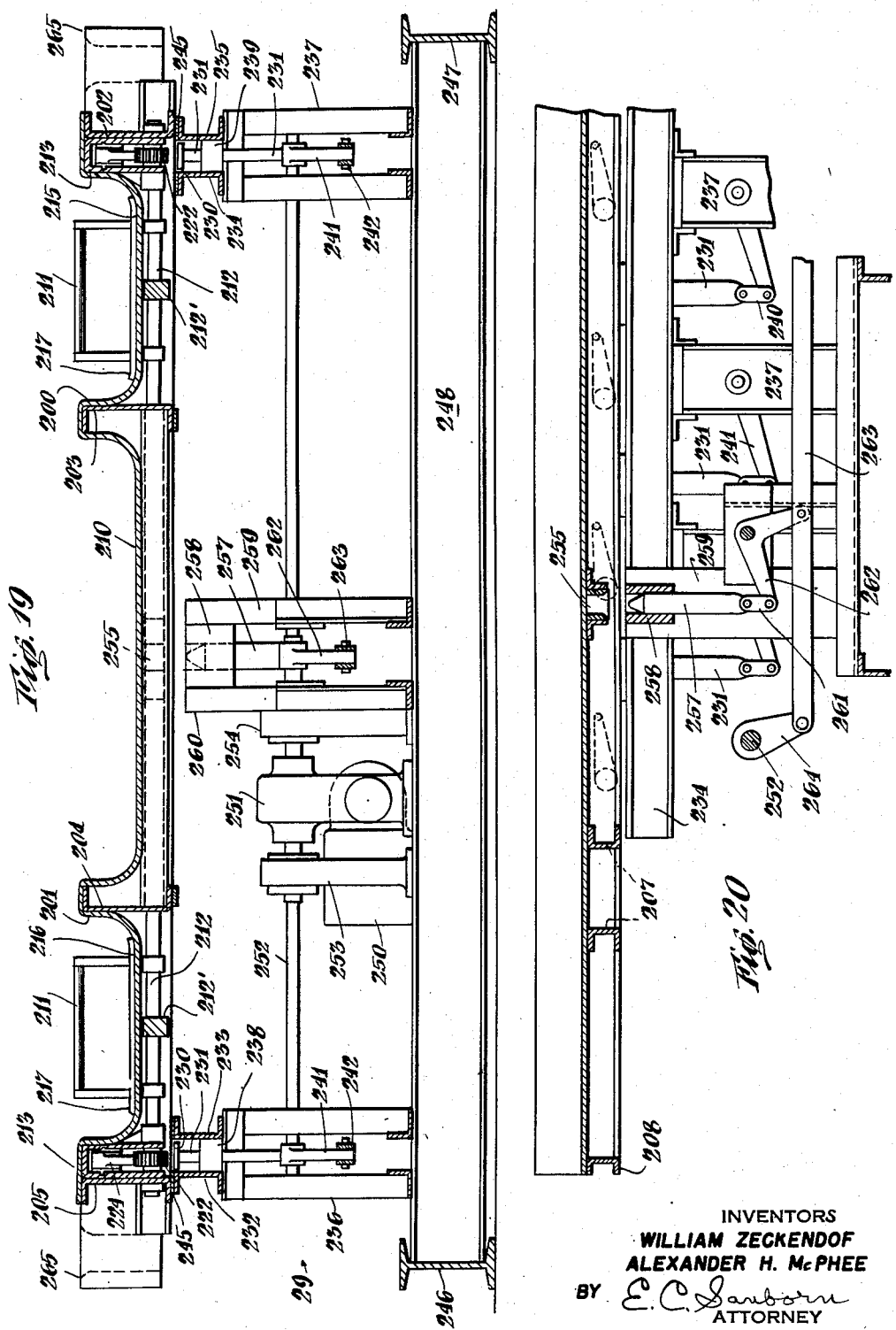

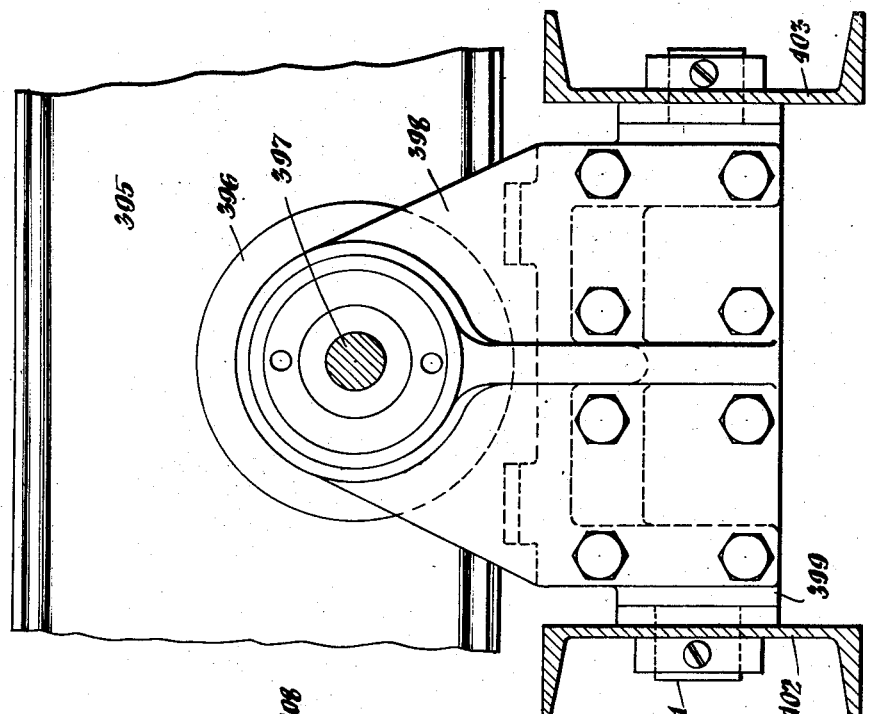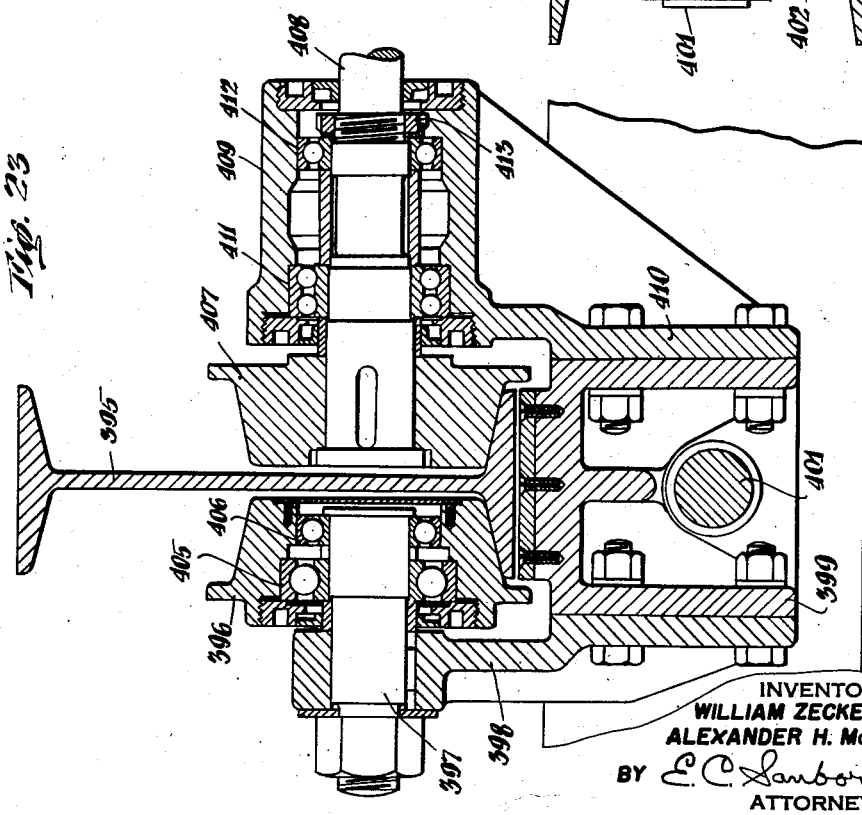

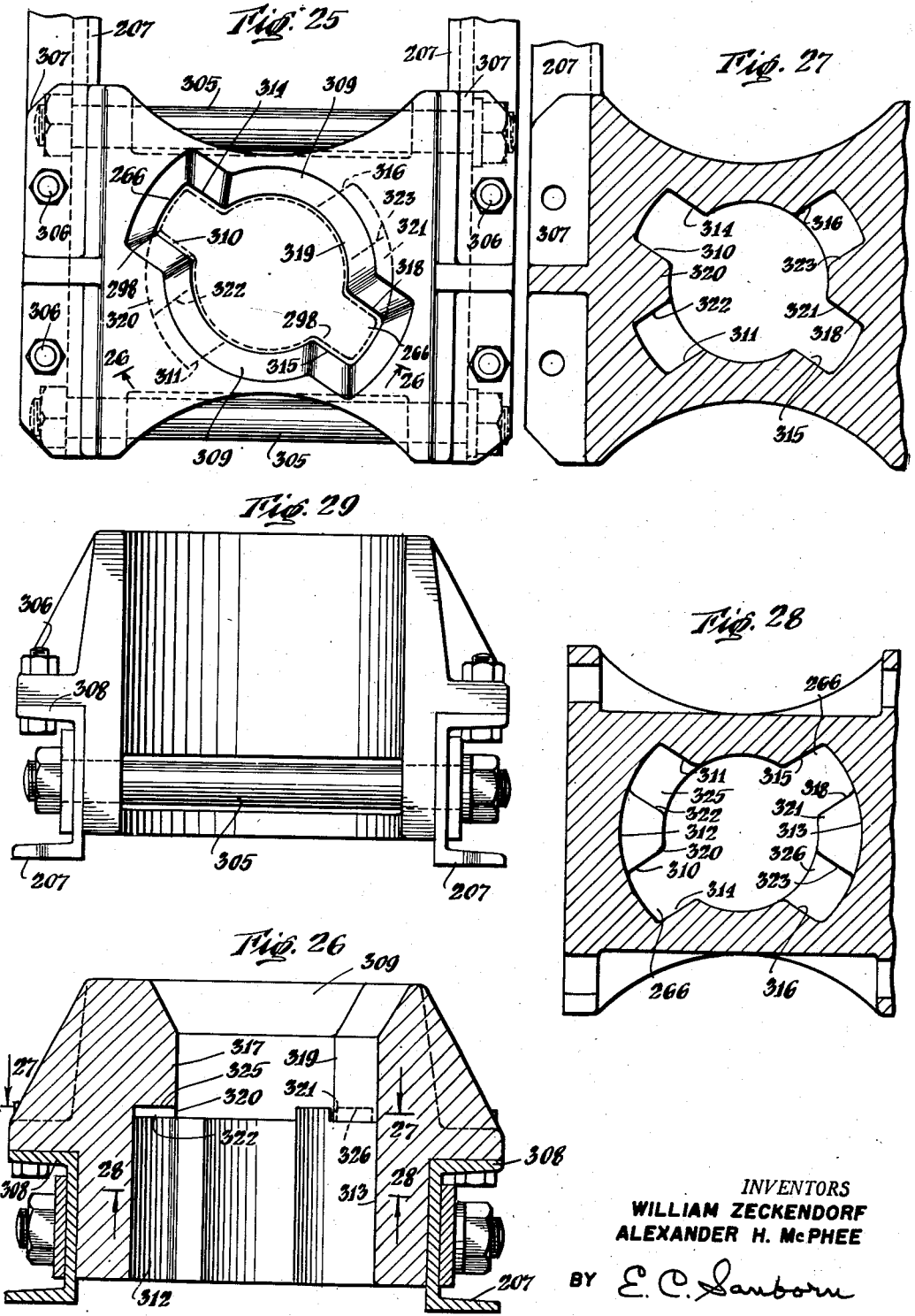

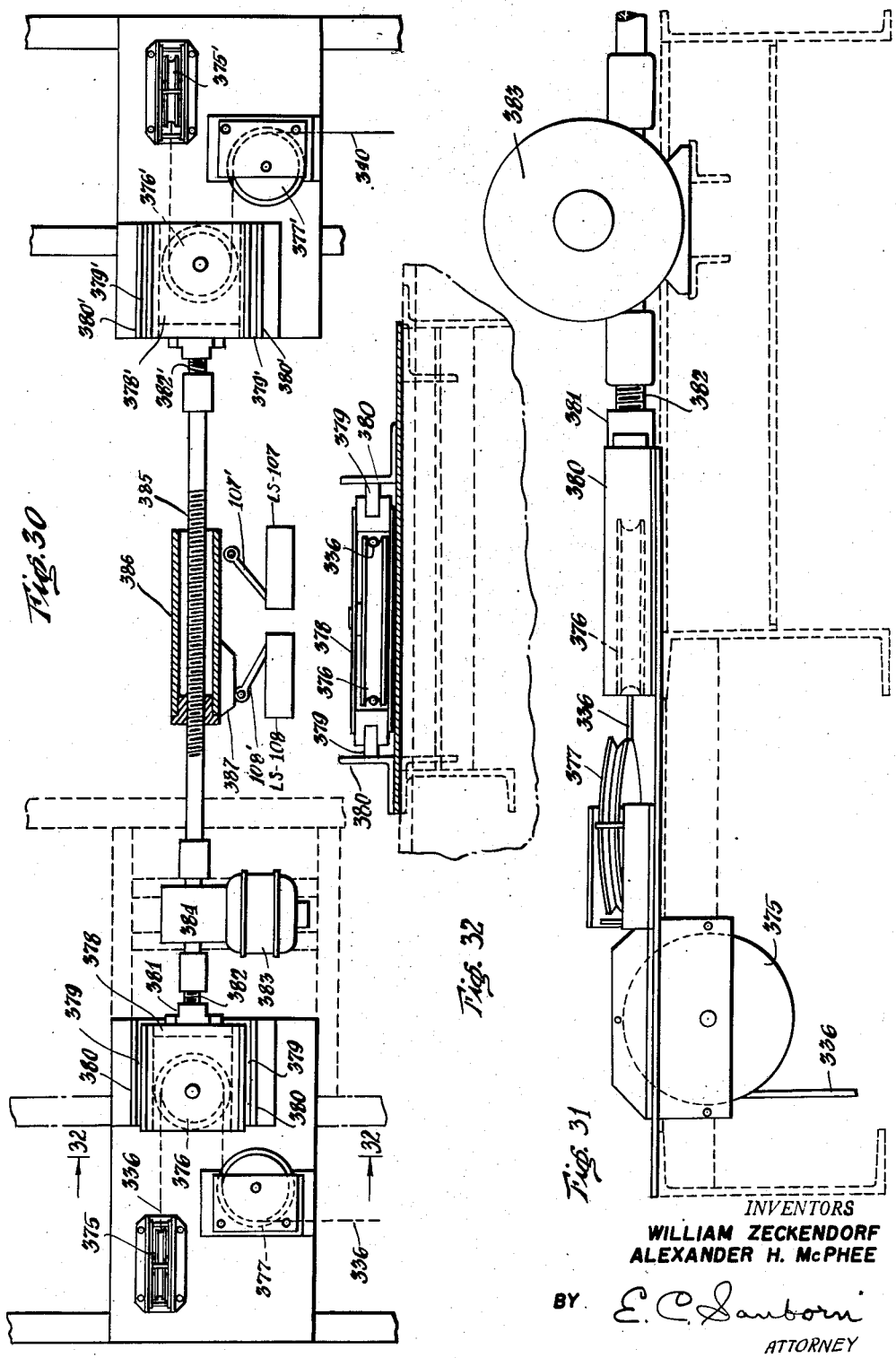

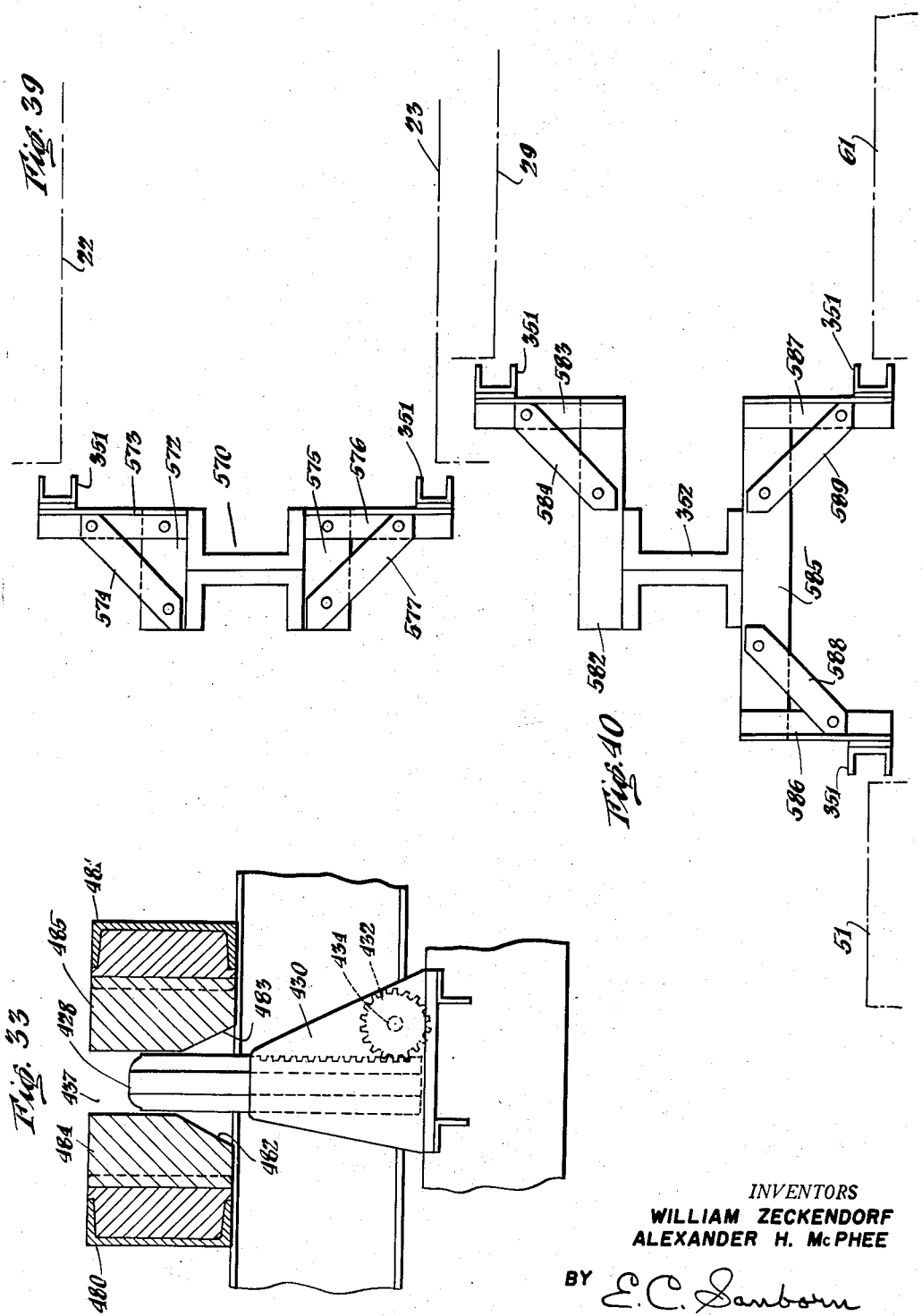

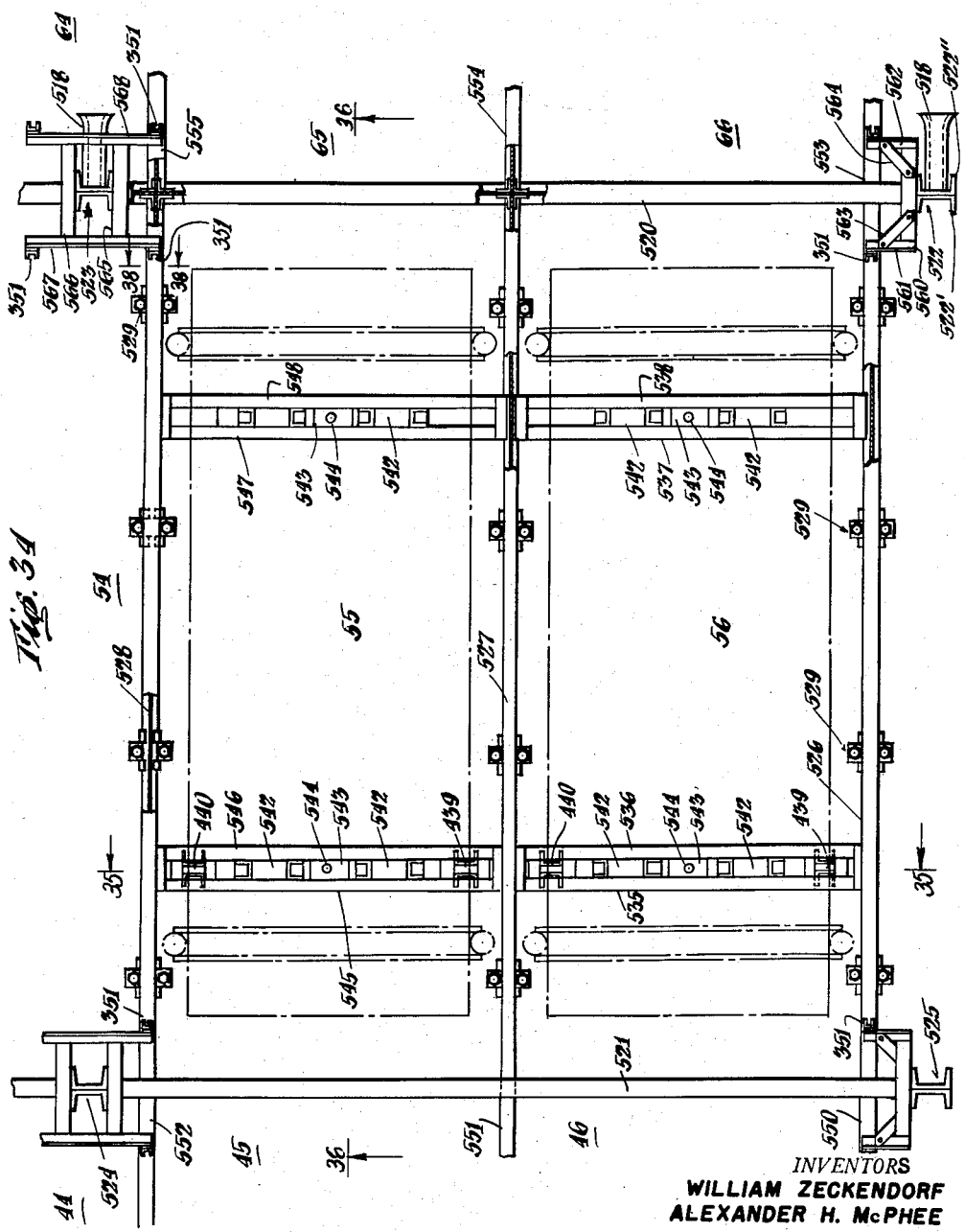

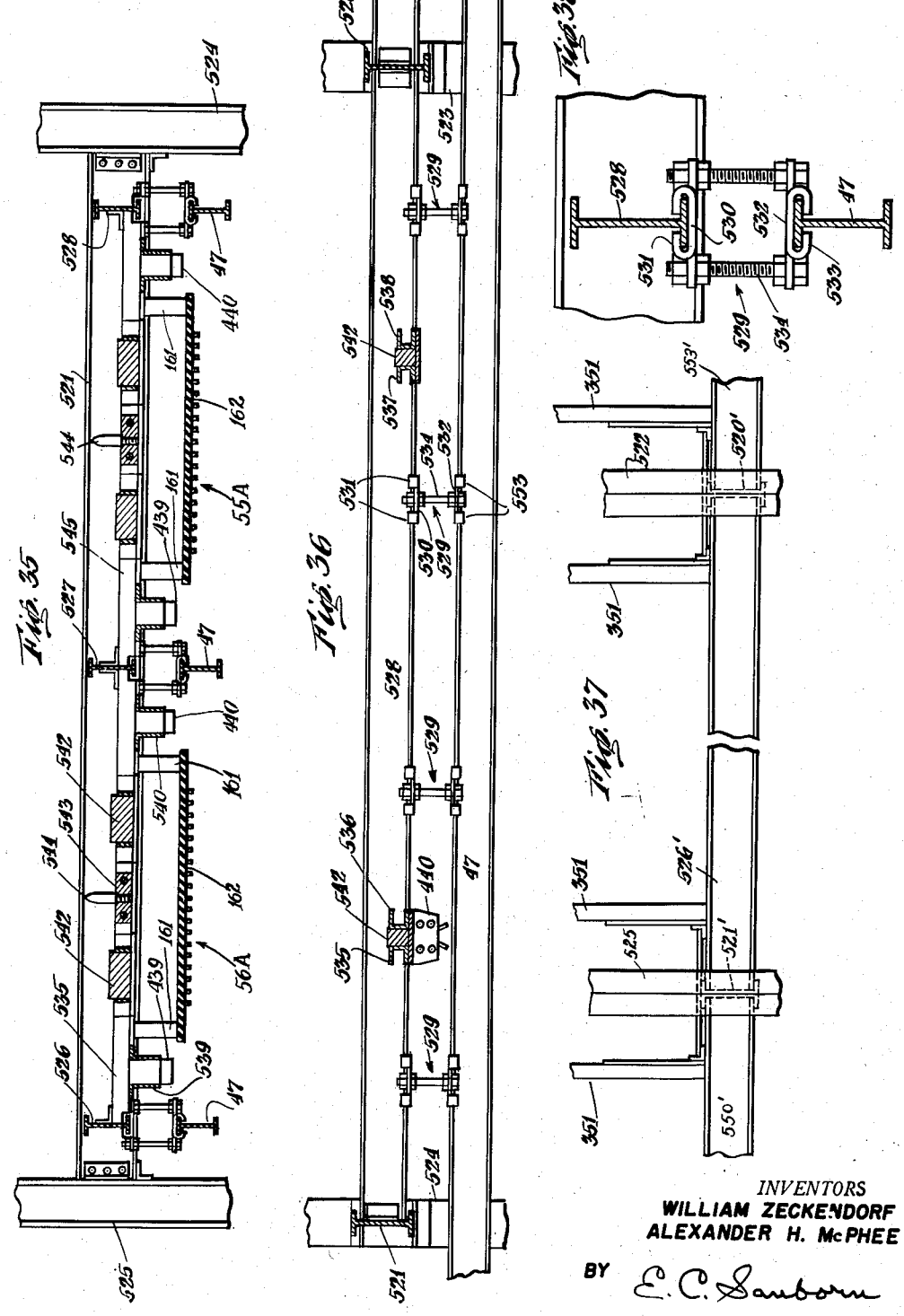

March 2, 1954     W. ZECKENDORF ET AL     2,670,859
AUTOMOBILE PARKING SYSTEM
Filed July 1, 1949     36 Sheets-Sheet 19
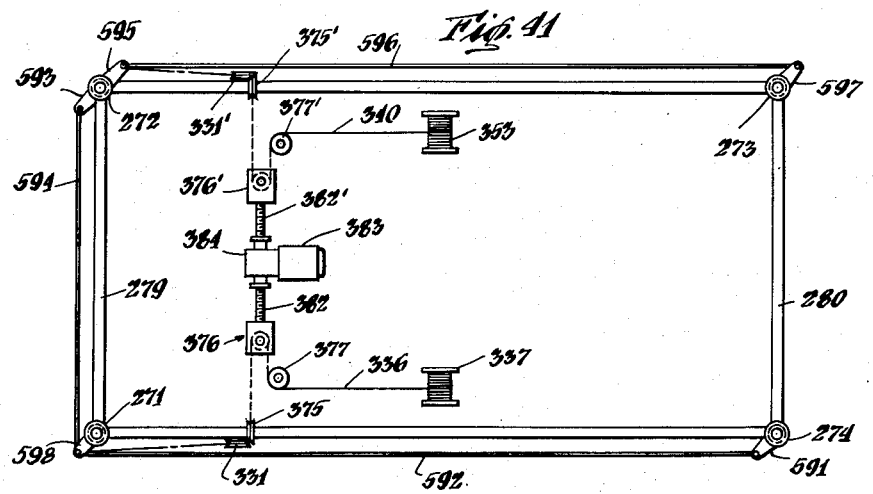
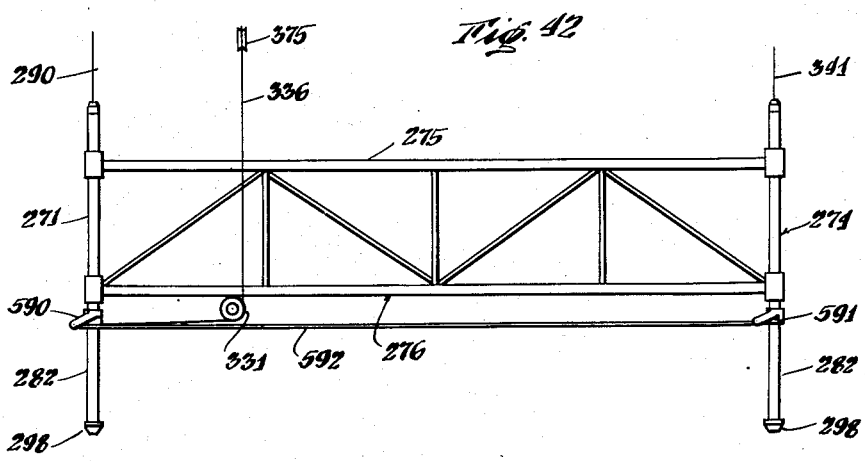
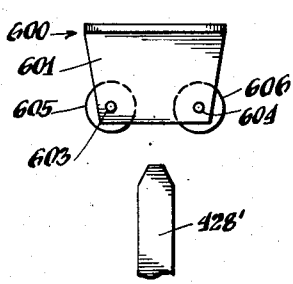
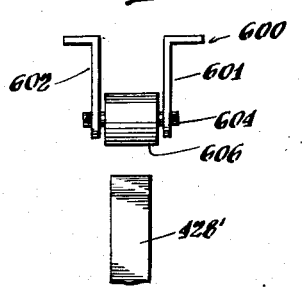
INVENTORS
WILLIAM ZECKENDORF
ALEXANDER H. McPHEE
BY E. C. Sanborn
ATTORNEY

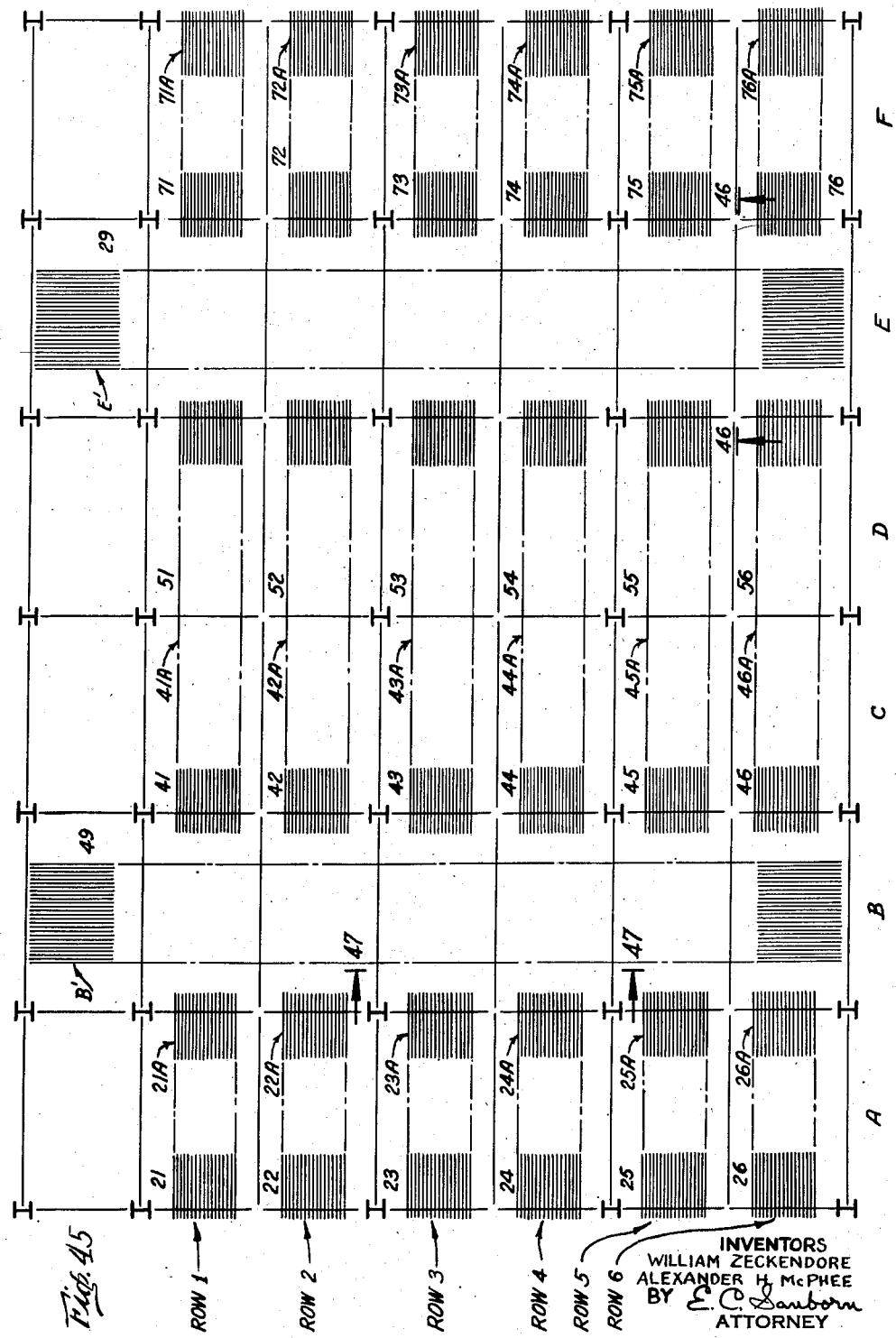

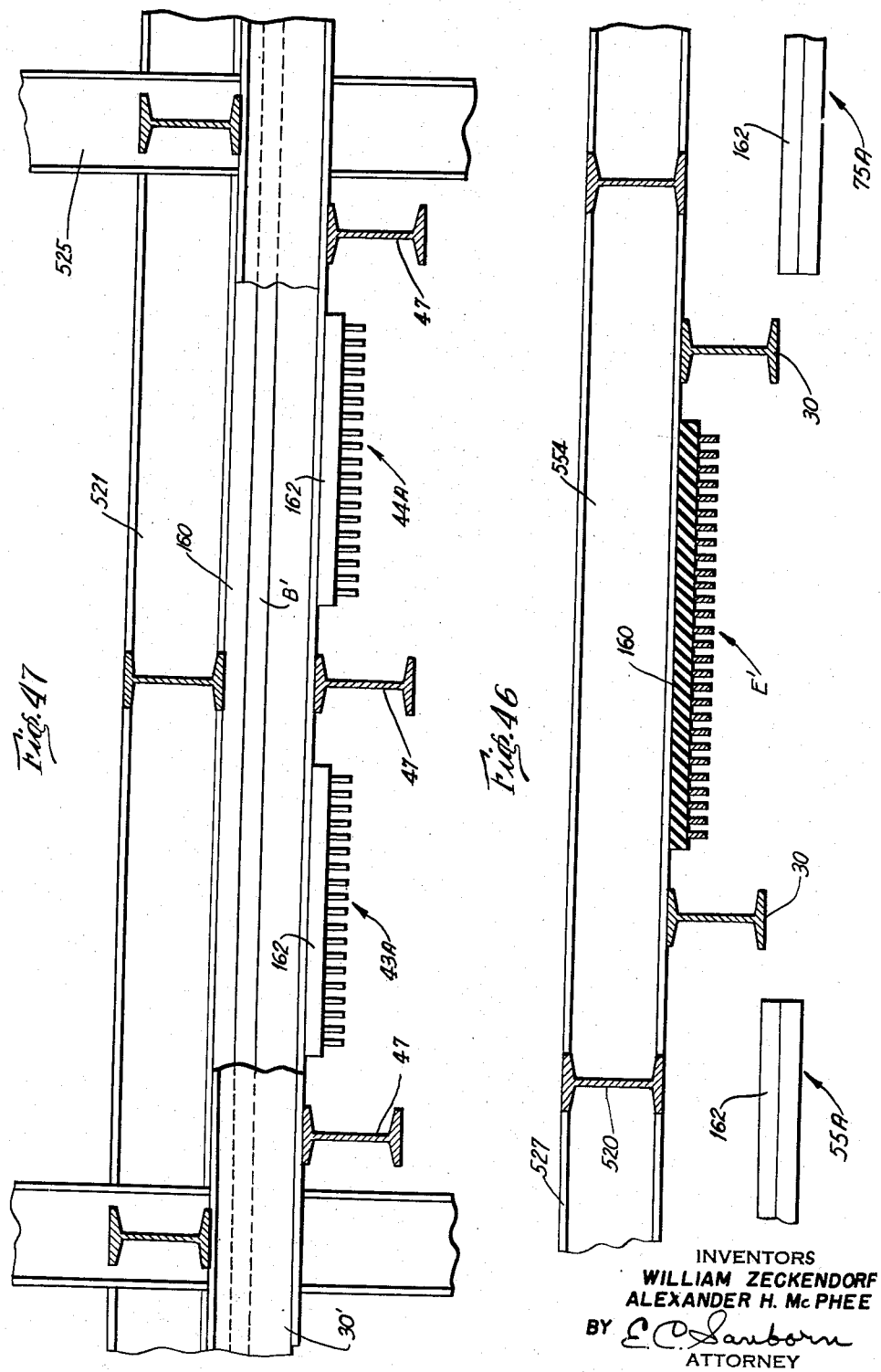

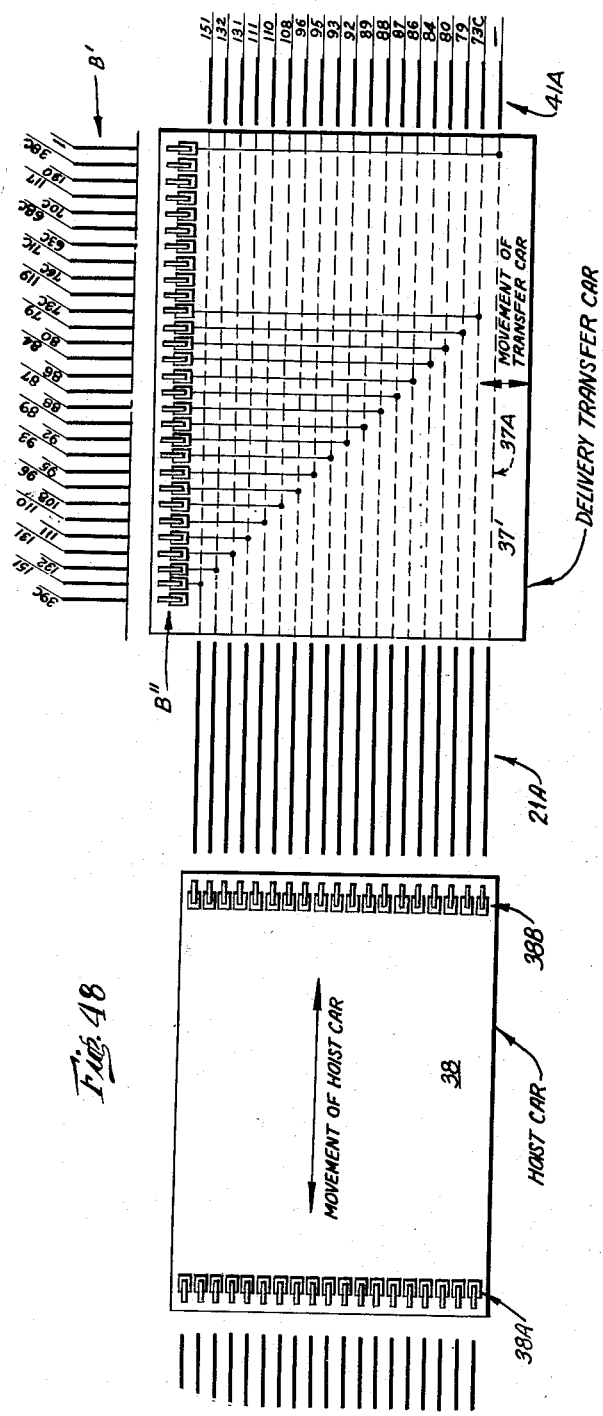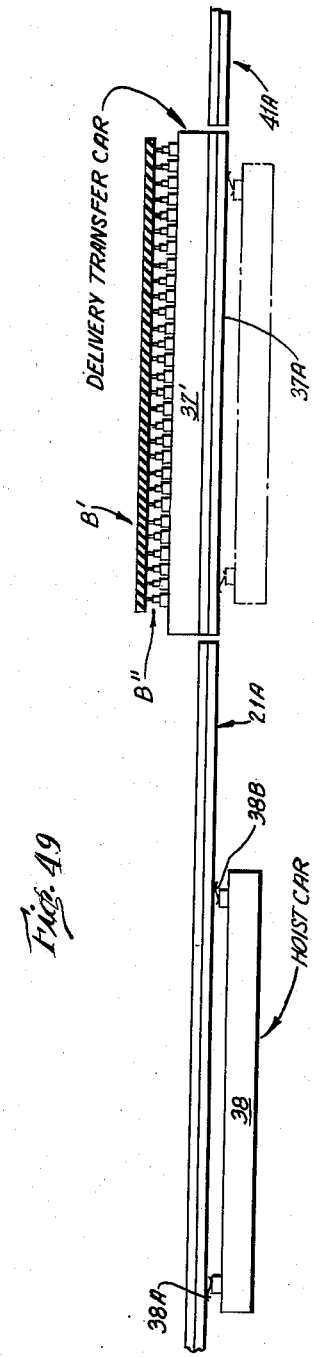
Fig. 48
Fig. 49
INVENTORS
WILLIAM ZECKENDORF
ALEXANDER H. McPHEE
BY E. C. Sanborn
ATTORNEY March 2, 1954     W. ZECKENDORF ET AL     2,670,859
AUTOMOBILE PARKING SYSTEM Filed July 1, 1949     36 Sheets-Sheet 23

INVENTORS
WILLIAM ZECKENDORF
ALEXANDER H. McPHEE
BY E. C. Sanborn
ATTORNEY

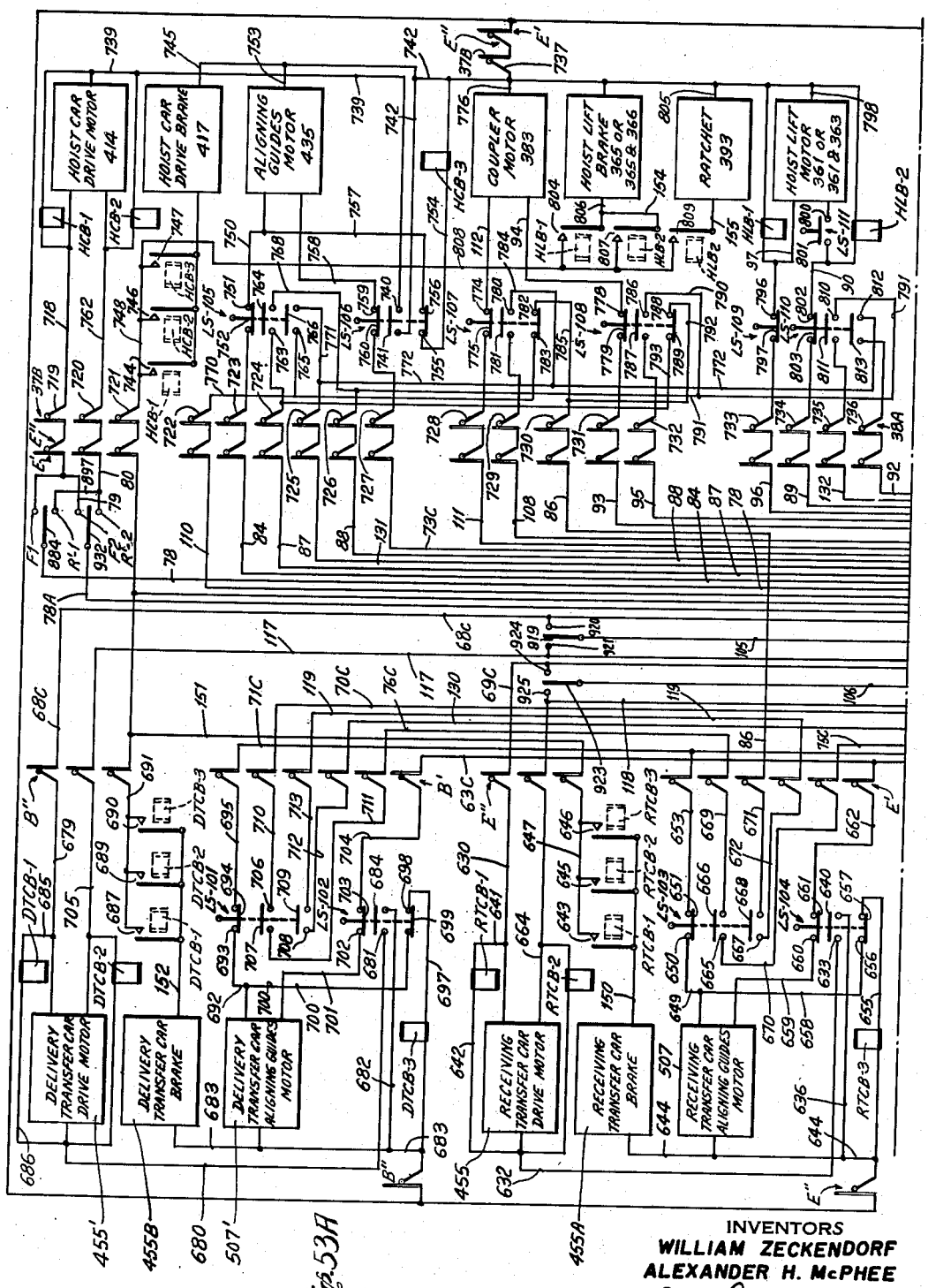

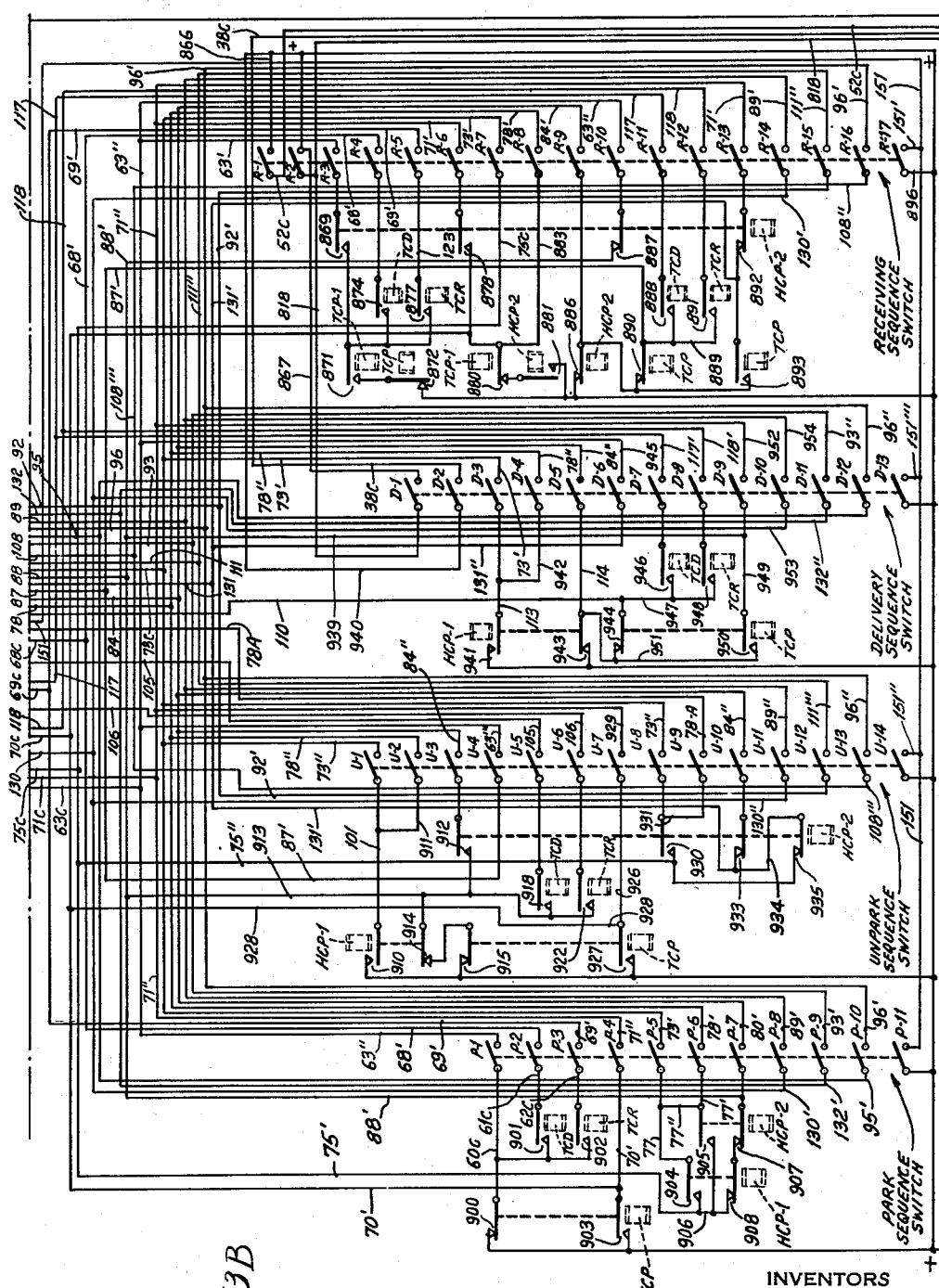

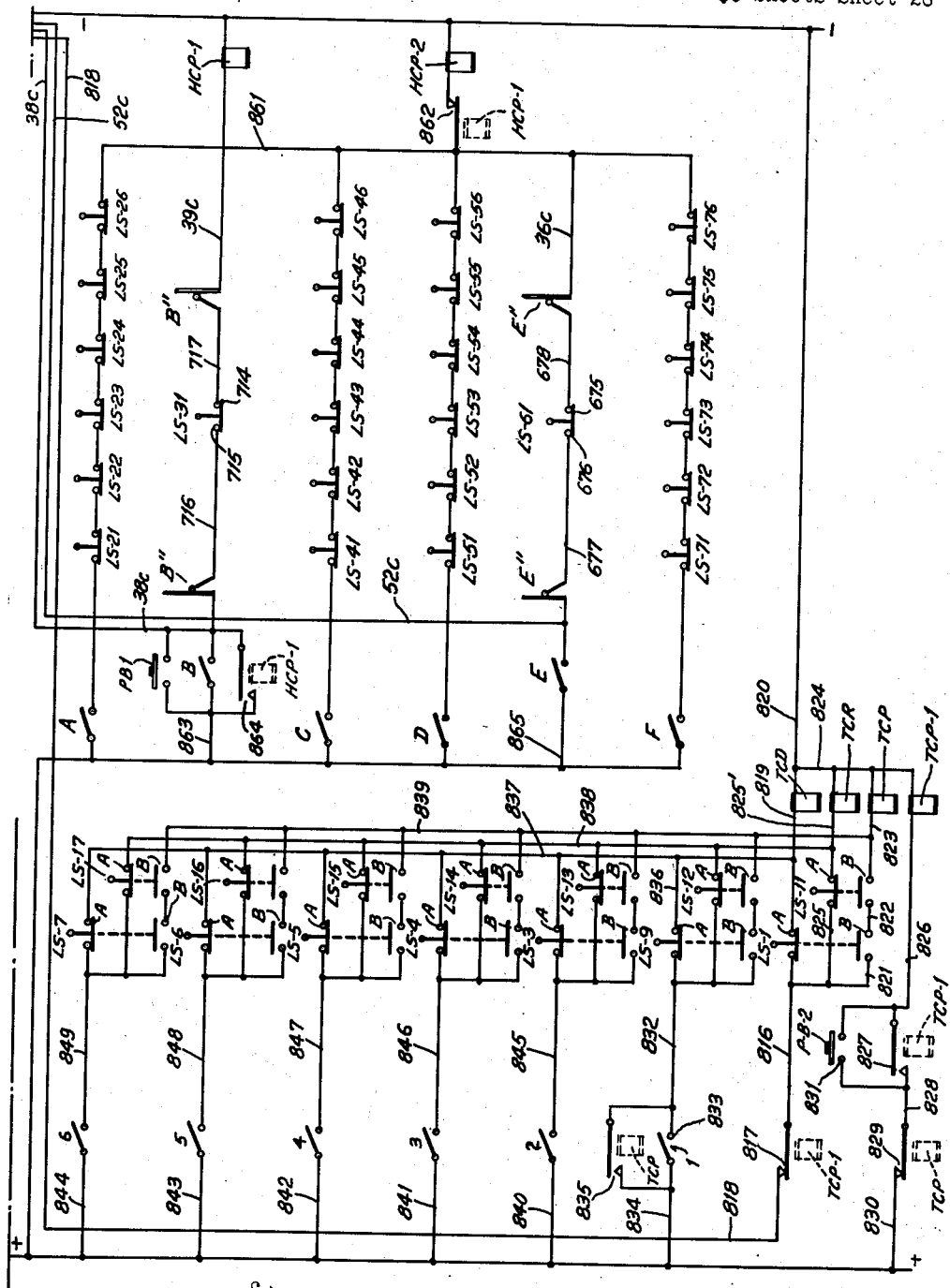

March 2, 1954 — W. ZECKENDORF ET AL — 2,670,859
AUTOMOBILE PARKING SYSTEM
Filed July 1, 1949 — 36 Sheets-Sheet 27
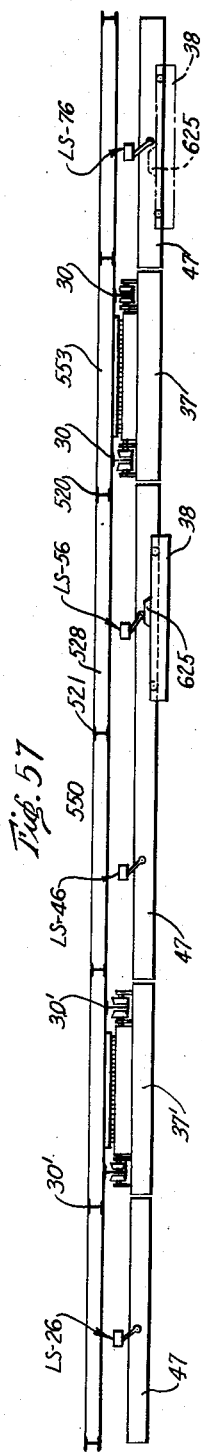
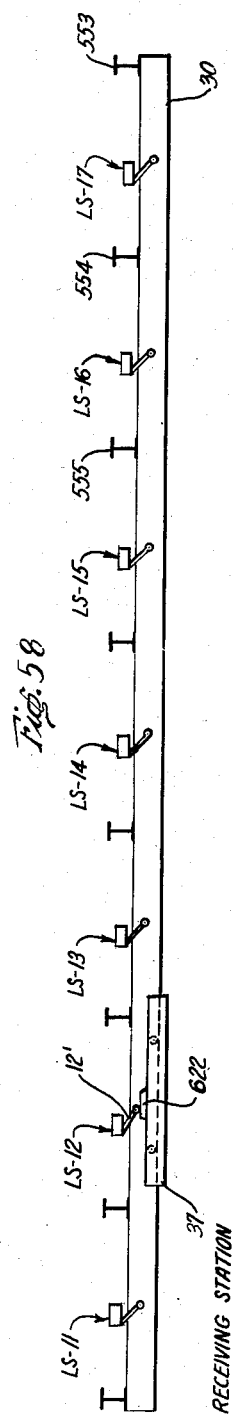
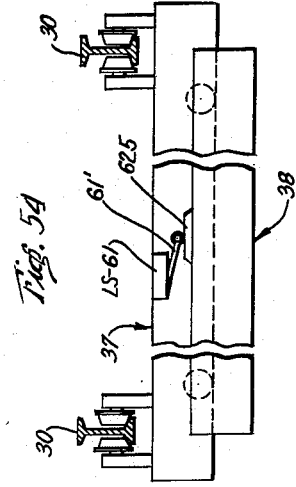
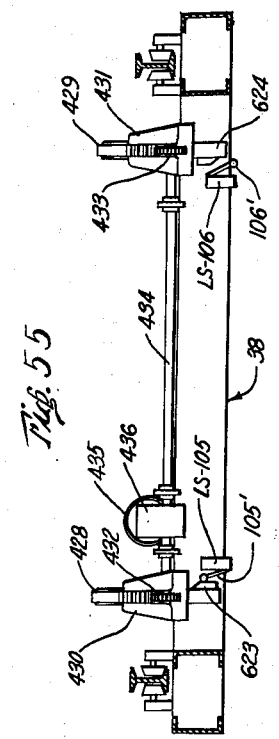
INVENTORS
WILLIAM ZECKENDORF
ALEXANDER H. McPHEE
BY E. C. Sanborn
ATTORNEY

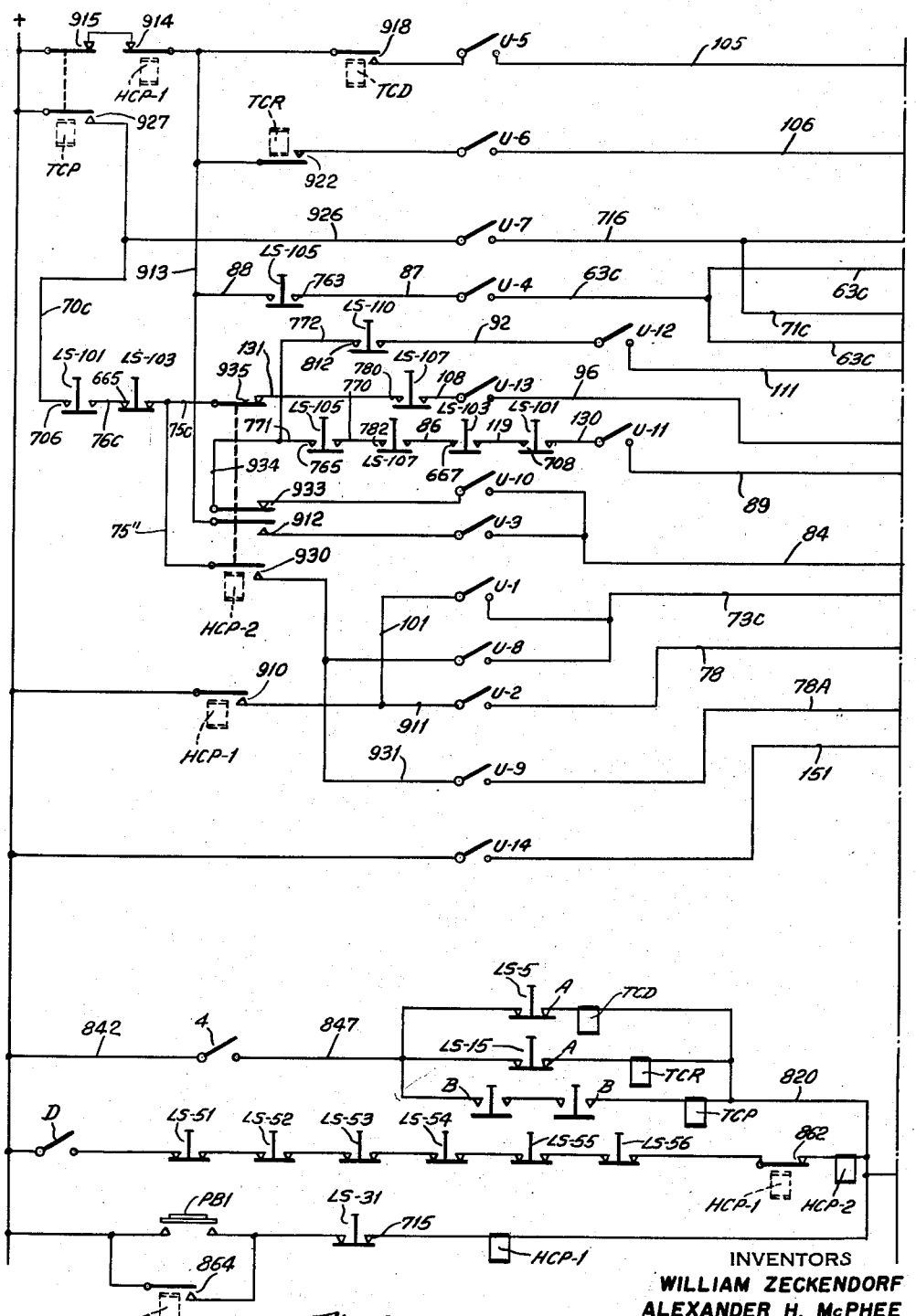

Patented Mar. 2, 1954

2,670,859

UNITED STATES PATENT OFFICE 2,670,859

AUTOMOBILE PARKING SYSTEM

William Zeckendorf, New York, and Alexander H. McPhee, Plandome Heights, N. Y., assignors to Webb & Knapp, Inc., New York, N. Y., a corporation of New York Application July 1, 1949, Serial No. 102,550

28 Claims. (Cl. 214—16.1)

This invention relates to a system for parking motor vehicles, such as automobiles, and in general to handling, conveying and storage structure and apparatus for parking and unparking such vehicles.

The problem of parking automobiles in large cities, especially in business and densely occupied areas, where parking space is limited, has been considered for a long time and many proposals have been made to solve it. But with increasing numbers of motor vehicles and increased traffic, the matter of providing places to park motor vehicles is a very serious and important one, since these vehicles must use the streets to get from one place to another and there is an increasing tendency to prohibit street parking in congested and busy areas. Further aggravating the problem is the absence of suitable parking lots or areas in vicinities or districts where relief is most needed.

It is an object of this invention to provide a system for parking automobiles whereby a maximum number may be parked on a lot or area of limited size and to provide handling, conveying mechanism and storage structures for parking and unparking the automobiles. As will appear in greater detail hereinafter the invention lends itself to the utilization of areas in districts or neighborhoods where land values are relatively high which is usually the case in densely populated or occupied business or apartment house neighborhoods. Yet, it is in such districts that parking facilities are most needed. This invention is suited to providing parking facilities for a large number of automobiles in such congested districts upon a minimum of ground or plan area.

In accordance with the invention, a structure is built in an upward direction where it is more economical, all factors considered, to build up than to build out. Thus by parking automobiles on levels above or below as well as on the ground or street level, manifestly a larger number of cars can be parked for a given ground area than where only one level of the area is used. While the idea of parking automobiles on multiple levels is not new, prior proposals and systems designed on the principle of parking on multiple levels have drawbacks of one kind or another. In systems heretofore proposed in which automobiles were to be parked in large numbers on floor levels above the ground, a considerable area on each parking level was to be taken up with ramps or elevator shafts or hatchways, or transfer aisles along the parking floors. Particularly, in those cases where a large number of automobiles were to be parked on the upper floors, it was necessary to provide these transfer aisles in order to place cars in parking spaces remote from the elevator shafts or hatchways. These transfer aisles necessarily occupy floor area which is not used, and can not as a practical matter be used, to full extent as parking area.

In accordance with the system and apparatus provided by this invention, transfer aisles are eliminated and floor area which in prior proposals was necessarily taken up by transfer aisles, is utilized to full extent for parking automobiles. Consequently, automobiles may be "mass parked" on each parking level. That is, the entire floor area may be divided off into individual parking areas or stalls, if desired, so that no transfer aisle is necessary or, at least, no more than a small transfer area near the elevator shaft is required for each floor level. Then each stall or individual automobile parking area can be occupied by an automobile and when automobiles are "mass parked" in this fashion there is no wasted area on that floor inasmuch as all available floor area is utilized for parking.

To accomplish this desirable end the invention provides a system whereby automobiles to be parked are bodily transported over the parking level or floor at a distance sufficiently above the floor level to clear automobiles that previously have been parked on that level. Thus it is possible to set an automobile down onto the floor or parking level from above the tops of other parked cars in any unoccupied parking stall even though it be in a stall remote from the entrance to that floor. Thus the entire floor area may be used for parking automobiles in "mass parked" fashion so as not to waste floor area which otherwise might be necessary for transporting cars on a given floor level. By reverse movement any automobile among the mass parked cars on a given level may be unparked and delivered to an appropriate exit without disturbing other parked automobiles. The utilization of this principle of mass parking is an important feature, and especially so where parking is to be done on areas where land values are high; and it will become apparent as the description proceeds that this principle is applicable to a single level parking area or to structures which contemplate a plurality of parking levels one above another.

According to one form of apparatus and mechanism embodying the invention whereby automobiles may be mass parked there is provided a dolly for each automobile to be parked. The automobile is driven onto a dolly which is provided with means to keep the automobile secured to it. When the automobile is made fast to the dolly, both dolly and the automobile on it are lifted together bodily by means of a hoist mechanism to a height which is higher than the tops of parked automobiles. The hoist mechanism is mounted on a carriage (herein called a "hoist car"), which is supported by and movable on overhead tracks. A section of overhead tracks supporting the movable hoist car is supported by a carriage (herein called a "transfer car") above the hoist car and the transfer car is in turn supported and movable on another higher set of tracks running in a direction at right angles to the hoist car tracks. Also supported above the parking level are a plurality of parallel sets of tracks running at right angles to the transfer car tracks and arranged so that each pair can be registered with the section of hoist car tracks mounted on the transfer car so that the hoist car can be moved laterally away from the transfer car. Thus by an arrangement of the overhead tracks, transfer car and hoist car, an automobile fastened to a dolly may be picked up from a receiving station on a given floor level, transferred over the tops of any previously parked automobiles and set down in an unoccupied parking stall, or, conversely, a parked automobile in any stall may be picked up and delivered to any unoccupied stall or to a delivery station. As previously mentioned, the entire floor area, except for receiving and delivery stations may be divided off into parking stalls and used as such without floor area being taken up by transfer aisles on the floor area, which otherwise is wasted as parking space. Thus automobiles may be parked adjacent one another over the entire floor area; this being what is meant by "mass parking."

The foregoing brief description in the last paragraph has been confined to the operation of the system as it relates to a single parking level such, for example, as the ground floor. However, the system contemplates as a further object, a plurality of parking levels each operating upon the same general plan of operation and principle, together with vertical conveying means to carry automobiles up from the ground floor to be parked on upper levels and to carry automobiles down to the ground floor in the reverse or unparking operation.

Other objects and advantages of this invention, residing in certain novel features of construction, arrangement, and combination of parts, will become more apparent from the description of specific embodiments hereinafter following. And it will be understood that certain features of the invention may be utilized without taking advantage of all herein disclosed.

Although such novel features as are believed to be characteristic of the invention are pointed out in the claims appended hereto, the invention itself, as to its objects and advantages and the manner in which it may be carried out, may be better understood by reference to the description which follows, taken with the accompanying drawings forming a part hereof, in which:

Fig. 1 is a diagrammatic, partial plan view, showing a parking floor level including a plurality of automobile stalls, and means for moving automobiles to and from the stalls.

Fig. 2 is a view in elevation of the parking floor of Fig. 1 showing automobiles on the dollies in various stages of the parking operation;

Fig. 3 is a view in elevation showing the hoisting frame and mechanism, the hoist car, a transfer car, and a dolly at a receiving station on the ground level;

Fig. 4 is a plan view of a transfer car;

Fig. 5 is a view on line 5—5 of Fig. 4;

Fig. 6 is a view on line 6—6 of Fig. 4;

Fig. 7 is a view to larger scale on line 7—7 of Fig. 4 showing a detail of the transfer car;

Fig. 8 is a view on line 8—8 of Fig. 7;

Fig. 9 is a plan view of the hoist car carried by the transfer car shown in Figs. 4 to 8;

Fig. 10 is a view on line 10—10 of Fig. 9;

Fig. 11 is a view on line 11—11 of Fig. 9;

Fig. 12 is a view to larger scale on line 12—12 of Fig. 9 showing a detail;

Fig. 13 is a plan view of the hoist frame of the hoist mechanism;

Fig. 14 is a view in section of a corner post of the hoist frame on line 14—14 of Fig. 13;

Fig. 15 is a view of a detail of the hoist frame;

Fig. 16 is a view on line 16—16 of Fig. 15;

Fig. 17 is a plan view of a typical dolly showing the automobile chocking devices;

Fig. 18 is a view in elevation showing the dolly and mechanism at the receiving station to retract the dolly chocking devices to permit movement of the car onto the dolly.

Fig. 19 is a view to larger scale on line 19—19 of Fig. 17;

Fig. 20 is a view to larger scale on line 20—20 of Fig. 17;

Fig. 21 is a partial plan view partly in section showing the chocking devices;

Fig. 22 is a view in elevation on line 22—22 of Fig. 21;

Fig. 23 is a view in cross-section showing the manner of mounting of the hoist car on its overhead tracks on line 23—23 of Fig. 9;

Fig. 24 is a view in elevation of the parts shown in Fig. 23;

Fig. 25 is a plan view showing one of the dolly sockets, in conjunction with the coupler lugs of the associated corner post of the hoisting frame.

Fig. 26 is a fragmentary view in vertical section of portions of the dolly socket, taken on line 26—26 of Fig. 25.

Fig. 27 is a view in horizontal section taken on line 27—27 of Fig. 26.

Fig. 28 is a view in horizontal section taken on line 28—28 of Fig. 26.

Fig. 29 is an end elevational view of a dolly socket together with means for attaching it to channel bars of the dolly.

Fig. 30 is a detail plan view of mechanism for operating the coupler tubes of the hoisting frame.

Fig. 31 is a view in side elevation of the left hand portion of the mechanism of Fig. 30, to an enlarged scale.

Fig. 32 is a vertical sectional view taken on line 32—32 of Fig. 30.

Fig. 33 is a detail sectional view showing a socket on a transfer car for receiving an aligning plunger on the hoist car.

Fig. 34 is a plan view showing a framework for adjacent automobile-receiving stalls.

Fig. 35 is a view in transverse vertical section on line 35—35 of Fig. 34.

Fig. 36 is a view in longitudinal transverse section on line 36—36 of Fig. 34.

Fig. 37 is a view in side elevation of the framework shown in Fig. 34.

Fig. 38 is a detail vertical sectional view taken on line 38—38 of Fig. 34.

Fig. 39 is a detail plan view showing a bracket arrangement for supporting hoisting-frame guide channels adjacent certain of the stalls.

Fig. 40 is a detail view showing an alternative form of guide-channel support.

Fig. 41 is a diagrammatic plan view showing an alternate arrangement for rotating the hoisting-frame coupler-tubes into and out of coupling position.

Fig. 42 is a view in side elevation of the arrangement shown in Fig. 41, with certain parts omitted.

Fig. 43 is a side elevational view showing a modified form of aligning socket and cooperating plunger.

Fig. 44 is a view in end elevation of the construction shown in Fig. 43.

Fig. 45 is a diagrammatic plan view showing an arrangement of power supply or feeder rails for the transfer and hoist cars.

Fig. 46 is a sectional view with parts in elevation, taken on line 46—46 of Fig. 45.

Fig. 47 is a sectional view, with parts in elevation, taken on line 47—47 of Fig. 45.

Fig. 48 is a diagrammatic plan view showing more specifically the relation between the hoist and delivery transfer car feeder rails.

Fig. 49 is a view in elevation of the parts shown in Fig. 48.

Fig. 53A is a wiring diagram showing the electrical connections to the motors and other apparatus on the transfer and hoist cars.

Fig. 53B is a continuation of the wiring diagram of Fig. 53A, showing the connections between various sequence switches and the apparatus of Fig. 53A.

Fig. 53C is a continuation of the wiring diagram of Fig. 53B, showing connections to various stall limit switches operated by the hoist and transfer cars, and to two transfer car limit switches operable by the hoist car.

Fig. 54 is a diagrammatic elevational view showing the limit switch LS-61 on the receiving transfer car operated by a cam on the hoist car.

Fig. 55 is an end elevational view of a portion of the hoist car, showing aligning plungers provided with cams for operating certain limit switches.

Fig. 57 is a view taken on line 57—57 of Fig. 56.

Fig. 58 is a view taken on line 58—58 of Fig. 56.

Fig. 61A is a simplified wiring diagram showing connections between the contacts of the "unpark" sequence switch and contacts of various relay and limit switches.

Figure 50:
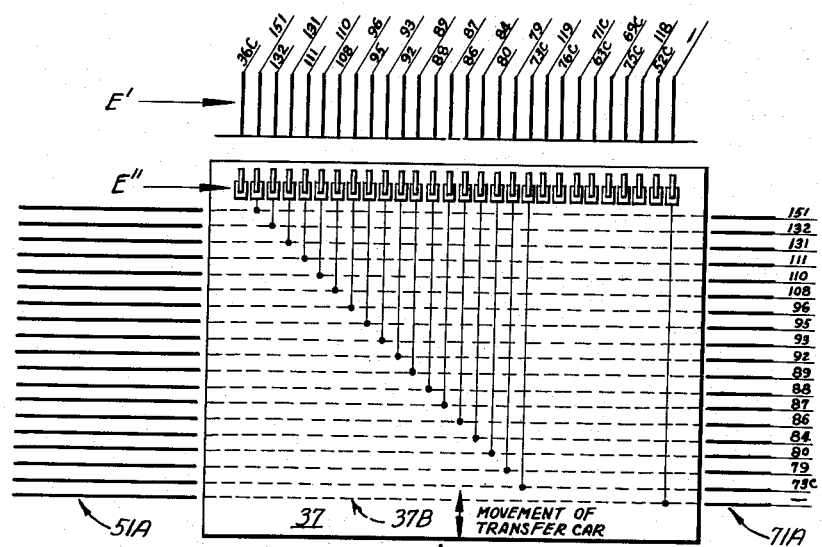
Fig. 50 is a diagrammatic plan view showing more specifically the relation between the hoist and receiving transfer car feeder rails.
Figure 51:
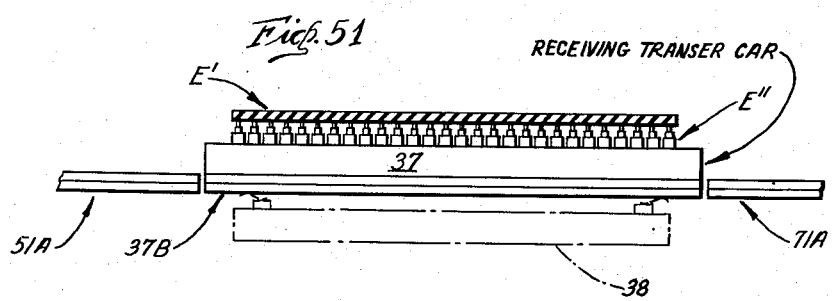
Fig. 51 is a view in elevation of parts shown in Fig. 50.

Referring now to the drawings, in which like reference characters indicate like parts, Fig. 1 shows a plan view of a typical floor area and will serve to illustrate how the various parking levels are constructed as other floors will be provided with like systems. The plan shown in Fig. 1 comprises only a portion of the floor area and it will be understood that the other portion (not shown) may, if desired, be a complement to the portion shown in Fig. 1.

For convenience of explanation the parking level of Fig. 1 may be described as laid off into a plurality of aisles and rows of parking stalls. The invention contemplates a street floor level having additional provisions for handling dollies and automobiles but it is deemed sufficient for descriptive purposes of certain features of the invention to describe first a typical floor level. For this purpose, it may be assumed that the floor level shown in Fig. 1 is at an elevation at which automobiles may be driven through an entrance directly onto a dolly; for example, through an entrance 10 in the wall 11 of the building and it may be assumed that the automobile is to be parked on this level.

The parking area is laid off into rows I, II, III, IV, V, VI, etc., and aisles A, B, C, D, E, F, defining stalls for receiving automobiles. The stalls in aisle A are designated by the reference numerals 21–26, respectively; those in aisle B by numerals 31–36, respectively; those in aisle C by numerals 41–46, inclusive, and so on. Thus, in accordance with this designation, the stall in row I, aisle A, is indicated by reference character 21; the stall in row II, aisle A, by 22; and the stall in row VI, aisle F, by 76; it being noted that the entire area is occupied by parking stalls as will appear from Fig. 1, except for the area near one end of the floor which, as will appear later, is to accommodate a vertical conveyor. The up hatchway of the vertical conveyor is indicated at 27 and the down hatchway at 28. A platform for receiving an incoming automobile is shown at 29, at one end of the aisle E; while another platform 49 is shown at one end of aisle B for receiving an automobile from any of the stalls, which automobile may then be driven through the exit opening 10a.

A pair of overhead rails 30 extends above the aisle E and platform 29. On these rails 30 there is positioned a transfer car 37, adapted to carry a hoist car 38. Another transfer car 37′, which may be of the same construction as the first mentioned transfer car, travels on overhead rails 30′ extending above the aisle B and platform 49, as shown in Fig. 1.

To visualize the general arrangement, it may be noted here that in parking an automobile in stall 46, for example, the automobile is driven onto a dolly (a dolly being indicated generally by reference number 40, Fig. 2) which is placed on the receiving station platform 29. The dolly, with the automobile made fast upon it, it lifted by the hoist car 38 which in turn is carried on the transfer car 37 movable along transfer aisle E on the overhead rails 39. The automobile is thus transported over the tops of automobiles which may have been parked in aisle E. Upon arrival at row VI, the transfer car stops and the hoist car moves along a section of a pair of overhead rails on the underside of the transfer car and, leaving the transfer car, moves thence on a pair of overhead rails 47 to a position above stall 46. Here the hoist car sets the dolly with the automobile on it, onto the parking area or stall 46. The hoist car releases the lifting mechanism, leaving the dolly and automobile in the stall 46, and is returned to the transfer car for parking additional cars in any desired unoccupied stall. To unpark the automobile in stall 46, the hoist car, moved over stall 46, picks up the dolly and automobile, and carries them to the transfer car 37', which then delivers said dolly and automobile to the delivery station platform 49. The automobile may then be released from the dolly at this delivery station and thence driven out an exit 10a.

It will be noted that the stalls in aisles A, C, D, and F are all provided with overhead rails 47 to enable the hoist car to move over any of said stalls from either transfer car to deposit or remove a dolly and automobile. The stalls in aisles B and E require no rails 47, since the hoist car may be carried to any desired position in either of these aisles by the transfer car movable thereover.

As will be later more particularly described, provision is made for moving the two transfer cars 37 and 37' in unison so that they are always in line with each other. Thus the transfer cars provide a continuous pair of hoist car rails in any of the rows of stalls in which they stop.

To accomplish the parking and unparking of automobiles in accordance with the overhead transfer system as described generally above, a number of novel parts, arrangements and combinations are embodied in the system.

DOLLIES

The system utilizes a separate dolly for each parking stall and it is to be particularly noted that when an automobile to be parked is driven onto a dolly at the receiving station, it is locked or fastened to the dolly. Thereafter the dolly is transferred with the automobile on it, and it is kept under control at all times until the automobile is unparked and finally discharged from the dolly at the delivery or exit station.

A dolly (designated generally by reference numeral 40, Figs. 2, 3, 17, 18, 19, 20, 21, 22) comprises two parallel steel channels 200 and 201 maintained in parallel relation and reinforced with longitudinal structural members 202, 203, 204 and 205 and cross members 206, 207, 208 and 209. The channels 200 and 201 are connected to a central pan 210 to catch drip, if any, from an automobile on a dolly. The dollies are all alike and are long and wide enough to accommodate any standard automobile. Mounted in the channels fore and aft are a plurality of chocking members 211 the purpose of which is to chock the wheels of an automobile so that the automobile can not roll on its own wheels or shift on the dolly to any objectionable extent. The chocks are so constructed that they are normally in chocking position and to release an automobile they must be actuated, the chock actuators being described in further detail hereinafter.

Each chock 211 is U-shaped and is fixedly mounted upon a shaft 212 (Figs. 19, 20, 21, and 22). A plurality of shafts 212 are provided, one for each of said chocks. The shafts 212 for the chocks in the channel 200 are rotatably mounted in channel irons 202, 203 (Fig. 19) and in an inverted U-shaped member 213 mounted on the channel 202. Likewise, the shafts 212 for the chocks in the channel 201 are rotatably mounted in channel irons 204, 205 (Fig. 19) and in an inverted U-shaped member 213 mounted on the channel 205.

Each of the chocks may be rocked by rotation of its shaft 212 so that it may take an up position to chock a wheel, or a down position flush with the surface of the bottom webs 215 and 216 (Figs. 19 and 21) of the wheel channels 200 and 201. Plates 217 are secured to the bottom webs of the channels 215 and 216 adjacent the respective chocks, and are provided with depressed portions or pockets 218 to permit the chocks to lie flush with the bottoms of said channels when said chocks are lowered. In Fig. 21 the plate 217 for the chock in the left hand portion of that figure has been omitted simply to show the construction beneath said plate, including an intermediate bearing 212' for the shaft 212, which bearing may be welded or otherwise secured to the underside of the bottom web 216.

At the outer end of each shaft 212 is a pinion 222 secured to the shaft. This pinion engages and meshes with an arcuate rack or segment 223 forming a part of a lever 224 which is rotatably mounted on a pivot 225 in turn mounted on the U-shaped member 213. The lever 224 has a weighted head 226 at its outer end which is curved as shown at 227. It will be observed that the upper surface of this lever 224 is flat to permit the lever to assume a substantially horizontal position when the U-shaped rocker chock 211 is down and lying flush with the bottom of channel (Figs. 21 and 22).

The weight of the head 226 of each lever is sufficient to maintain said lever normally in its downward position indicated in dotted lines in Fig. 22, and the corresponding chock 211 in its upward position as shown in said Fig. 22. If desired the weighted head may be assisted by a spring in maintaining said chock in its upper position, although the weight of the head may be made sufficient in itself to accomplish that end.

In the embodiment illustrated in Figs. 17-22 ten chocks are provided in the channel or runway 200 and ten chocks in the channel or runway 201. Five of the chocks in each channel are provided to insure blocking of the front wheel and five for blocking of the rear wheel, regardless of widely varying automobile wheel bases.

When the dolly is properly positioned on the receiving station platform 29, the heads 226 of the levers 224 at opposite sides of the dolly are directly above a series of shoes 230 (Figs. 18 and 22) which shoes are secured upon the upper ends of plungers 231 slideable in portions of said platform. As shown in Figs. 3, 18 and 19 the upper part of the receiving station platform 29 may comprise a pair of channel beams 232, 233, mounted on pedestals such as shown at 236, and another pair of channel beams 234, 235, mounted on pedestals 237. The plungers 231 at the left side of the platform (as viewed in Fig. 19) may extend through one or more guide members 238 secured to the channels 232, 233 and positioned therebetween. Similarly the plungers 231 at the right side of said platform may extend through one or more guide members 239 secured between the channels 234, 235. The plungers 231 of each series are connected by links 240 (Figs. 3 and 18) to bell crank levers 241 which are pivotally mounted upon the respective series of pedestals underlying the associated channel beams. At their lower ends the bell crank levers 241 of each series are connected to a corresponding bar 242, which is pivoted at one end to a lever 243 pivotally mounted on a suitable portion of the platform framework, such as a pedestal 244 in Figs. 3 and 18. It will be apparent that movement of either bar 242 in one direction or the other will correspondingly operate the bell cranks 241 and plungers 231 connected thereto so that the associated series of shoes 230 will be either raised or lowered.

If desired, layers or mats of fibrous material 245 may be mounted on top of the various channel beams 232—235 (Figs. 18 and 19) to form a cushioning seat for the dolly.

The sets of pedestals 236, 237 are mounted on suitable supporting framework comprising longitudinal beams 246, 247, and cross beams 248 (Figs. 3, 18 and 19) forming the lower portion of the receiving station platform 29.

Any suitable motor means may be provided for raising and lowering the shoes 230. For example, an electrically powered gear-motor assembly may be employed, as shown in Fig. 19, wherein an electric motor 250 acts through gearing in the casing 251 to drive a shaft 252. The latter extends across the platform 29 and may be mounted at opposite ends in pedestals 244 (one of which is shown in Fig. 18). Secured to said opposite ends are the levers 243 which, as previously noted, are connected to the bars 242 for operating the respective series of plungers 231. Intermediate its ends, said shaft 252 may be mounted in pedestals 253, 254 (Fig. 19).

Means are provided for locking the dolly against accidental movement on the receiving station platform 29, so that when once the dolly has been lowered into position on the platform, it cannot be dislodged by vibrations or other disturbances in the building. For this purpose the underside of the dolly is provided with sockets 255, 256 (Figs. 17, 19, and 20) adapted to receive locating pins on the receiving station platform 29 when the dolly is lowered thereon to receive an automobile. One of the aforementioned locating pins is shown at 257 (Figs. 19 and 20) below the socket 255.

When the dolly is moved vertically to and from the platform 29, the aforementioned located pins may be fixed in position. However, in case it may be desired to move the dolly horizontally on to the platform, or to remove the dolly from the platform by a horizontal movement, the pins may be movable, as illustrated in connection with the pin 257.

Said locating pin 257 is slidable vertically in a guideway 258, supported between suitable uprights 259, 260, and is shown connected, through a link 261 and bell crank lever 262 to an operating bar 263. It will of course be understood that the locating pin cooperating with the dolly socket 256 may be mounted similarly to the pin 257 and connected in like manner to the bar 263 for operation by the latter.

At one end, said bar 263 may be connected to a lever 264 secured to an intermediate portion of the motor driven shaft 252. Thereby, upon operation of the shaft 252 by the motor 250, the pins 257 are raised into engagement with the sockets 255, 256, and concurrently the plungers 231 are moved upwardly, raising the levers 224 and lowering the chocks 211 to their positions flush with the dolly floor. The dolly is thus prepared to receive an automobile. It will, of course, be understood that the motor 250 may be energized by an attendant at any desired time after the dolly is placed on the platform 29; or it may be energized automatically in response to lowering of said dolly upon the platform, or in any other desired manner.

After an automobile is driven on to the dolly the motor 250 is energized to operate in the reverse direction, lowering the locating pins 257 together with the plungers 231. As the plungers 231 move downwardly the levers 224 also move downwardly, raising the chocks 211. The front and rear wheels of the automobile are thereby blocked, locking the automobile to the dolly. If any wheel of the automobile should happen to stop on top of a chock, that chock would not be able to rise, but the other chocks will swing up to block the wheels. If the hand brake were not set and if the automobile were not locked in gear, it could roll slightly with respect to the dolly, but in rolling, the wheel would release a chock, insuring even less motion between the automobile and the dolly. In other words, a free automobile can move only a limited distance before engaging wheel chocks which restrict its further movement.

Each dolly is provided near each of its four corners, with a socket member 265 for cooperation with hoisting apparatus presently to be described. As shown in Figs. 17 and 18, two of the socket members 265 may conveniently be secured to the ends of the channel beams 206, and the two other socket members may similarly be secured to the ends of the channels 207.

*The hoisting frame*

The hoist car 38 (Figs. 1, 2, 3, and 9–12) is equipped with a hoisting frame 270 adapted to be coupled to any of the dollies for raising the latter, together with the automobile thereon, so that the dolly and automobile may be transported to the desired stall, over the tops of other automobiles.

One form of hoisting frame 270 which may be employed is illustrated in Figs. 13–16, comprising a rigid rectangular frame which may be conveniently formed of piping suitably secured together. The frame may, as shown, include four corner posts 271, 272, 273, 274, formed of piping. Extending between and welded, or otherwise attached, to the posts 271 and 274 are longitudinal pipes or bars 275, 276 (Figs. 3 and 13) with intermediate trusses or braces 277 therebetween as shown in Fig. 3. Similar longitudinal pipes 278, 278′, with intervening braces, extend between the corner posts 272 and 273, to which they are welded or otherwise attached.

At the front end of the hoisting frame, a truss bar 279 extends between and is attached to the corner posts 271 and 272. This truss bar is so positioned as to cross over the hood of an automobile and to clear it by a considerable margin. The rear end of the frame is bridged by an arch shaped bar 280 (Figs. 2, 3, 13, and 14) which clears the automobile top. It will be apparent that the front cross bar 279 may also be arch shaped, if desired.

Mounted within the corner posts of the hoisting frame 270 are couplers 281, adapted to engage the sockets 265 of any of the dollies for coupling the dolly to said frame. One form of coupler which may be employed in the corner posts is illustrated specifically in Fig. 14, in conjunction with corner post 271.

As shown in Fig. 14, each coupler may comprise a long vertical tube 282 passing through the associated corner post. Sleeves 283 and 284 are welded to the top and bottom of the corner post, providing extensions of the latter in which are fitted flanged bushings 285, 286, which form bearings in which the coupler tube is rotatable. Collars 287 and 288, suitably secured to the coupler tube, are adapted to engage the flanged ends of the respective bushings to prevent vertical movement of said tube with respect to the corner post. The lower collar 288 may be welded to, or integral with, the tube 282, while collar 287 may be fastened to said tube by a set screw, as shown.

A cable 290 passes into the coupler tube 282, from a pulley 291 on the hoist car 38. At its lower end, said cable is attached to said tube in any suitable manner. For example, as shown in Fig. 14, the lower end of said cable may carry a conventional socket 292 in which said end is fastened in the usual manner so as to be integral therewith. Said socket 292 in turn is fastened, as by a bolt 293 to a block 294. The latter is secured by a bolt 295 to a member 296 having a shank threadedly engaging the interior lower end portion of the tube 282 and having another portion comprising a frustro-conical head 297 extending beyond said tube and provided with a pair of outwardly extending diametrically-opposed lugs 298 (Figs. 14 and 25). When the cable 290 is pulled upwardly it acts through the socket 292 and connections to draw upwardly the head 297, together with the coupler tube 282. Conversely, lowering of said cable is accompanied by downward movement of said tube 282 and head 297.

It will be noted that the bolt 293 extends through longitudinal slots in the wall of the tube 282, permitting longitudinal adjustment of the block 294 by turning of the bolt 295, when desired to adjust tension in the cable 290.

Threaded into the upper end of the tube 282 is a shank 299 of a member 300 having a frusto-conical head adapted to guide the tube into a socket 301 on the hoist car when the hoisting frame is raised into its upper position. The member 300 has a longitudinal bore for permitting free passage of the cable 290 therethrough. It will, of course, be understood that there are four sockets 301 on the hoist car, one for each of the members 300 and coupler tubes 282 in the respective corner posts of the hoisting frame 270.

The dolly sockets

The socket in each of the dolly socket members 265 has diametrically opposed passageways or grooves 266 (Figs. 17 and 25) into which the lugs 298 on the head 297 are adapted to pass when said head is lowered with the coupler tube 282 into said socket.

As shown in Figs. 25 and 29, each dolly socket 265 is suitably secured to adjacent channel beams 206 or 207, as by bolts 305 extending horizontally through said beams and through said socket. Other bolts 306 may extend vertically through flanges 307 on said socket and thence through the underlying upper flanges 308 of the channel beams.

Between the aforementioned grooves or passages 266 are walls 309 of the dolly socket. At their upper ends, said walls are preferably inclined downwardly, as shown. Portions of the socket are cut away beneath said walls. More particularly, as shown by dotted lines in Fig. 25, the lower portion of the socket wall adjacent one of the passages 266 is undercut from the surface 310 of said passage to the dotted line surface 311. The latter surface is shown in full lines in Figs. 27 and 28. It will thus be seen, especially from Fig. 28, that the lower portion of the socket has diametrically opposite recesses 312, 313; one of which extends from the surface 314 to surface 311, and the other of which extends from surface 315 to surface 316. As will be apparent from Fig. 25, the surface 314 forms a side wall for one of the passages 266, and the surface 315 forms a side wall for the other of said passages.

The portion of the socket wall 309 extending between surfaces 310 and 311 forms a ledge 317 overhanging the recess portion 312 therebelow; while similarly the portion of the socket wall extending between surface 316 and the side wall surface 318 of the associated passage 266 forms a ledge 319 overhanging the underlying recess portion 313.

Portions of the ledges 317 and 319 are undercut to different extents. In other words, as shown in Figs. 26 and 27, a portion 320 of the ledge 317 extends downwardly further than does the remaining portion of said ledge. Similarly, portion 321 of ledge 319 extends downwardly further than does the remaining portion of that ledge. The downwardly projecting surface 322 of ledge portion 320 provides a stop for engagement with one of the coupler lugs 298; while the downwardly projecting surface 323 (Fig. 27) of ledge portion 321 similarly provides a stop for the other of said lugs 298, as will be presently set forth more specifically.

With this construction it will be seen that when the coupler head 297 is moved downwardly with its lugs 298 aligned with the passages 266, said lugs pass through said passages and thence into the lower portion of the dolly socket below the aforementioned ledge portions 320 and 321. Upon now rotating the coupler tube counterclockwise (i. e., in the direction of the arrows in Fig. 25), the lugs 298 pass under said ledge portions 320 and 321 into the portions of the recesses 312, 313 beyond said ledge portions. Said coupler tube is rotated until one of said lugs 298 engages the surface or shoulder 311 of recess 312, at which time the other lug 298 engages shoulder 316 of recess 313. The coupler tube is then raised, bringing the lugs 298 into engagement with the under surfaces 325 and 326 of the respective ledges 317 and 319. At the same time, one of said lugs 298 is positioned between shoulder 311 of recess 312 and the downwardly projecting surface or shoulder 322 of ledge portion 320; while the other lug 298 is positioned between shoulder 316 of recess 313 and the downwardly projecting surface or shoulder 323 (Figs. 27 and 28) of ledge portion 321. Thus the coupler lugs 298 are now firmly engaged with the dolly socket and are maintained against rotation during raising of the dolly. As the hoisting frame is raised further, the dolly is lifted until the coupler tube heads 300 engage the sockets 301 on the hoist car, locking the dolly securely against horizontal movement with respect thereto. The weight of the dolly and any load thereon, acting through the under surfaces 325, 326, of the socket members, which are engaged by the coupler tube lugs 298, effectively maintains the dolly and coupler tubes 282 in interlocked position.

When the hoisting frame and dolly are lowered from the hoist car, and the dolly is deposited in the desired location, the hoisting frame is lowered further sufficiently to bring the coupler lugs 298 of its corner posts into the lower portions of the dolly sockets so that they clear the lower edges of the ledge projections 320 and 321. Then the coupler tubes are turned reversely until their lugs 298 come opposite the passages 266 in the respective dolly sockets. It will be noted from Fig. 25 that when the coupler tube is rotated clockwise, its extent of clockwise rotation is limited by the surfaces 314 and 315, which form walls of the aforementioned passages 266. Said surfaces 314 and 315 thus form stops preventing rotation of the coupler lugs 298 beyond said passages 266 when the coupler tube is rotated to release the hoisting frame from the dolly socket. Upon them raising the hoisting frame, the lugs 298 of each coupler tube pass upwardly from the respective dolly sockets through the passages 266 so that the hoisting frame is freed from the dolly and may be returned into engagement with the sockets 301 on the hoist car.

It will be obvious that, if desired, additional stop projections may extend upwardly from the upper sleeve 283 of each corner post for engagement by lugs extending outwardly from the collar 287 of the associated coupler tube 282, upon rotation of the tube 282 through a predetermined angle in either direction. Such additional stops may be provided if it be desired to reduce torsional stresses upon the coupler tube.

*Means for rotating the hoist-frame coupler-tubes*

For rotating a tube 282 to bring the lugs 298 into the desired positions with respect to the ledge under-surfaces 325, 326, there is shown a cable 330 which is wrapped around and secured to said tube. One end of said cable, after passing around a guide pulley 331, may be connected to a yoke 332 (Fig. 3) and the other end to a spring 333. Thus, longitudinal movement of said yoke is accompanied by rotation of the tube 282 about its longitudinal axis. Conveniently, the cable 330 may be secured to the tube 282 by an anchorage lug 298 of any suitable form secured to the tube and clamping the cable firmly against the tube. Another cable 334 is shown connected at one end to said yoke 332, thence passed around a guide pulley 335, and then wrapped around and secured to the coupler tube 282 in the corner post 274 on the same side of the hoisting frame as the post 271. The other end of said cable 334 is also connected to a spring so that when the yoke 332 is raised said cable will be drawn against the action of the spring; and, when said yoke is released the spring will restore said yoke and cable to normal position. If desired, the cables 330 and 334 may be connected to separate springs, each of which is extended or compressed as the corresponding cable is pulled in response to raising of the yoke 332. For the sake of simplicity, however, we have shown said cables connected to opposite ends of the same spring 333. The yoke 332 is also connected to a cable 336 which is wrapped around and secured to a drum 337 on the hoist car 38.

The pulleys 331, 335 may conveniently be mounted in a frame 329 fastened in any suitable manner upon the longitudinal pipe 276, as shown in Figs. 3, 15, and 16. The pipes 275, 276 may be welded or otherwise secured at their opposite ends to the sleeves 283, 284 of the corner posts 271 and 274.

It will, of course, be understood that the same arangements as above described for rotating the coupler tubes in the corner posts 271, 274, may be duplicated on the opposite side of the hoisting frame 270 for rotating the coupler tubes in the corner posts 272 and 273. Thus, in Fig. 13 there are shown pulleys 338, 339 in a frame mounted on the longitudinal pipe 276′, for receiving cables similar to the cables 330, 334, above described, to rotate the corresponding coupler tubes in the posts 272, 273. It will be understood that the cables passing over said pulleys 338, 339, are attached at one end to a yoke which in turn is attached to a release cable 340 (Fig. 9) similar to the cable 336 and extending to the hoist car. The other ends of said cables may be connected by a spring similar to spring 333 in Fig. 3.

As previously noted, a hoisting cable is provided for each of the coupler tubes 282, the one for the coupler tube in the corner post 271 being designated 290 and passing over a pulley 291 on the hoist car. The hoisting cable for the coupler tube in the corner post 274 is shown at 341 in Figs. 3, 9, and 10 passing over the hoist car pulley 342; while the hoisting cables for the coupler tubes in the corner posts 272 and 273 are indicated at 343, 344, respectively, in Fig. 9, passing over pulleys 343′ and 344′ on said hoist car. All of said hoisting cables extend to drums on the hoist car, as will be presently more specifically noted.

Welded or otherwise attached to each of the corner posts are arms 345, 346 (Figs. 3 and 13), which, together with an arm 347, form a supporting framework for a bracket 348 in which is mounted a roller or guide wheel 349. A strut 350 extending to said frame work from the adjacent longitudinal member 276 or 276′ of the hoisting frame, provides additional support. The guide wheels 349 are adapted to engage vertical guide channels 351 in stationary supports 352 positioned adjacent the automobile-receiving stalls and receiving and delivering station platforms 29 and 49 in Fig. 1.

The guides or trackways 351 extend upwardly from the floor to a height such that, before the heads 300 of the coupler tubes 282 leave the hoist car sockets 301 in the descent of the hoisting frame, the guide wheels 349 engage said guides, thus insuring that the hoisting frame 270 is guided throughout its travel, both downwardly and upwardly.

While four guide channels 351 and corresponding supporting columns 352 may be provided for each stall, it is sufficient to provide four of said channels and columns for each adjacent pair of said stalls, as shown in Fig. 1, so that each stall has two guide channels 351 and supporting columns 352 therefor. This arrangement is shown further in Fig. 13. It will be seen that engagement of the two channels 351 in Fig. 13 by the corresponding wheels 349 suffices to guide the hoisting frame vertically into and out of a stall, and that lateral movement of said hoisting frame is prevented by the side flanges 351′ of said guide channels 351 in cooperation with the sides of said wheels 349. It will also be understood that each of the platforms 29 and 49 is provided with a pair of said guide channels 351 and supporting members 352, as shown in Fig. 1.

The hoist car

The hoist car 38 (Figs. 9–12) may conveniently comprise longitudinal and transverse beams, welded, riveted, or otherwise secured together to provide a suitable framework for supporting the drums, motors, and other elements of the hoist car mechanism hereinafter described.

As previously noted, the hoisting cables 290, 341, 343, and 344, and the release cables 336 and 340, extend from the hoisting frame to drums on the hoist car 38. As shown in Fig. 9, two drums, 337 and 353, may be employed. The hoisting cables 290 and 341 are wound around and secured to drum 337, one being wound around the top of the drum and the other around the bottom, so that on rotation of said drum in one direction both cables will be shortened, with simultaneous raising of their ends attached to the hoisting frame; while on rotation of the drum in the opposite direction both said cables 290 and 341 will be lengthened, with simultaneous lowering of their aforementioned ends. The hoisting cables 343 and 344 are likewise wound around and secured to the drum 353, one being wound around the top of said drum and one around the bottom.

Said drums 337 and 353 are secured to the same shaft 354, so as to rotate in unison. For rotating said shaft, the said shaft may be operated by a single motor, or, if a plurality of motors are preferred, the arrangement illustrated in Fig. 9 may be employed. As there shown, said shaft 354 may carry sprocket wheels 355, 356, driven through chains 357, 358, from sprocket wheels 359, 360, respectively. Said sprocket wheels 359, 360 may in turn be operated by motorized gear-reducer units; one comprising a motor 361 and gear reducing mechanism 362, and the other a motor 363 and gear reducer 364. Said units may also include conventional braking mechanisms 365, 366, mechanically applied and electrically released.

The shaft 354 provides a positive connection between the two drums, insuring that all four hoist cables 290, 341, 343, and 344 travel at the same rate of speed and through the same distance so that the dolly engaged by the hoisting frame will remain level at all times during its ascent and descent.

As previously observed, the coupler release cable 336 is also wrapped around and secured to the drum 337. This cable is so wound around said drum that, when the latter is turned in the direction for unwinding the cables 290 and 341, the cable 336 is also unwound, permitting the yoke 332 and associated cables 330, 334, to move downwardly with the hoisting frame without imparting rotation to the associated coupler tubes 282. The release cable 340 is also so wrapped around and secured to drum 353 that, when the latter is turned in the direction to unwind cables 343 and 344, said cable 340 is likewise unwound, permitting the hoisting frame to descend without imparting rotation to the coupler tubes controlled by that cable. Conversely, when the hoisting frame is raised by rotation of the drums 337, 353, the cables 336 and 340 are likewise raised, insuring against rotation of the coupler tubes 282 during the ascent of the hoisting frame.

When the drums 337 and 353 have been rotated sufficiently for the lugs 298 of the coupler tubes to pass through the passages 266 into the lower portions of the sockets of a dolly to be hoisted, the rotation of said drums is stopped. The cables 336 and 340 are then operated to rotate the coupler tubes sufficiently to move said lugs 298 beneath the ledge portions 320 and 321 (Figs. 26 and 27) into the portions of the recesses 312 and 313 (Figs. 26 and 28) beyond said ledge portions in the respective dolly sockets. For this purpose the following means may be employed.

In passing from the yoke 332 to the drum 337, the cable 336 passes over a series of sheaves 375, 376, and 377, as shown in Figs. 9, and 30–32. Said cable first passes over the vertical sheave 375, then over the intermediate sheave 376, and then over sheave 377 and thence to the drum 337. The intermediate sheave 376 is floatably mounted with respect to the sheaves 375 and 377, for which purpose said sheave 376 is shown mounted in a casing 378 the opposite side walls of which are grooved for slidable engagement with tongues 379 (Figs. 30 and 32) projecting from brackets 380. Thus, the casing 378 and its intermediate sheave 376 may be moved longitudinally along said bracket tongues 379. The assembly of sheaves and brackets above described is mounted on the hoist car.

Integral with or secured to one end of said casing 378 is a head 381 having an interior passage which has threaded engagement with a screw shaft 382 driven by a motor 383 through a conventional gear reduction unit 384.

With the casing 378 and sheave 376 in its normal position, the cable 336 simply unwinds from the drum 337, together with cables 290 and 341, during the descent of the hoisting frame for engagement with a dolly, during which descent no rotation is imparted to the coupler tubes 282. When, however, said tubes 282 have been fully lowered into the dolly sockets, with the lugs 298 in the lower portions of said sockets, the rotation of the drum 337 is terminated and the motor 383 is set into operation in the appropriate direction for moving the casing 378 and sheave 376 towards said motor 383. The yoke 332 is thereby drawn upwardly, raising the attached ends of the cables 330 and 334, with consequent rotation of the associated coupler tubes 282 to turn their lugs 298 beneath the socket ledge portions 320, 321 (Figs. 26 and 27) and into the portions of the recesses 312 and 313 (Figs. 26 and 28) beyond said ledge portions.

The coupler operating cable 340 which is wound around the drum 353 passes over a series of sheaves similar to the sheaves 375–377 above described and mounted on the opposite side of the hoist car 38. These sheaves and associated parts are designated by the same numerals as said sheaves 375–377 and their associated parts, with a prime added. The casing 378' which carries the floating sheave 376' has a head 381' which is provided with an interior passage threadedly engaging a screw shaft 382' driven by the same motor 383 which drives the screw shaft 382. The threads of the screw shaft 382' run in the opposite direction to those of the screw shaft 382, as a result of which the rotation of said screw shafts in the same direction by the motor 383 will operate the sheave casings 378 and 378' in opposite directions. In other words, when the motor 383 turns in the direction for drawing the sheave 376 toward said motor, the sheave 376' will likewise be drawn toward said motor simultaneously, and all four of the coupler tubes 282 will be rotated concurrently to bring their lugs 298 into the portion of the aforementioned dolly socket recesses 312 and 313 which lie beyond the ledge portions 320 and 321.

Thus through the mechanism above described the coupler tubes are rotated simultaneously to position the lugs 298 with respect to the dolly sockets for interlocking therewith.

The hoisting motors 361 and 363, which were deenergized while motor 383 was operating, are now energized to operate the drums 337 and 353 in the direction opposite to their previous rotation. Said drums thus now raise the hoisting frame, bringing the coupler tube lugs 298 into engagement with the under surfaces 325, 326 of the ledges 317, 319 in the dolly sockets, at which time said lugs are locked against rotation in the dolly since one lug of each pair is positioned between the dolly socket shoulders 311, 322 (Fig. 27) and the other between the shoulders 316 and 323, as previously pointed out. As the motors 361 and 363 continue their operation, the hoisting frame and dolly, together with the automobile on the dolly, are raised until the upper ends 300 of the coupler tubes 282 of the hoist frame are fully engaged with the previously mentioned hoist car sockets 301. Said hoist motors 361 and 363 are now deenergized.

To insure against rotation of the drums 337, 353 in the direction for lowering the dolly and automobile, under the weight thereof, said drums may be locked in any suitable manner. For instance, they may be driven from the motors 361, 363 by worm gearing which holds the drums against rotation when the motors are deenergized. When worm gearing is not used for operating the drums, any other convenient rotatation-preventing means may be employed, such as a pawl 390 (Figs. 9 and 10) engageable with a ratchet wheel 391 secured to the drum shaft 354. Said pawl may be normally maintained in engagement with said ratchet wheel by a spring 392. When so engaged, said pawl prevents rotation of the drums in the direction for lowering the hoisting frame, though permitting the drums to rotate in the opposite direction. When it is desired to free the drums for rotation to lower the hoisting frame, a solenoid 393 is energized. The core of said solenoid is connected to an arm 394 of said pawl, and, when energized, retracts said pawl from engagement with ratchet wheel 391. Said solenoid may be energized immediately before, or substantially concurrently with, the starting of the motors 361, 363 in the direction for lowering the hoisting frame.

When said motors are operated in the direction for lowering the hoisting frame and attached dolly and automobiles, the coupler tubes 282 connected to the hoist cables 290, 341, 343, and 344 descend in unison as said cables are unwound from the drums 337 and 353. The cables 336 and 340 are concurrently unwound from said drums so that no rotation is imparted to said coupler tubes during said descent of the hoisting frame and attached elements. When the dolly is deposited in its receiving station, the hoisting frame moves further downwardly a slight distance, so that the lugs 298 of the coupler tubes 282 descend into the lower portions of the dolly sockets, clearing the lower edges of the ledge projections 320 and 321 in said sockets. The motors 361 and 363 are now again deenergized, and motor 383 is energized for operation in the direction for moving the sheaves 376 and 376' away from said motor. Slack is thus produced in the cables 336 and 340, which slack is taken up by spring 333 (Fig. 3) and the corresponding spring associated with cable 340 on the opposite side of the hoisting frame. Said springs were tensioned during the previous movement of the sheaves 376, 376' toward the motor 383; and, upon the reverse movement of said sheaves by said motor, said springs operate the cables attached thereto to rotate the coupler tubes 282 in such direction as to bring the lugs 298 into alignment with the passages 266 in the dolly sockets. The motor 383 is then deenergized and motors 361 and 363 are energized to operate in the direction for raising the hoisting frame. The coupler tubes are thus lifted out of the dolly sockets, freeing the hoisting frame from the dolly, and the raising of said hoisting frame continues until the upper ends 300 of the coupler tubes 282 are firmly engaged with the sockets 301 on the hoist car. The motors 361 and 363 are then deenergized, and the locking of the hoisting frame to the hoist car is insured by the engagement of pawl 390 with ratchet wheel 391, the solenoid 393 having previously been deenergized.

It has previously been pointed out that the hoist car is carried by a pair of overhead rails on a transfer car and is movable from the transfer car on to overhead rails 47 (Fig. 1) to pick up or deliver an automobile in a desired stall. As shown in Figs. 6, 9, 11, 23, and 24, the hoist car is provided with pairs of wheels engaging the rails 395, 395 which are carried by the transfer car.

More specifically, as shown in Figs. 9 and 23, a wheel 396, engageable with one of said rails 395, is rotatably mounted on a stud shaft 397 fixed in a bracket 398 secured to a cross piece 399 at one side of the front end of the hoist car framework. Said cross piece may be mounted in any suitable way, as by a pivot pin 401, on beams 402, 403 of said framework. Antifriction bearings 405, 406 may be interposed between said stud shaft and said wheel, as shown.

Another wheel 407 is keyed or otherwise secured to a drive shaft 408 rotatably mounted in a bearing portion 409 of a bracket 410, which bracket is also fastened to said cross-piece 399. Antifriction bearings 411, 412 may, as shown, be positioned between said bearing portion 409 and said shaft 408. Through a nut 413 engaging a threaded portion of the shaft 408, said shaft may be positioned longitudinally to cause the wheel 407 to engage the adjacent lower flange of rail 395. Said shaft 408 is driven by a motor 414 (Fig. 9) through a gear reduction unit 415 and a shaft 416, connected to said shaft 408 and unit 415 by universal couplings 416', 416''. A conventional mechanically-applied electrically released brake mechanism 417 may be interposed between said motor 414 and said gear reduction unit 415.

It will be noted that the pivot pin 401 permits the cross-piece 399 and attached brackets 398 and 410 to pivot about the axis of said pin, so that the load on the wheels 396 and 407 will be equalized and both wheels will bear equally on the rail flanges.

At the opposite side of the front end of the hoist car there are provided wheels 420, 421, for engagement with one of the rails 395. The idler wheel 420 may be mounted in the same manner as wheel 396, through a stud shaft in a bracket 420' secured to cross-piece 420'' mounted through a pivot pin between beams 403 and 403'. The wheel 421 may be mounted in the same manner as wheel 407, through a shaft 422 in a bearing bracket 422' secured to said cross-piece 420''. The shaft 422 to which wheel 421 is secured may be driven from motor 414 through a universally coupled shaft 423.

The rear end of the hoist car is provided at one side with wheels 424, 425 for engaging one of the rails 395, and at the opposite side with wheels 426, 427 for engaging the other of said rails. It will be apparent that, if desired, two of these wheels, i. e. 425 and 426, may be operated by the motor 414 through suitable shafting or by another motor, so as to be power driven concurrently with the wheels 407 and 421. However, said wheels 424—427 may alternatively be simply idlers, rotatably mounted on bracket-supported stud shafts, in the same manner as previously described in connection with wheel 396. Thus, the wheels 424, 425 may be rotatably mounted on stud shafts in the respective brackets 424', 425', which are secured to cross-piece 424'' mounted through a pivot pin between the beams 441, 442 of the hoist car frame-work. Likewise the wheels 426, 427 may be rotatably mounted on stud shafts in the respective brackets 426', 427' which are secured to cross-piece 426'' pivoted to beams 441 and 443.

Means are provided for locking the hoist car 38 to the transfer car 37 so that movement of the hoist car with respect to said transfer car is prevented during the travel of said transfer car along the rails 30. For that purpose, the hoist car carries a pair of plungers 428 and 429, movable vertically in brackets 430 and 431 respectively. Said plungers have rack teeth engaged by pinions 432 and 433, respectively, which pinions are secured to a shaft 434 driven by a motor 435 through a suitable reduction gear unit 436. When the hoist car is in position on the transfer car, the motor 435 is energized for operation in the proper direction to project said plungers 428, 429 into engagement with overlying sockets 437, 438 (Figs. 4, 5, and 33) on the transfer car. Said sockets may be outwardly flared, as shown, to assist in aligning the hoist car properly when said plungers are projected.

When the transfer car has moved along its overlying rails to bring the hoist car opposite the desired row of stalls I–VI (Fig. 1), the motor 435 is operated in the direction for retracting said plungers, releasing the hoist car for movement along the stall rails 47 at either side of the transfer car rails 395. When the hoist car is moved along the stall rails to the proper position above the desired stall, motor 435 is again operated, as soon as the drive-motor 414 stops, to project said plungers 428, 429, into the flared or funnel-shaped sockets 439, 440 (Figs. 34–36) positioned on the framework of said stall above said plungers, as hereinafter more specifically described. When the plungers are partly engaged with said sockets (or with the transfer car sockets 437, 438) the brake 417 associated with the motor 414 is released, allowing the hoist car to move horizontally sufficiently for said plungers to enter said sockets fully, after which said brake is reapplied. When said plungers are fully engaged with the sockets, the hoist car is prevented from moving horizontally while the hoisting frame is being lowered into a stall to deposit or pick up a dolly. It will be understood that each stall in aisles A, C, D, and F in Fig. 1 is provided with a pair of said sockets 439, 440 for engagement by hoist car aligning plungers.

It will also be understood that when an automobile is to be delivered to or picked up from a stall in the aisle over which the transfer car is movable, as, for instance, if an automobile is to be delivered to stall 64 in aisle E, the hoist car need not move horizontally, but simply remains attached to the transfer car during the movements of the hoisting frame. The same is true with respect to the platforms 29 and 49. Thus no sockets 439 or 440 need be provided for either of said platforms, or for any of the stalls in aisles B and E.

*Alternative means for rotating the hoist frame tubes*

An alternative arrangement for rotating the tubes 282 to lock or unlock the hoist-frame with respect to the dolly is shown in Figs. 41 and 42. In this embodiment, the tubes 282 in the hoist-frame corner-posts 271 and 274 have levers 590, 591 (Fig. 42) secured thereto and connected by a link 592. The tube 282 in the corner post 272 of the hoist-frame has a lever 593 fastened thereto, which lever is connected by a link 594 with a lever 598 which is fastened to the tube 282 in the corner post 271. Another lever 595, secured to the tube 282 in corner post 272, is connected by a link 596 to a lever 597, fastened to the tube 282 in the corner post 273.

The cable 336, which extends from the hoist car drum 337 over pulleys 377, 376, 375, and 331, is connected to the lever 590. The cable 340, which extends from drum 353 over pulleys 377', 376', 375', and 331', is connected to the lever 595. In this embodiment, the shafts 382 and 382', connecting the motor 383 and gear unit 384 to the mountings for the floating pulleys or sheaves 376, 376', are threaded in the same direction so that said floating sheaves are moved concurrently in the same direction by said motor. When it is desired to rotate the coupler tubes in the direction to bring their lugs 298 into locking relation to the dolly sockets, the motor 383 is energized to move the mountings of the floating sheaves 376, 376' in the direction of the arrows shown in Fig. 41. Thereby, the cable 336 is tensioned and concurrently slack is provided in the cable 340. The lever 590 and tube 282 in corner-post 271 are turned counter-clockwise by the cable 336, and concurrently the levers 591, 593, 595, 597 and 598 and associated tubes 282 are turned counter-clockwise by the interconnected links, so that all of the tubes 282 are turned in unison into coupling position.

Conversely, when the tubes 282 are to be uncoupled from the dolly sockets, the motor 383 is energized to operate in the opposite direction, moving the floating sheaves 376, 376' in the direction opposite to that indicated by the arrows in Fig. 41. Tension is thus applied to the cable 340 and concurrently slack is provided in cable 336, so that the tubes 282 are rotated clockwise.

It will be seen that, in the construction above described, rotation is imparted positively to the tubes 282 for both the coupling and uncoupling operations, without reliance upon the action of any spring.

THE TRANSFER CAR

The transfer cars 37 and 37' may be of identical construction. Hence a description of the car 37 (shown particularly in Figs. 4–6) will be sufficient.

As shown in Fig. 4, the transfer car 37 comprises longitudinal and transverse beams welded, riveted, or otherwise secured together to form a suitable framework. Mounted on said frame are pairs of wheels engaging the overhead rails 30 which are suitably supported above the aisle B.

More specifically, a pair of wheels 444, 445 are shown in Figs. 4–6, engaging one of said rails.

These wheels are positioned near one side of the front end of the transfer car and may be mounted in the same manner as previously described in connection with the hoist car wheels 396 and 407, respectively. Thus, the idler wheel 444 may be rotatably mounted on a stud shaft 446 in a bracket 447, which bracket is bolted or otherwise secured to a crosspiece 448 which in turn may be mounted through a pivot pin 449 (Fig. 5) on the beams 450, 451 of the transfer car framework.

Wheel 445 may be secured to a shaft 452 rotatably mounted in a bearing portion 453 of a bracket 454 bolted or otherwise fastened to said cross piece 448. Said shaft 452 is driven by a motor 455 through universally-coupled shafts 456, 457, and a conventional gear reduction unit 458. A conventional mechanically applied electrically released brake mechanism 455A may be interposed between said motor 455 and said gear reduction unit 458.

Another pair of wheels 459, 460 are mounted near the opposite side of the front end of the transfer car, and engage the adjacent one of the rails 30. The idler wheel 459 may be mounted, in the same manner as wheel 444, on a stud shaft 462 and bracket 463, which bracket is secured to a cross-piece 464 mounted through a pivot pin 465 (Fig. 6) on the beams 450 and 451. The wheel 460 may be mounted, in the same manner as the motor-driven wheel 445, through a bearing bracket 461 (Fig. 4) secured to said cross-piece 464, and may be driven from the reduction gear unit 458 through the universally-coupled shaft 466.

The rear end of the transfer car is provided at one side with wheels 467, 468 for engaging one of the rails 30, and at the opposite side with wheels 469, 470 for engaging the other of said rails. If desired, two of these wheels, i. e., 467 and 470, may be operated by the motor 455, through suitable shafting, or by another motor, so as to be power driven concurrently with the wheels 445 and 460. However, said wheels 467—470 may alternatively be simply idlers, rotatably mounted on bracket supported stud shafts, in the same manner as previously described with respect to the other idler wheels. Thus, the wheels 467, 468 may be rotatably mounted on stud shafts in the respective brackets 471 and 472, which brackets are secured to a cross-piece 473 mounted through a pivot pin on the beams 474 and 475 of the transfer car framework. Similarly, the wheels 469, 470 may be rotatably mounted on stud shafts in the respective brackets 476, 477, which are secured to cross-piece 478 mounted through a pivot pin on the beams 474 and 479 of said framework.

The previously mentioned sockets 437, 438, which receive the hoist car plungers 428, 429, may, as shown in Figs. 4, 5, and 33, be formed through brackets mounted on cross beams 480, 481 (Fig. 4) of the transfer car. Thus the socket 437 may be formed by blocks 482 and 483 (Fig. 33) which extend downwardly from brackets 484 and 485, respectively, and are outwardly flared below said brackets. Similarly, the socket 438 may comprise blocks 486 and 487 extending downwardly from brackets 488, 489 and outwardly flared below those brackets.

Means are provided for locking the transfer car in position opposite any stall on either side of its line of travel, with its hoist car rails 395 in alignment with the hoist car rails 47 of said stall. For that purpose a pair of aligning plungers 490, 491 are slidably mounted in one end of the transfer car, and another pair 492, 493 in the other end of said car.

As shown in Figs. 7 and 8, the plunger 491 is provided with side projections or tongues 494, 495 engaging grooves in supporting blocks 496, 497 fastened in a channel 498 welded or otherwise secured to the end beam 499 of the transfer car framework. On its upper side said plunger has rack teeth 500 which engage a pinion 501 secured to a shaft 502. The latter is journaled in bearings 503, 504 fastened to the supporting blocks 496, 497, as shown in Fig. 8.

The plunger 492 is slidably mounted in the opposite side of the transfer car, in the same manner as plunger 491. Said plunger 492 also has rack teeth engaged by a pinion 505, on a shaft 506 mounted similarly to the aforementioned shaft 502. Said shafts 502 and 506 are driven by a motor 507 through universally-coupled shafts 508, 509, and 510, and a suitable bevel or worm gear unit 511.

Similarly, the plungers 490 and 493 may be slidably mounted in the same manner as plungers 491 and 492, and may be provided with rack teeth for engagement with pinions 512, 513, driven from motor 507 through universally-coupled shafts 514, 515, 516, and gear unit 517.

Through this arrangement it will be apparent that when the motor 507 is operated in one direction, the plungers 490—493 are simultaneously retracted to positions within the transfer car, as illustrated in connection with plungers 491 in Fig. 7. When, on the other hand, said motor 507 is operated in the opposite direction, said plungers are simultaneously moved outward into the positions shown in Figs. 4 and 5.

In their outward positions, the plungers are adapted to engage sockets 518 (Figs. 1, 4, 7, and 34) mounted on the frame-work of stalls opposite the path of travel of the transfer car. These sockets, as shown, may be formed of metal and suitably flared at their outer ends. Such sockets are provided adjacent the stalls along opposite sides of the paths of travel of the transfer cars, and also adjacent the platforms 29 and 49. Upon engagement of plungers with sockets 518 at opposite sides of a transfer car, as shown in Fig. 1, the car is locked in alignment with the desired stall in which an automobile is to be deposited or from which an automobile is to be removed. For instance, in Fig. 1, the transfer car 37 is locked in alignment with the stalls 26 and 46, with its rails aligned with the hoist car rails 47 in those stalls. At the same time, said transfer car is directly over stall 36 in aisle B.

While four aligning plungers are provided on the transfer car, only two are engaged with aligning sockets for each position of the car along its aisle. The plungers and sockets 518 are so located that plungers 492 and 493 are used for aligning the car at platform 49, row 1, row 3, and row 5; while plungers 491 and 494 are used for aligning at row 2, row 4, and row 6.

It will, of course, be understood that the transfer car brake mechanism 455A like the hoist car brake mechanism 417 previously described may be released when the locking plungers are partly engaged with the associated aligning sockets to enable said plungers to enter said sockets fully, and may then be reapplied.

As above noted, the transfer car 37' may be of the same construction as the transfer car 37. In Fig. 1, car 37' is locked with its rails in alignment with the hoist car rails 47 in the stalls 56 and 76; said car 37' being at the same time directly over stall 66 in aisle E.

Stall framework

A specific example of a stall framework which may be employed for the stalls is shown in Figs. 34–37. By way of illustration, there are shown in Fig. 34 the two stalls designated 55 and 56 in Fig. 1, together with portions of the stalls 45, 46, 65 and 66. The top of the framework for said stalls 55 and 56 may comprise front and rear I-beams 520, 521 suitably secured as by rivets, bolts, or otherwise, to vertical supports 522, 523, 524, and 525. Each of said vertical supports may conveniently comprise a pair of channel beams secured together to form an H-column section; the support 522, for example, being illustrated as formed of channel beams 522′, 522″. Extending transversely of the front and rear beams 520 and 521, and suitably secured thereto, are other I-beams 526, 527, and 528. Each of the last-mentioned beams carries one of the hoist car rails 47, through suitable supporting brackets such as shown at 529 in Figs. 36 and 38. Each of said brackets may comprise an upper plate 530 having ears 531 overlying the lower flange of an I-beam 526, 527, or 528; and a lower plate 532 having ears 533 underlying the upper flange of a rail 47. Said upper and lower plates 530 and 532 are connected by bolts 534 through which the distance between the rail and its supporting I-beam may be adjusted as desired.

It will be seen that the beams 526, 527, and the portions of the beams 520 and 521 extending therebetween, form the boundaries of the upper end of the space comprising the stall 56. Similarly the beams 527, 528 and intervening portions of beams 520, 521, define the upper boundaries of the stall 55. It will be apparent that beams 520′ and 521′ (Fig. 37), similar to the beams 520 and 521, may extend between the vertical supporting columns at the bottoms of the stalls 55 and 56, and that beams similar to the beams 526–528 and directly underlying the same may extend between said beams 520′ 521′, at the bottom of said stalls. Thus, in Fig. 37, the beam 526′ is shown directly beneath the beam 526 and extending between the beams 520′ and 521′.

Extending between the beams 526 and 527 of stall 56 and secured thereto, are pairs of channel beams 535–536, and 537–538. Welded or otherwise secured to the bottoms of the beams 535 and 536 are brackets 539 and 540 from which extend the flared members forming the previously mentioned sockets 439 and 440, which are adapted to receive the plungers 428 and 429 on the hoist car.

Also mounted between the channel beams 535 and 536, as well as between the channel beams 537 and 538, are blocks 542 of rubber or other suitable elastic material forming seats for the dolly, cushioning the latter when it is lowered thereon. Blocks 543 are also secured between the channel beams of the respective pairs 535–536 and 537–538, each of which blocks has a pin 544 projecting upwardly therefrom. The pins 544 are adapted to enter the sockets 255, 256 (Fig. 17) in a dolly when the dolly is lowered on to the seats or cushions 542, whereby the dolly is locked against longitudinal or transverse movement in the stall, and its hoist-frame-receiving sockets 265 are maintained in proper position for receiving the hoist-frame coupling tubes 282 when the hoist frame is lowered into the stall to remove the dolly.

It will be noted that the cushioning blocks 542 and dolly locating-pins 544 above described extend upwardly from the aforementioned pairs of channel-beams 535–536 and 537–538, which extend over the top of the stall 56. In that connection it will be understood that the vertical columns 522–525 may extend upwardly to whatever height may be desired for supporting groups of stalls at different levels. The blocks 542 and pins 544 extending above the stall 56 thus serve to receive a dolly in the stall immediately overlying said stall 56. The beams 520, 521, 526, 527, and 528, and the pairs of beams 535–536 and 537–538, above described, thus not only form the top of the stall 56 but also form the bottom of said immediately overlying stall. Similar beams may likewise form the top of said overlying stall, as will be apparent.

It will further be obvious that other pairs of channel beams, like the pairs of beams 535–536 and 537–538, may be located directly under the at the bottom of the stall 56; said other pairs of channel beams extending between the beam 526′ and the corresponding I-beam immediately below beam 527. Such channel beams at the bottom of said stall 56 may likewise be provided with cushioning blocks 542 and dolly aligning pins 544; but, assuming the stall 56 to be on the lowest parking floor, it will be apparent that neither pair of said bottom channel beams should be provided with the depending sockets 439 and 440 above described in connection with the pairs of channel beams at the top of said stall.

Pairs of channel beams 545–546 and 547–548 are also shown extending over the top of the stall 55 between the I-beams 527 and 528, said pairs of channel beams likewise having cushions 542 and pins 544 for receiving a dolly in the overlying stall, and one of the pairs having depending sockets 439, 440 for receiving aligning plungers on the hoist car. Stall 55, like stall 56 and each of the other stalls on the first floor, may also have similar beams at its bottom, with dolly-receiving cushions and aligning pins.

It will be apparent that the framework for the remaining automobile-receiving stalls on the first parking floor may be constructed as above described in connection with the stalls 55 and 56. For instance, I-beams 550, 551, and 552 are shown in Fig. 34 at the tops of the stalls 46 and 45, said beams extending to the left from the beam 521 and being aligned with the respective beams 526–528. Likewise, beams 553, 554, and 555 extend at the top of the stalls 66 and 65, said beams projecting to the right from the beam 520 and being aligned with said beams 526–528. It will be noted that the vertical supporting columns 522–525 serve to support not only the framework of the stalls 55 and 56, but also the adjacent ends of the framework for stalls 45, 46, 65, and 66; the beam 521 further forming an end of four stalls (i. e., 45, 46, 55, and 56) and the beam 520 forming an end of stalls 55, 56, 65, and 66. As many vertical supports and horizontal beams may be provided as are required for the desired number of stalls; and it will further be apparent that upper floors of stalls may be provided through similar framework supported by the vertical supporting columns.

Of course, the stalls in the aisles B and E (Fig. 1) require no hoist car rails, since the hoist car is transported to any desired stall in those aisles by the transfer car 37 or 37′. The transfer car rails 30 and 30′ may be supported from the I-beams at the tops of the stalls in said aisles B and E in any suitable manner, as by brackets or by being riveted or welded to said beams, as will be obvious. For instance, in Fig. 5, the I-beam 553 (located at the top of the stall 66) is shown directly supporting the rails 30 for the transfer car 37.

The previously mentioned aligning sockets 518 for receiving the transfer car plungers 490, 491, and 492, 493 may be conveniently constructed and arranged as illustrated in conjunction with the sockets 518 shown in Figs. 1, 4, 7, and 34. Said sockets 518, formed of metal or other suitable material, are riveted or otherwise secured to any suitable portion of the framework, such as the vertical supporting columns. As heretofore noted, the outer ends of the sockets are flared to enable the transfer car to be accurately positioned, with its hoist car rails 395 in alignment with the hoist car rails 47 in the stalls on opposite sides of the aisle in which the transfer car is movable. The sockets 518 for positioning the transfer car 37' over the platform 29 may, as shown in Fig. 1, be mounted on vertical columns 558 adjacent said platform; while the sockets for positioning the transfer car 37 over the platform 49 may similarly be mounted on adjacent vertical columns 559.

It has been noted that four of the guide channels 351, for the hoisting frame 270, may be provided for each adjacent pair of automobile stalls, so that each stall has two of said guide channels. In Fig. 34, there are shown four of said guide channels 351 for the stalls overlying the two adjacent stalls 55 and 56. Likewise, four guide channels are provided for said adjacent stalls 55, 56; two of said channels being positioned below the beam 526 and two below the beam 528. In Fig. 37, channels 351 are shown extending upwardly from beams 526', 550', and 553'. The guide channels shown in Figs. 34 and 37 may be supported in any suitable manner from the vertical supports 522—525. For instance, the vertical column 522 may carry a beam 560 having a pair of arms 561, 562 extending transversely therefrom and suitably braced through struts 563, 564. Arm 561 has secured thereto the vertical guide channel 351 for one end of the stall 56, while arm 562 has secured thereto the guide chanel 351 for an end of the stall 66. A similar arrangement is illustrated in conjunction with the vertical column 525, which carries guide channels for adjacent ends of the stalls 56 and 46. It will, of course, be understood that the vertical columns, such as columns 522 and 525, may extend upwardly for the height of a plurality of superposed stalls; and that each column may carry one or more pairs of arms 561, 562, for adjacent stalls of each tier, so that each such column supports a pair of guide channels 351 for adjacent ends of stalls in each tier.

The vertical column 523 may carry beams for mounting four guide channels 351. As shown, said support 523 has secured thereto a pair of beams 565, 566 which in turn support arms 567 and 568. Arm 567 has fastened thereto a pair of guide channels 351, one for one end of the stall 55 and another for one end of the adjacent stall 54. Arm 568 similarly has secured thereto two guide channels 351, one for one end of stall 65 and the other for an end of the adjacent stall 64. A similar arrangement is shown in connection with the vertical column 524, which supports guide channels for adjacent ends of stalls 44, 45, 54, and 55. Each vertical column of the type illustrated at 523 and 524 may also extend upwardly along a plurality of superposed stalls and may each carry one or more pairs of beams 565, 566 and arms 567, 568 for stalls of each tier, so that each column may support guide channels 351 for adjacent ends of stalls in each tier.

It will be apparent that the arrangements for supporting the hoisting frame guide-channels 351 may be varied as desired, to accommodate the desired number of channels on any vertical supporting column. In Figs. 1, 3, and 13, each of the vertical columns 352, 352 adjacent the platform 29 as well as each of the columns 352', 352' adjacent the platform 49, may support three guide channels 351, and are accordingly so shown. Thereby, a single pair of vertical columns may support the guide channels for platform 29 and adjacent ends of stalls 51, 61, and 71; while another pair of vertical columns may support the channels 351 for platform 49 and adjacent ends of stalls 21, 31, and 41. The vertical columns at the left hand ends of the stalls 21 and 26 in Fig. 1, as well as those at the right hand ends of the stalls 71 and 76, need each carry only one guide channel 351.

The vertical column 570 (Fig. 1) between the stalls 22 and 23, and likewise the vertical column 571, between the stalls 24 and 25, may each carry brackets, arranged in the manner shown in Fig. 39, for supporting a pair of guide channels 351. In Fig. 39, there are shown attached to one side of the column 570 a beam 572 and arm 573, the latter being secured to the guide channel 351 for an end of the stall 22, and being braced by a suitable strut 574. Attached to the opposite side of said column 570 are a similar beam 575 and arm 576, the latter carrying the guide channel 351 for an end of the stall 23, and being braced by strut 577. The column 571, between stalls 24 and 25, column 578 (Fig. 1) between stalls 72 and 73, and column 579, between stalls 74 and 75, may carry guide-channel supporting-means similar to that above described with respect to column 570.

While, if desired, separate vertical supporting columns may be provided for the guide channels 351 of the platform 29, in addition to vertical supporting columns for the guide channels 351 in adjacent ends of the stalls 51, 61, and 71 (Fig. 1), it has been previously noted that a single pair of vertical supports may be provided for those guide channels. Thus, as shown in Fig. 40, a single vertical support 352 is arranged to carry the guide channel 351 at one end of platform 29, through beam 582, and arm 583, braced by strut 584. The same vertical support also carries the guide channels 351 at adjacent ends of the stalls 51 and 61, through beam 585 and arms 586, 587, braced by struts 588, 589. It will likewise be evident that the guide channel 351 at the opposite ends of platform 29, and the guide channels 351 for adjacent ends of stalls 61 and 71, may be carried by a single vertical column in a manner similar to that illustrated in connection with column 352. In like manner, a single pair of vertical columns (indicated at 352', 352' in Fig. 1) may carry the guide channels 351 for the platform 49, together with the guide channels 351 for adjacent ends of the stalls 21, 31, and 41.

It will be apparent that any of the previously described vertical columns may extend upwardly along a plurality of tiers of of superposed stalls; and that each column may have a plurality of sets of guide-channel supporting beams secured thereto along its length for supporting guide channels for adjacent stalls in each of said tiers.

*The platform 49*

The platform 49 which receives automobiles from the stalls for delivery to their drivers may be constructed in the same manner as above described with respect to the platform 29, except that plungers for operating the rear dolly chocks may be omitted since only the front chocks of the dolly on platform 49 need be lowered to permit an automobile to be driven off the dolly.

In other words, platform 49 may comprise the same supporting framework as shown in Figs. 3, 19, and 20, for platform 29. It may also be provided with a motor and connections for operating dolly locating pins and chock-controlling plungers, which motor and connections may be the same as the motor 250 and connections for operating the pins 257 and plungers 231 (as shown in Figs. 3 and 18–22) for the platform 29, except that no plungers need be provided at platform 49 for the rear chocks of the dolly. When a dolly with an automobile thereon is lowered on to the platform 49, and the hoist frame is disengaged from the dolly and returned into engagement with the hoist car sockets 301, the motor adjacent the platform 49 is energized in the direction for raising the dolly locating pins together with the plungers below the weighted levers 224 (Figs. 21 and 22) for the front chocks 211 of the dolly. Through the engagement of said locating pins with the dolly sockets 255 and 256 (Fig. 17) the dolly is locked against longitudinal or transverse movement with respect to the platform 49; while, through the raising of said plungers, the front chocks of the dolly are lowered. The automobile may now be driven off the dolly and thence out through the exit opening 19a (Fig. 1).

As soon as the automobile is driven off the dolly on the platform 49, the motor associated with said platform is energized to operate in the reverse direction, withdrawing the locating pins from engagement with the dolly sockets and lowering the chock-controlling plungers so that the forward chocks of the dolly swing back to their raised position. The dolly may now be transported back to the receiving station.

As previously noted in connection with the platform 29, when the dolly is deposited on the platform, and removed therefrom, by merely a vertical movement, the dolly locating pins may be fixed in position. However, to enable the dolly to be moved horizontally to and from the platform, in case such may be desired, the pins may be mounted movably as hereinbefore described. With such an arrangement the dolly may be placed on, or removed from, the platform by either a vertical movement, or a horizontal movement, or a combination of such movements. Similar comments apply, of course, to the platform 49.

*Alternative form of aligning sockets*

In lieu of the aligning plunger sockets 437—440, or 518, hereinbefore described there may be employed the modified form of socket shown at 600 in Figs. 43 and 44. This modified form of socket comprises brackets or angle plates 601, 602, which carry pins 603, 604 on which are mounted guide rollers 605, 606. Said rollers are spaced apart a distance sufficient to engage opposite sides of an aligning plunger, such as that shown at 428', corresponding to plunger 428 or 429 on the hoist car, or to any of the plungers on the transfer car. The tip of said plunger 428' is beveled, as shown, to assist in aligning the hoist or transfer car properly when said plunger is projected.

CONTROL OF TRANSFER AND HOIST CARS

Provision may be made for placing the transfer and hoist cars under the control of a single operator, who may be located at any desired position on the parking floor over which said cars are movable. An example of an electrical control system suitable for this purpose is illustrated in Figs. 45–62B and will now be described.

*Power supply to transfer and hoist cars*

As shown in Figs. 45–47, the stall aisles B and E may be provided with groups of feeder or power supply rails, generally designated B' and E' respectively. These feeder rails extend the full length of said aisles, including the respective delivery and receiving stations, as shown in Fig. 45. The feeder rails E' may, for example, be carried by one or more suitable supports 160, mounted on the stall framework between the supporting rails 30 of the "receiving" transfer car 37. As shown in Fig. 46, said supports 160 may conveniently be mounted on the beams (such as shown at 553, 554, and 555, Figs. 5 and 34) at the tops of the stalls in aisle E, from which beams the transfer car rails 30 depend. The feeder rail supports 160 should, of course, comprise insulating material so that the feeder rails E' will be insulated from each other as well as from the framework of the stalls, as will be readily understood. Similarly, the feeder rails of group B' may be supported from the framework of the tops of the stalls in aisle B, between the supporting rails 30' of the "delivery" transfer car 37', and suitably insulated from each other and from the stall framework.

Extending transversely to the aforementioned transfer car feeder rails B' and E', are groups of hoist car feeder rails, each group having nineteen feeder rails therein. One group of such rails is in each of the stalls 21–26 of aisle A, the respective groups in said stalls being designated 21A–26A, inclusive, respectively. Other groups of hoist car feeder rails, designated respectively 41A–46A, extend over stalls 41–46 of aisle C, and also over the adjoining stalls 51–56 of aisle D. Further groups, 71A–76A, extend respectively over the stalls 71–76 of aisle F.

The groups of said hoist car feeder rails may be mounted on suitable supports, such as shown at 162 (Fig. 47) comprising material for insulating the rails of the group from each other and from the stall framework. Said supports 162 may be conveniently carried between adjacent pairs of hoist car support rails 47, by portions of the stall framework which extend over the tops of said stalls. For instance, in stall 55 (Fig. 34) a feeder rail support 162 may be secured in any suitable manner to the bottoms of the beams 545, 546 (as shown in Fig. 35) while in stall 56 another feeder rail support may be secured to the beams 535, 536. Said supports 162 may, for example, be carried by hangers 161 welded or otherwise secured to the beams aforesaid (Fig. 35), and also by similar hangers secured to the beams 547, 548 of stall 55, and 537, 538 of stall 56, as well as beams 520 and 521 of said stalls.

Each of the receiving and delivery transfer cars 37, 37' is provided on its under side with a group of hoist car feeder rails of the same number as in each of the aforementioned groups of hoist car feeder rails. Thus, as shown in Figs. 48 and 49, the "delivery" transfer car 37' has a group of nineteen hoist car feeder rails 37A, mounted on its under side, and suitably insulated from each other and from said car. In Fig. 48, said car 37' is shown between the stalls 21 and 41. In like manner, the "receiving" transfer car 37 has nineteen hoist car feeder rails 37B (Figs. 50 and 51) mounted on its under side. Said car 37 is shown in Fig. 50 between stalls 51 and 71.

The feeder rails in group B' for supplying current to the delivery transfer car 37' are twenty-nine in number, as shown in Fig. 48. Twenty-nine brushes designated B'', suitably insulated from each other and from said transfer car, are mounted on said delivery transfer car and continuously engage the respective feeder rails in said group B'. Nineteen of said brushes are connected to the respective hoist car feeder rails 37A.

The feeder rails in group E' for supplying current to the receiving transfer car 37 are twenty-eight in number, as shown in Fig. 50. Twenty-eight brushes designated E'', suitably insulated from each other and from said transfer car, are mounted on said receiving transfer car and continuously engage the respective feeder rails in said group E'. Nineteen of said brushes are connected to the respective hoist car feeder rails 37B, as indicated in Fig. 50.

The hoist car is provided with brushes for engaging the nineteen feeder rails in any of the groups overlying said hoist car, whether in any of the stalls in aisles A, C, D, or F, or on either of the transfer cars. Preferably two sets of such brushes, designated 38A and 38B, are provided on the hoist car, so that each hoist car feeder rail of any group may be simultaneously engaged by two of said brushes (Figs. 48 and 49). Thus, maintenance of the supply of current to the hoist car is insured during transit of said hoist car to or from either transfer car, despite gaps between the ends of the hoist car feeder rails on either transfer car and the ends of the hoist car feeder rails in adjacent stalls. The nineteen brushes in each of said said sets 38A, 38B, are suitably insulated from each other and from the hoist car on which they are mounted.

Figure 52:
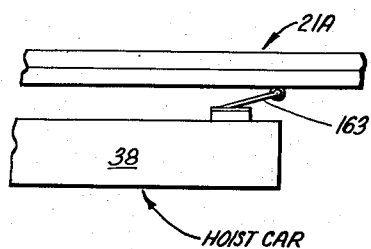
Fig. 52 is a detail view of a modified form of contactor for engagement with a feeder rail.

The brushes on the transfer and hoist cars may be of the type having sliding engagement with the associated feeder rails, as indicated in Fig. 49, or they may be of the roller or trolley shoe type as indicated at 163 in Fig. 52.

As shown in Fig. 48, the twenty-nine stationary feeder rails B' overlying the aisle B for the delivery transfer car 37' are connected to certain conductors, one of which is a negative power line designated by a minus sign, and the others of which (reading from left to right in Fig. 48) are designated by numerals 39C, 151, 132, 131, 111, 110, 108, 96, 95, 93, 92, 89, 88, 87, 86, 84, 80, 79, 73C, 119, 76C, 71C, 63C, 68C, 70C, 117, 130, and 38C.

The nineteen hoist car feed rails on the bottom of said delivery transfer car are connected, through the corresponding brushes B'', to the respective conductors 151, 132, 131, 111, 110, 108, 96, 95, 93, 92, 89, 88, 87, 86, 84, 80, 79, 73C, and the negative power supply, as indicated at the right of Fig. 48.

As shown in Fig. 50, one of the twenty-eight feeder rails E' overlying the aisle E for the receiving transfer car 37 is connected to the negative side of the power supply, designated by a minus sign, while eighteen others are connected, respectively, to the previously mentioned conductors 151, 132, 131, 111, 110, 108, 96, 95, 93, 92, 89, 88, 87, 86, 84, 80, 79, and 73C. The nineteen hoist car feed rails on the bottom of said receiving transfer car are connected, through the corresponding brushes E'', to the respective conductors immediately above specified, as indicated at the right of Fig. 50.

In other words, the hoist car feed rails on the bottom of the receiving transfer car are connected to the same conductors as are the hoist car feed rails on the bottom of the delivery transfer car.

The nine remaining feed rails in the group E' overlying row E for the receiving transfer car are connected respectively, to conductors 36C, 119, 76C, 71C, 63C, 69C, 75C, 118, and 52C.

The nineteen rails in each of the stationary groups (21A–26A, 41A–46A, and 71A–76A) of feed rails for the hoist car are likewise connected to the same conductors above specified as connected to the nineteen hoist car rails on the bottom of each of the transfer cars.

*Electrical connections to apparatus on receiving transfer car*

The electrical connections from the stationary feed rails E' to the apparatus on the receiving transfer car 37 are shown in Fig. 53A.

A terminal of the receiving transfer car drive motor 455 is connected through conductor 630 to that one of the brushes E'' which engages the feed rail E' that is connected to conductor 69C. Said motor 455 is a reversible motor of any well-known or conventional type, and operates in a forward direction (i. e., in a direction away from the receiving station 29) when energized through said conductor 630. The opposite terminal of said motor is connected by wire 632 to one of a pair of stationary contacts 633 of a limit switch designated LS-104. The other of said pair of stationary contacts is connected by wires 636 and 644 to that one of said brushes E'' which engages the stationary feed rail that is connected to the negative side of the power supply.

A movable contact 640 of the switch LS-104 is normally out of engagement with said pair of stationary contacts 633; but when said switch is operated as hereinafter described, said movable contact engages said stationary contacts and establishes a connection between the motor 455 and the negative side of the power line.

Connected in parallel with motor 455, between wires 630 and 632, is a brake relay RTCB-1. When current flows through the motor 455 by way of wires 630 and 632, said brake relay is energized, through wire 630, wire 641, and wire 642. Energization of said relay closes its contacts 643 and establishes a flow of current through the receiving transfer car brake mechanism 455A. As previously noted, this brake mechanism is of a well-known type wherein the brake is released when electric current flows therethrough. For example, the current may flow through one or more solenoids which, when energized, withdraw the brake shoes; and said brake shoes may be applied by conventional spring and linkage means when the solenoids are deenergized.

One terminal of the brake mechanism 455A is connected by wire 644 to the aforementioned brush which engages the negative feed rail. The opposite terminal of said brake mechanism is connected to a wire 150, which in turn is connected to pairs of relay contacts 643, 645, and 646, in parallel with each other. Another wire 647 connects said pairs of relay contacts, in parallel, to the brush E'' on the transfer car which engages the feed rail that is connected to conductor 151. It will be seen that a current path from said conductor 151 through the brake mechanism is established when any of said contact pairs 643, 645, or 646 is closed. As previously noted, contacts 643 are closed when relay RTCB-1 is energized. Similarly contacts 645 are closed upon energization of a relay RTCB-2, presently to be noted; while contacts 646 are closed when a relay RTCB-3, hereinafter further referred to, is energized.

A terminal of the receiving transfer car motor 507, which operates the aligning guide plungers 490–493 (Fig. 4), is connected to a wire 649, which, in turn, is connected to one of a pair of contacts 650, engageable by a movable contact 651 of a limit switch designated LS-103. The other of said pair of contacts is connected by a wire 653 to that one of the receiving transfer car brushes E″ which engages the feed rail connected to the conductor 71C. The opposite terminal of the motor 507 is connected to wire 644 and thus to the brush which engages the negative feed rail.

The motor 507, like the motor 455, is a reversible motor of any well-known type. Said motor 507, when energized through conductor 653, switch contacts 650, and conductor 649, operates in the direction for driving outwardly the aligning plungers and effecting engagement thereof with the adjacent aligning sockets 518, thus effecting and maintaining alignment of said transfer car with the stall or receiving platform over which said car is located.

One terminal of the previously mentioned relay RTCB-3 is connected through wire 655, stationary contacts 656 and movable contact 657 of switch LS-104 and wire 658, with the aforementioned wire 649; while the other terminal of said relay is connected to said brush E″ which engages the negative feed rail. Thus, when the motor 507 is energized to effect engagement of the plungers and aligning guides, the relay RTCB-3, in parallel with said motor, is energized, provided that the movable switch contact 657 engages the stationary contacts 656. Said relay RTCB-3, when energized, closes its contacts 646, establishing a circuit through the transfer car brake mechanism 455A and releasing the brakes, so that said car may move freely while the plungers are moving into full engagement with the aligning sockets. When the circuit through wire 649 is broken to deenergize the motor 507, the relay RTCB-3 is likewise deenergized and the brakes are reapplied by the spring and linkage which hold the brake shoes in engagement with the brake drum.

Another terminal of said motor 507 is connected to a wire 659, which in turn is connected, through stationary contacts 660 and movable contact 661 of switch LS-104, with a wire 662. The latter is connected to the brush E″ which engages the feed rail that is connected to conductor 63C.

When said movable contact 661 of switch LS-104 engages the stationary contacts 660, current flows by way of wire 659 through motor 507, and said motor then operates in the direction for retracting the aligning plungers from engagement with the sockets, thus freeing the receiving transfer car for movement to any desired position in the aisle E.

It has been pointed out that when current flows through the transfer car drive motor 455 by way of wire 630, said motor operates in the direction for moving said car forwardly, i. e., away from the receiving platform 29. For energizing said motor 455 in the reverse direction, to move said transfer car toward said platform, another terminal of said motor is connected by way of a wire 664 to the brush E″ engaging the feed rail which is connected to conductor 118. Current supplied to said motor by wire 664 passes from said motor to wire 632, and thence through contacts 633 and 640 of switch LS-104, and wire 636 to the negative feed line. Connected in parallel with said motor 455, between wires 664 and 632, is the previously mentioned relay RTCB-2, which is energized to close its contacts 645 and release the brake mechanism 455A whenever the motor is energized through said wire 664.

The aforementioned switch LS-103 also has a pair of stationary contacts 665, engageable by a movable contact 666; and a further pair of stationary contacts 667 engageable by a movable contact 668. One of the contacts of the stationary pair 665 is connected by wire 669 with the brush E″ engaging the feed rail E′ that is connected to conductor 76C; while the other of said contacts is connected by wire 670 with the brush E″ that engages the feed rail E′ connected to conductor 75C.

One of the pair of stationary contacts 667 of the switch LS-103 is connected by a wire 671 to the brush engaging the feed rail that is connected to conductor 86; while the other contact of said pair is connected by wire 672 to the brush E″ that engages the feed rail E′ connected to conductor 119.

The switch LS-103 is of a well-known type, having its movable contacts 651, 666, and 668 connected together for movement in unison. When the movable contact 651 engages the pair of stationary contacts 650, the movable contact 666 is out of engagement with the stationary contacts 665, and likewise the movable contact 668 is out of engagement with its associated stationary contacts 667. Conversely, when the switch is operated to disengage its movable contact 651 from contacts 650, the movable contacts 666 and 668 are moved into engagement with their respective pairs of stationary contacts 665 and 667.

Said switch LS-103 may be actuated in any suitable manner, so as to open its contacts 650 and close its respective pairs of contacts 665 and 667 whenever the aligning plungers are fully engaged with the associated aligning sockets. Thus, as shown in Fig. 4, one of said plungers, such as plunger 490, may be provided with an extension having a cam 620 for cooperation with a lever or other operating element 103′ of the conventional switch LS-103. When said plunger 490 is fully extended outwardly from the transfer car said element 103′ is actuated by said cam 620 to shift the movable contact 651 of said switch out of engagement with the stationary contacts 650. As above noted, the movable contacts 666 and 668 are concurrently engaged with their respective pairs of contacts 665, 667 when contact 651 is moved out of engagement with its associated pair of contacts 650. On the other hand, when the aligning plungers are retracted, the cam 620 on plunger 490, is withdrawn from engagement with the switch operating element 103′, releasing the latter so that the switch contacts are returned by suitable spring means or otherwise to their former positions; i. e., the movable contact 651 reengages the stationary contacts 650, and the contacts 666 and 668 move out of engagement with the respective pairs of contacts 665 and 667.

It will thus be seen that as long as the aligning plungers are retracted, the movable contact 651 bridges the contacts 650 and thus maintains the wire 649 connected to the feed line conductor 71C. When, however, the aligning plungers are fully extended, said movable contact 651 is moved out of engagement with contacts 650, disconnecting wire 649 from said conductor 71C and preventing energization of motor 507 in the direction for further extending said plungers.

The limit switch LS-104 is likewise of conventional construction, for operation of its movable contacts 640, 657, and 661 in unison. When its movable contact 661 engages the pair of stationary contacts 660, its movable contact 657 likewise engages the pair of contacts 656; but the contact 640 is out of engagement with the pair of contacts 633. Conversely, when the contact 661 is moved out of engagement with the pair of contacts 660, the contact 657 is removed from engagement with the pair of contacts 656, and contact 640 engages the pair of contacts 633.

The aligning plunger 493 (Fig. 4) has an extension bearing a cam 621 for cooperating with a lever or other operating element 104' of the conventional switch LS-104. When the aligning plungers are fully retracted from engagement with the associated aligning guides, the cam 621 actuates said element 104', disengaging the movable contact 661 of said switch from the pair of stationary contacts 660. This disconnects the wire 659 from the feed conductor 63C, and prevents energization of the motor 507 in the direction for retracting said plungers. At the same time contact 657 is disengaged from the pair of contacts 656, while contact 640 engages the pair of contacts 633.

When the aligning plungers are moved outwardly by the motor 507, toward engagement with the associated aligning sockets, the cam 621 moves out of engagement with the operating element of switch LS-104, releasing the latter so that its contacts return to their former positions; i. e., the movable contact 661 returns to engagement with contacts 660, contact 657 returns to engagement with contacts 656, and contact 640 is disengaged from contacts 633.

The receiving transfer car also has mounted thereon a limit switch designated LS-61 (Figs. 54 and 53C) which has a contact 675 (Fig. 53C) movable into and out of engagement with a pair of stationary contacts 676. One of said pair of stationary contacts is connected through a wire 677 with a brush E" that engages the feed rail connected to conductor 52C. The other contact of said pair is connected to a wire 678, which in turn is connected as hereinafter described. The operating element 61' of said switch LS-61 is operable by a cam 625 (Fig. 54) on the hoist car when the latter moves into its fully engaged position on the receiving transfer car. When said cam actuates said operating element 61', the contact 675 is moved out of engagement with the stationary contacts 676. On the other hand, in the initial portion of the movement of the hoist car out of said fully engaged position, the cam 625 moves out of engagement with the switch operating element, and the movable contact 675 returns into engagement with said stationary contacts.

*Electrical connections to apparatus on delivery transfer car*

The electrical connections from the stationary feed rails B' to the apparatus on the delivery transfer car 37' are shown in Fig. 53A. As previously noted, the delivery transfer car may be a duplicate of the receiving transfer car. The delivery transfer car motors are designated in Fig. 53A by the same numerals as the corresponding motors of the receiving transfer car, with a prime added, while the brake mechanism associated with the drive motor of the delivery transfer car (and corresponding to the brake mechanism 455A of the receiving transfer car) is designated 455B.

A terminal of the delivery transfer car drive motor 455' is connected through wire 679 to that one of the brushes B" which engages the feed rail B' that is connected to conductor 68C. Said motor 455' is a reversible motor of conventional type, and operates in a forward direction (i. e., in a direction away from the delivery station 49) when energized through said wire 679. The opposite terminal of said motor is connected by wire 680 to one of a pair of stationary contacts 681 of a limit switch designated LS-102. The other of said pair of stationary contacts is connected by wires 682 and 683 to that one of the delivery transfer car brushes B" which engages the stationary feed rail that is connected to the negative side of the power supply.

A movable contact 684 of the switch LS-102 is normally out of engagement with said pair of stationary contacts 681; but when said switch is operated as hereinafter described said movable contact engages said stationary contacts and establishes a connection between the motor 455' and the negative side of the feed line.

Connected in parallel with motor 455', between the wires 679 and 680, is a brake relay DTCB-1. When current flows through motor 455' by way of wires 679 and 680, said brake relay is energized through wire 679, wire 685, and wire 686. Energization of said relay closes its contacts 687 and establishes a flow of current through the delivery transfer car brake mechanism 455B, which, like the brake mechanism 455A of the receiving transfer car, is of a well-known type wherein the brake is released when electric current flows therein and wherein the brake is applied mechanically when the flow of electric current ceases.

One terminal of the brake mechanism 455B is connected by wire 683 to the aforementioned brush which engages the negative feed rail. The opposite terminal of said brake mechanism is connected to a wire 152, which in turn is connected to pairs of relay contacts 687, 689, and 690, in parallel with each other. Another wire 691 connects said pairs of relay contacts, in parallel, to the brush B" on the delivery transfer car which engages the feed rail that is connected to conductor 151. It will be seen that a current path from said conductor 151 through the brake mechanism 455B is established when any of said contact pairs 687, 689, or 690 is closed. As previously noted, contacts 687 are closed when relay DTCB-1 is energized. Similarly, contacts 689 are closed upon energization of a relay DTCB-2, presently to be noted; while contacts 690 are closed when a relay DTCB-3, hereinafter further referred to, is energized.

A terminal of the delivery transfer car motor 507', which operates the aligning guide plungers of said car, is connected to a wire 692, which, in turn, is connected to one of a pair of contacts 693 engageable by a movable contact 694 of a limit switch designated LS-101. The other of said pair of contacts 693 is connected by a wire 695 to that one of the delivery transfer car brushes B" which engages the feed rail connected to the conductor 71C. The opposite terminal of the motor 507' is connected to wire 683 and thus to the brush which engages the negative feed rail.

The motor 507', like the motor 455', is a reversible motor of any well-known type. Said motor 507' when energized through conductor 695, switch contacts 693, and conductor 692, operates in the direction for driving outwardly the aligning plungers and effecting engagement thereof with the adjacent aligning sockets 513, thus effecting and maintaining alignment of the delivery transfer car with the stall or delivery platform over which said car is located.

One terminal of the previously mentioned relay DTCB-3 is connected through wire 697, stationary contacts 698 and movable contact 699 of switch LS-102, and wire 700, with the aforementioned wire 692; while the other terminal of said relay is connected to said brush B'' which engages the negative feed rail. Thus, when the motor 507' is energized to effect engagement of the plungers and aligning guides, the relay DTCB-3, in parallel with said motor, is energized, provided that the movable switch contact 699 engages the stationary contacts 698. Said relay DTCB-3, when energized, closes its contacts 690, establishing a circuit through the transfer car brake mechanism 455B and releasing the brake, so that the delivery transfer car may move freely while the plungers are moving into engagement with the aligning sockets. When the circuit through wire 692 is broken to deenergize the motor 507, the relay DTCB-3 is likewise deenergized and the brake is reapplied.

Another terminal of said motor 507' is connected to a wire 701, which in turn is connected, through stationary contacts 702 and movable contact 703 of switch LS-102, with a wire 704. The latter is connected to the brush B'' which engages the feed rail that is connected to conductor 63C.

When said movable contact 703 engages the stationary contacts 702, current flows by way of wire 701 through motor 507', and said motor then operates in the direction for retracting the aligning plungers from engagement with the sockets, thus freeing the delivery transfer car for movement to any desired position in the aisle B.

It has been pointed out that when current flows through the delivery transfer car drive motor 455' by way of wire 679, said motor operates in the direction for moving said car forwardly, i. e., away from the delivery platform 49. For energizing said motor 455' in the reverse direction, to move said car toward said platform, another terminal of said motor is connected by way of a wire 705 to the brush B'' engaging the feed rail which is connected to conductor 117. Current supplied to said motor by wire 705 passes from said motor to wire 680, and thence through contacts 681 and 684 of switch LS-102, and wire 682 to the negative feed line. Connected in parallel with said motor 455', between wires 705 and 680, is the previously mentioned relay DTCB-2, which is energized to close its contacts 689 and release the brake mechanism 455B whenever the motor is energized through said wire 705.

The aforementioned switch LS-101 also has a pair of contacts 706, engageable by a movable contact 707; and a further pair of stationary contacts 708, engageable by a movable contact 709. One of the contacts of the stationary pair 706 is connected by wire 710 with the brush B'' engaging the feed rail that is connected to conductor 70C; while the other of said contacts is connected by wire 711 with the brush that engages the feed rail connected to conductor 76C.

One of the pair of stationary contacts 708 of the switch LS-101 is connected by wire 712 to the brush engaging the feed rail connected to conductor 130; while the other contact of said pair is connected by wire 713 to the brush that engages the feed rail connected to conductor 119.

The switch LS-101 is of well-known type, having its movable contacts 694, 707, and 709 connected together for movement in unison. When the movable contact 694 engages the pair of stationary contacts 693, the movable contact 707 is out of engagement with the stationary contacts 706, and likewise the movable contact 709 is out of engagement with its associated stationary contacts 708. Conversely, when the switch is operated to disengage its movable contact 694 from contacts 693, the movable contacts 707 and 709 are moved into engagement with their respective pairs of stationary contacts 706 and 708.

Switch LS-101 may be actuated in any suitable manner so as to open its contacts 693, and close its respective pairs of contacts 706 and 708, whenever the aligning plungers are fully engaged with the associated aligning sockets. Said switch may, for instance, be operated by a cam on one of the aligning plungers of the delivery transfer car (in the same manner as above described with respect to the operation of switch LS-103 by cam 620 on one of the receiving transfer car aligning plungers) so that when said plunger is moved fully outwardly said switch LS-101 is operated to shift its movable contact 694 out of engagement with the stationary contacts 693. As above noted, the movable contacts 707 and 709 are concurrently engaged with their respective pairs of contacts 706, 708 when contact 694 is moved out of engagement with its associated pair of contacts 693. On the other hand, when the aligning plungers are retracted, said cam on said aligning plunger is withdrawn from engagement with the operating element of said switch, releasing the latter so that its contacts return to their former positions; i. e., the movable contact 694 reengages the stationary contacts 693, and the contacts 707 and 709 move out of engagement with the respective pairs of contacts 706 and 708.

It will thus be seen that as long as said aligning plungers of the delivery transfer car are retracted, the movable contact 694 bridges the contacts 693 and thus maintains wire 692 connected to the feed line conductor 71C. When, however, the plungers are fully extended, said contact 694 is moved out of engagement with contacts 693, disconnecting wire 692 from said conductor 71C and preventing energization of motor 507' in the direction for extending said plungers.

The limit switch LS-102 is likewise of conventional construction, for operation of its movable contacts 684, 699, and 703 in unison. When its movable contact 703 engages the pair of stationary contacts 702, its movable contact 699 likewise engages the pair of contacts 698; but the contact 684 is out of engagement with the pair of contacts 681. Conversely, when the contact 703 is moved out of engagement with the pair of contacts 702, the contact 699 is removed from engagement with the pair of contacts 698, and contact 684 engages the pair of contacts 681.

The switch LS-102 may be operated by a cam on one of the aligning plungers of the delivery transfer car (in the same manner as above described in connection with the operation of switch LS-104 by cam 621 on the receiving transfer car aligning plunger 493) so that, when the delivery transfer car plungers are fully retracted from engagement with the associated aligning guides, said switch LS-102 is operated by said cam to disengage the movable contact 703 of said switch from the pair of contacts 702. This disconnects the wire 701 from the feed conductor 63C, and prevents energization of motor 507' in the direction for retracting said plungers. At the same time, contact 699 is disengaged from the pair of contacts 698, while contact 684 engages the pair of contacts 681.

When the aligning plungers of the delivery transfer car are moved outwardly by the motor 507', toward engagement with the associated aligning sockets, the aforementioned plunger cam (like cam 621 aforesaid) moves out of engagement with the switch operating element, so that the contacts of the switch LS-102 are released and return to their former positions; i. e., the movable contact 703 returns to engagement with contacts 702, contact 699 returns to engagement with contacts 698, and contact 684 is disengaged from contacts 681.

The delivery transfer car also has mounted on the bottom thereof a limit switch designated LS-31 (Fig. 53C), which has a contact 714 movable into and out of engagement with a pair of stationary contacts 715. One of said pair of stationary contacts is connected through a wire 716 with a brush B" that engages the feed rail connected to conductor 38C. The other contact of said pair is connected to a wire 717, which in turn is connected as hereinafter described. Said switch is operable by the aforementioned cam 625 on the hoist car in the same manner as above described with respect to the switch LS-61 on the receiving transfer car. Specifically, when the hoist car moves into its fully engaged position on the delivery transfer car, its cam 625 actuates the switch LS-31 to disengage the movable contact 714 from the stationary contacts 715. On the other hand, in the initial portion of the movement of the hoist car out of said fully engaged position, the switch LS-31 is released, and its contact 714 returns into engagement with the stationary contacts 715.

*Electrical connections to apparatus on the hoist car*

The electrical connections between the apparatus on the hoist car and the various brushes thereon are shown in Fig. 53A.

As previously noted, the hoist car is preferably provided with two sets of brushes 38A and 38B (Figs. 48 and 49). For an understanding of the connections between the hoist car apparatus and brushes, a description of the connections between said apparatus and one set of the hoist car brushes will suffice; it being understood that when two sets of brushes are provided, a connection to any brush of one set is simply duplicated in the other set, so that a portion of the hoist car apparatus connected to any given brush in one set is also connected to a corresponding brush of the other set, in parallel with the brush of the first set. For instance in Fig. 53A, the wire 718, leading from a terminal of the hoist car drive motor 414, is shown connected to brush 719 in the set 38A; but if two sets of brushes are employed on the hoist car, said wire 718 will also be connected to a brush in the other set which engages the same feed rail as that engaged by brush 719, the brush 719 and the corresponding brush in set 38B being connected to said wire 718 in parallel. The nineteen brushes in the set 38A are numbered 719-737, inclusive, respectively, in Fig. 53A. As previously observed, these brushes are adapted to engage simultaneously the nineteen hoist car feed rails in any of the groups 21A-26A, 41A-46A, and 71A-76A, in the aisles A, C, D, and F, or in the groups 37A or 37B on the bottom of the delivery or receiving transfer car. In Fig. 53A, the hoist car is assumed to be on the receiving transfer car, for purposes of illustration, and the brushes 719—737 are thus engaged with the nineteen hoist car feed rails 37B on the bottom of said transfer car. These nineteen hoist car feed rails 37B are, as previously noted, connected to corresponding brushes E" on said transfer car, which in turn engage corresponding ones of the feed rails E' in the aisle E for the receiving transfer car.

The brush 719, to which one of the terminals of drive motor 414 is connected by wire 718, receives current from that hoist car feed rail that is electrically connected to stationary conductor 79. Said motor 414 is a reversible motor of any well-known or conventional type, and operates in a forward direction (i. e., to the right in Fig. 1) when energized through said wire 718. The opposite terminal of said motor is connected by wire 739 to one of a pair of stationary contacts 740 of a limit switch LS-106, which stationary contacts are adapted to be bridged by a movable contact 741 of said switch. The other one of said stationary pair of contacts is connected by a wire 742 to brush 737, which is electrically connected to the negative side of the power supply.

Connected in parallel with motor 414, between the wires 718 and 739, is a brake relay HCB-1; wherefore said brake relay is energized whenever said motor is energized by way of said wire 718. Energization of said relay closes its contacts 744 and establishes a flow of current through the hoist car brake mechanism 417. As previously set forth, this brake mechanism is of a well-known type wherein the brakes are released when electric current flows therethrough and wherein the brakes are applied when the flow of current ceases.

One terminal of the brake mechanism 417 is connected by wire 745 to the aforementioned wire 742 which is connected to the negative brush 737. The opposite terminal of said brake mechanism is connected to pairs of relay contacts 744, 746, and 747, in parallel with each other. Another wire 748 connects said pairs of relay contacts, in parallel, to the brush 721, which is electrically connected to the stationary feed conductor 151. It will be seen that a current path from said conductor 151 through the brake mechanism 417 is established whenever any of said contact pairs 744, 746, or 747 is closed. As previously noted, contacts 744 are closed when relay HCB-1 is energized. Similarly contacts 746 are closed upon energization of a relay HCB-2, presently to be noted; while contacts 747 are closed when a relay HCB-3, hereinafter further referred to is energized.

A terminal of the hoist car motor 435, which operates the aligning guide plungers 428 and 429 (Figs. 9, 10, and 33), is connected to a wire 750, which, in turn, is connected to one of a pair of stationary contacts 751, engageable by a movable contact 752 of a limit switch designated LS-105. The other of said limit pair of contacts is connected to brush 723, in engagement with a feed rail which receives current from conductor 84. The opposite terminal of the motor 435, is connected by wires 753 and 742 to the aforementioned negative brush 737.

The motor 435, like said motor 414, is a reversible motor of any well-known type. When energized through switch contacts 751 and 752, and wire 750, said motor 435 operates in the direction for engaging the plungers 428, 429 with the aligning sockets 437, 438 on the transfer car 37 or 37' (Figs. 4, 5, and 33) when the hoist car is on either of said transfer cars, or with the aligning sockets 439, 440 (Figs. 34-36) on the frame-work of any of the stalls in aisles A, C, D, or F, when said hoist car is over any of said stalls.

One terminal of the previously mentioned brake relay HCB-3 is connected through wire 754, stationary contacts 755 and movable contact 756 of switch LS-106, and wire 757, with the aforementioned wire 750; while the opposite terminal of said relay is connected to wire 742, and thus to the negative brush 737. Thus, when the motor 435 is energized to engage the hoist car plungers with the associated aligning guides of a transfer car or stall, the relay HCB-3, in parallel with said motor, is energized, provided that the movable switch contact 756 engages the aforementioned stationary contacts 755. Said relay HCB-3, when energized, closes its contacts 747, establishing a circuit through the brake mechanism 417, and releasing the brakes, so that the hoist car may move freely while its plungers are moving into full engagement with the aligning sockets. When the circuit through wire 750 is broken to deenergize the motor 435, the relay HCB-3 is likewise deenergized and the brakes are reapplied.

Another terminal of said motor 435 is connected to a wire 758, which in turn is connected through stationary contacts 759 and movable contact 760 of switch LS-106, with brush 727. The latter engages a feed rail that receives current from conductor 73C.

When said movable contact 760 of switch LS-106 engages the stationary contacts 759, current flows by way of wire 758 through motor 435, and said motor then operates in the direction for disengaging the plungers 428, 429 from the associated aligning sockets, thus freeing the hoist car for movement to any desired position.

It has been pointed out that when current flows through the hoist car drive motor 414 by way of wire 718, said motor operates in the direction for moving the hoist car forwardly, i. e., to the right. For energizing said motor 414 in the reverse direction, to move said hoist car to the left, another terminal of said motor is connected, through wire 762 to brush 720, which engages a feed rail receiving current from conductor 80. Current supplied to said motor by wire 762 passes from the motor to wire 739, and thence through contacts 740 and 741 of switch LS-106, and wire 742 to the negative feed line. Connected in parallel with said motor 414, between wires 762 and 739, is the previously mentioned relay HCB-2, which is energized to close its contacts 746 and release the brake mechanism 417 whenever the motor is energized through said wire 762.

The aforementioned switch LS-105 also has a pair of stationary contacts 763, engageable by a movable contact 764; and a further pair of stationary contacts 765 engageable by a movable contact 766. One of the contacts of the stationary pair 763 is connected with the brush 724 which engages a feed rail receiving current from conductor 87; while the other of said contacts is connected by wire 768 with the brush 726 that engages a feed rail receiving current from conductor 88.

One of the pair of stationary contacts 765 of the switch LS-105 is connected by wire 770 to the brush 722 engaging a feed rail which receives current from conductor 118; while the other contact of said pair is connected by wire 771 with brush 725, engaging a feed rail which receives current from conductor 131. The last mentioned stationary contact is also connected, through wire 771, to another wire 772, having connections as hereinafter specified. The wire 770 also has additional connections which will later be described.

The limit switch LS-105 is of a well-known type, having its movable contacts 752, 764, and 766 connected together for movement in unison. When the movable contact 752 engages the stationary contacts 751, the movable contact 764 is out of engagement with contacts 763, and likewise the movable contact 766 is out of engagement with stationary contacts 765. Conversely, when the switch is operated to disengage its movable contact 752 from contacts 751, the movable contacts 764 and 766 are moved into engagement with their respective pairs of stationary contacts 763 and 765.

Said switch LS-105 may be actuated in any suitable manner so as to open its contacts 751 and close its respective pairs of contacts 763 and 765 whenever the hoist car aligning plungers are fully engaged with the associated sockets. Thus, as shown in Fig. 55, the plunger 428 may be provided with an extension having a cam 623 for cooperation with a lever or other operating element 105' of the conventional switch LS-105. When said plunger 428 is fully engaged with an associated aligning guide, said element 105' is actuated by said cam 623 to shift the movable contact 752 of said switch out of engagement with the stationary contacts 751, and concurrently to engage the movable contacts 764 and 766 with their respective pairs of contacts 763 and 765. On the other hand, when the aligning plungers are retracted, the cam 623 on the plunger 428 is withdrawn from engagement with the switch operating element 105', releasing the latter so that the switch contacts return to their former positions; i. e., the movable contact 752 reengages the stationary contacts 751, and the contacts 764 and 766 move out of engagement with the respective pairs of contacts 763 and 765.

It will thus be seen that, as long as the hoist car aligning plungers are retracted, the movable contact 752 bridges the contacts 751 and thus maintains the wire 750 connected to the feed line conductor 84. When, however, the aligning plungers are fully engaged with the associated sockets, said movable contact 752 is disengaged from contacts 751, disconnecting wire 750 from said conductor 84 and preventing energization of motor 435 in the direction for extending said plungers.

The limit switch LS-106 is likewise of conventional construction, for operation of its movable contacts 741, 756 and 760 in unison. When its movable contact 760 engages the pair of stationary contacts 759, its movable contact 756 likewise engages the pair of contacts 755; but the contact 741 is out of engagement with the pair of contacts 740. Conversely, when the contact 760 is moved out of engagement with contacts 759, the contact 756 is removed from engagement with contacts 755, and contact 741 engages contacts 740.

The aligning plunger 429 (Fig. 57) has an extension bearing a cam 624 for cooperating with a lever or other operating element 106' of the conventional switch LS-106. When the aligning plungers are fully retracted from engagement with the associated aligning guides the cam 624 actuates said element 106', disengaging the movable contact 760 from the pair of stationary contacts 759. This disconnects the wire 753 from the feed conductor 73C, and prevents energization of the motor 435 in the direction for retracting said plungers. At the same time, contact 756 is disengaged from the pair of contacts 755, while contact 741 engages the pair of contacts 740.

When the aligning plungers are moved outwardly by the motor 435, toward engagement with the associated aligning sockets, the cam 624 moves out of engagement with the operating element of the switch LS-106, releasing the latter so that its contacts return to their former positions, i. e., the movable contact 760 reengages contacts 759, contact 756 returns to engagement with contacts 755, and contact 741 is disengaged from contacts 740.

The motor 383, which effects rotation of the hoist-frame coupler-tubes 282 to lock or release the hoist frame with respect to dolly sockets 266, has a terminal connected by a wire 112 to a pair of stationary contacts 774 engageable by a movable contact 775 of a limit switch LS-107. The other of said pair of stationary contacts is connected to brush 728 which engages a feed rail that receives current from conductor 111. The opposite terminal of said motor 383 is connected by wire 776 to the negative brush 737.

Motor 383 is a reversible motor of any well-known or conventional type, and, when energized through wire 112, operates in a direction for rotating the coupler tubes into locking engagement with the dolly sockets; i. e., turning said tubes so that their lugs 298 pass beneath the socket ledge portions 320, 321 (Figs. 26 and 27) into the portions of the recesses 312, 313, which lie under the surfaces 325, 326 of the ledges 317, 319 (Figs. 26 and 28).

Another terminal of said coupler operating motor 383 is connected by wire 94 with one of a pair of stationary contacts 778 engageable by a movable contact 779 of limit switch LS-108. The other of said pair of stationary contacts is connected to brush 731, which engages a feed rail that receives current from conductor 93. Current supplied to said motor through the switch contacts 778, 779, and wire 94, passes through said motor to wire 776 and the negative brush 737, and effects operation of said motor in the reverse direction, so that the coupler tubes are rotated to bring their lugs 298 into alignment with the slots or passages 266 in the dolly sockets for release from said sockets.

The limit switch LS-107 also has a pair of stationary contacts 780 engageable by a movable contact 781; and a further pair of stationary contacts 782 engageable by a movable contact 783. One of the contacts of the stationary pair 780 is connected by a wire 784 with the previously mentioned wire 772, while the other of said contacts is connected to brush 729 which engages a feed rail receiving current from conductor 108.

One of the pair of stationary contacts 782 is connected by a wire 785 with the brush 730, engaging a feed rail which receives current from conductor 86. The other contact of said pair is connected to the previously mentioned wire 770.

Limit switch LS-108 has also a pair of stationary contacts 786 engageable by a movable contact 787, and a further pair of stationary contacts 788 engageable by a movable contact 789. One of the pair of stationary contacts 786 is connected by wires 790 and 791 with the aforementioned brush 726 which receives current from conductor 88. The other of said pair of contacts 786 is connected to the brush 732, which receives current from conductor 95.

One of the pair of stationary contacts 788 of switch LS-108 is connected by wire 792 with brush 730, which receives current from conductor 86. The other of said pair of contacts is connected by wire 793 with the previously mentioned brush 724, which receives current from conductor 87.

Each of the limit switches LS-107 and LS-108 is of the conventional type previously referred to, having its movable contacts connected together for movement in unison. When movable contact 775 of switch LS-107 engages contacts 774, the movable contact 783 likewise engages contacts 782; but the movable contact 781 is out of engagement with contacts 780. Likewise, in switch LS-108, when movable contact 779 engages contacts 778, the movable contact 789 engages contacts 788; but the movable contact 787 is out of engagement with the contacts 786.

For actuating the limit switches LS-107 and LS-108, the screw shaft 382' driven by the motor 383 has an intermediate threaded portion 385 (Figs. 9 and 30) which passes through a nut 386. The latter has attached thereto a cam 387 adapted to cooperate with operating elements 107', 108' of the respective limit switches aforementioned. Said nut may be constrained in any suitable manner to move longitudinally whenever shaft 382' is rotated as will be readily understood. For instance, said nut may have one or more grooves engaged by tongues on a bracket or other adjacent portion of the hoist car framework, similar to the tongue and groove arrangements previously described with respect to casings 378 and 378' (Figs. 9 and 30) which are moved longitudinally, by rotation of the screw shafts 382, 382'.

When the screw shaft 382' is operated sufficiently in the proper direction for releasing the coupler tubes 282, i. e., bringing their lugs 298 into alignment with passages 266 in the dolly sockets, the traveling nut 386 is in the position shown in Figs. 9 and 30, wherein the cam 387 thereon has engaged and operated the element 108' of switch LS-108. Thereby, the movable contact 779 of said switch is disengaged from contacts 778, breaking the circuit for energizing the motor 383 in the coupler-release direction. Concurrently, movable contact 789 of switch LS-108 is removed from engagement with contacts 788, and contact 787 is engaged with contact 786.

When the shaft 382' is turned in the opposite direction, for locking the coupler tubes 282 in the dolly sockets, the cam 387 moves away from switch element 108', releasing the contacts of switch LS-108 so that they return to their positions shown in Fig. 53A. When said coupler tubes are turned sufficiently to bring their lugs 298 beneath the surfaces 325, 326 of the ledges 317, 319 in the dolly sockets, the cam 387 actuates the element 107' whereby the limit switch LS-107 is operated to remove its movable contact 775 from engagement with contacts 774, breaking the circuit for energizing the motor 383 in the coupler-engaging direction. Concurrently, the movable contact 783 of switch LS-107 is disengaged from contacts 782, while contact 781 is engaged with contacts 780.

When the shaft 382' is rotated in the direction for bringing the coupler tube lugs 298 into alignment with the dolly socket recesses 266, the cam 387 is moved away from the switch operating element 107', releasing the contacts of switch LS-107 so that they return to their positions shown in Fig. 53A.

It will, of course, be understood that the shaft 382', or the shaft 382, in the embodiment illustrated in Fig. 41 may similarly operate a traveling nut and cam to actuate the switches LS-107 and LS-108 in the manner above described.

As previously mentioned, the shaft 354 connected to the hoisting drums 337 and 353, may be driven by a single motor, or by a plurality of motors such as shown at 361 and 363 in Fig. 9. In Fig. 53A, it will be understood that the rectangle designated "Hoist lift motor" may comprise a single motor 361, or the two motors 361, 363, connected in parallel. Likewise, the rectangle designated "Hoist lift brake" may comprise simply the brake mechanism 365, when motor 361 is used alone, or the brake mechanisms 365 and 366, connected in parallel when both motors 361 and 363 are employed. In the interest of simplicity of description, it will be assumed that a single motor and brake mechanism are used in conjunction with the driving of the drum shaft 354, but the same description will apply to motors 361 and 363 in parallel, and brake mechanisms 365 and 366 in parallel. Both motors 361 and 363 are reversible motors of well-known type.

A terminal of motor 361 is connected by wire 97 to one of a pair of contacts 796 engageable by a movable contact 797 of a limit switch LS-109. The other contact of said pair of contacts 796 is connected to brush 733, engaging a feed rail which receives current from conductor 96. The opposite terminal of motor 361 is connected by wire 798 to the negative brush 737. When motor 361 is energized by way of switch contacts 796 and 797, and wire 97, it operates the drum shaft 354, and drums 337 and 353, in the direction for raising the hoist frame 270.

Another terminal of motor 361 is connected to a pair of contacts 800 engageable by movable contact 801 of a limit switch LS-111. The other of said pair of contacts 800 is connected to one of a pair of contacts 802 engageable by a movable contact 803 of a limit switch LS-110. The other of said pair of contacts 802 is connected to brush 734, engaging a feed rail which receives current from conductor 89. Current supplied to motor 361 by way of brush 734 and the aforementioned switch contacts 802, 800, passes through said motor to wires 798, 742 and brush 737, energizing said motor for operation in the direction to lower the hoist frame 270.

Connected in parallel across the motor 361, between the wires 97 and 798, is a brake relay HLB-1, which is energized whenever motor 361 is energized in the direction for raising the hoist frame. Energization of said relay closes its contacts 804 and establishes a flow of current through the brake mechanism 365, with resultant release of the brakes thereof.

One terminal of said brake mechanism 365 is connected to wire 798 and thence to the negative brush 737. The opposite terminal of said brake mechanism is connected to a wire 806, which in turn is connected to pairs of relay contacts 804, 807, in parallel with each other. Another wire 808 connects said pairs of relay contacts, in parallel, to the previously mentioned wire 746, and thence to brush 721. It will thus be seen that a current path from conductor 151 and brush 721 is established through the brake mechanism 365 whenever either of the pairs of contacts 804 or 807 is closed. As above noted, the contacts 804 are closed when relay HLB-1 is energized. Contacts 807 are closed by energization of a relay HLB-2, which is connected in parallel with motor 361 and energized whenever said motor is energized in the direction for lowering the hoist frame.

Figure 56:
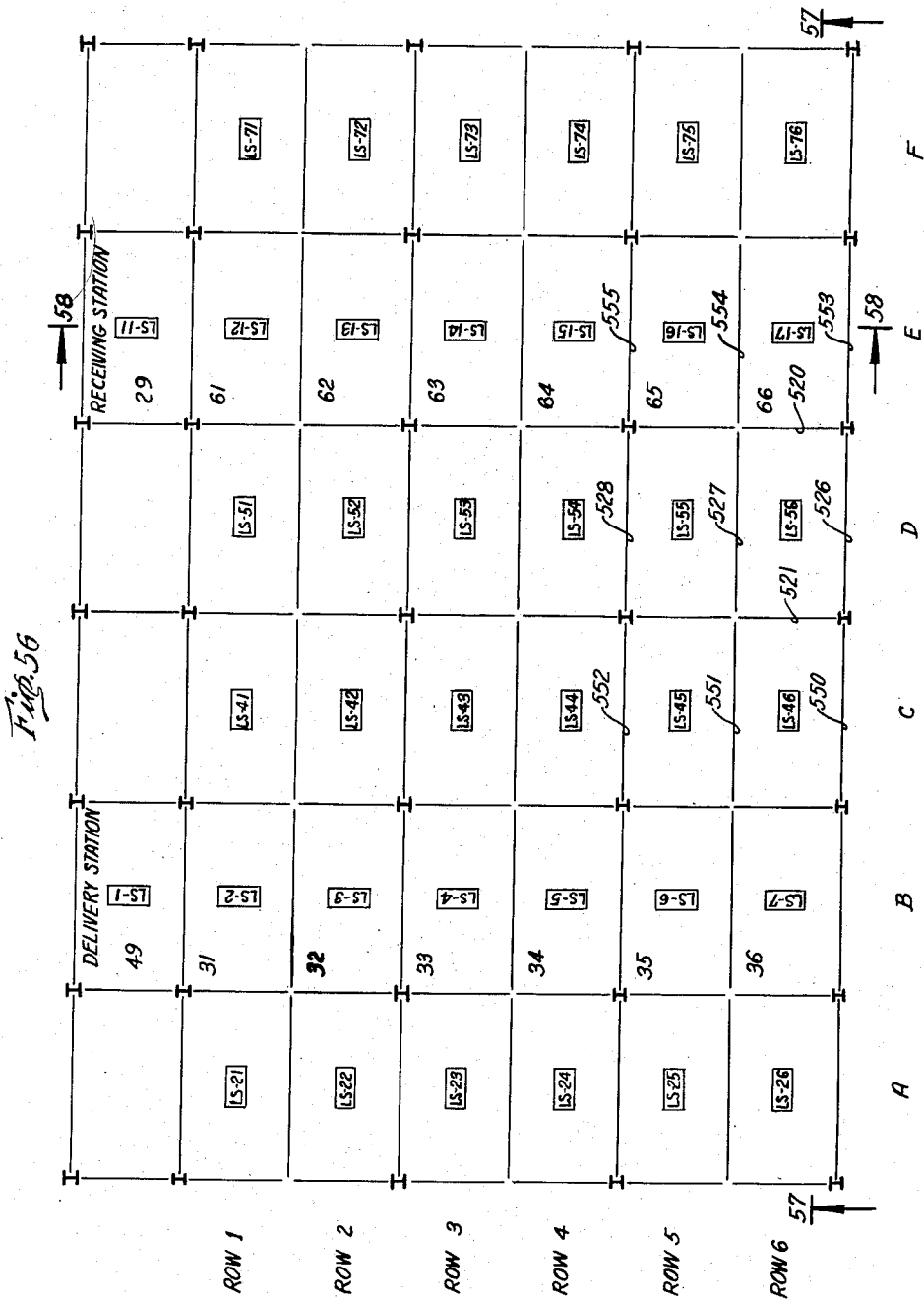
Fig. 56 is a diagrammatic plan view showing limit switches in the parking stalls and at the receiving and delivery stations.

As previously described, the solenoid 393 (Figs. 9 and 10) must be energized to retract the pawl 390 from engagement with ratchet wheel 391 before the drums 337 and 353 can be operated to lower the hoist frame. As shown in Fig. 56, one terminal of said solenoid 393 is connected to the negative brush 737, through wires 805 and 742. The opposite terminal of said solenoid is connected to one of another pair of contacts 809 operated by relay HLB-2. The other of said pair of contacts 809 is connected to the aforementioned wire 808 and thence to brush 721.

The limit switch LS-110 is also provided with a pair of stationary contacts 810 engageable by a movable contact 811, and with a further pair of stationary contacts 812 engageable by a movable contact 813. One of the pair of stationary contacts 810 is connected to brush 735, which engages a feed rail to which current is supplied by conductor 132; while the other of said pair of contacts is connected to the wire 791, which in turn is connected to brush 726 and thus to conductor 88.

One of the pair of stationary contacts 812 is connected to the brush 736, engaging a feed rail to which current is supplied by conductor 92; while the other contact of said pair is connected to the previously mentioned wire 772, which in turn is connected to brush 725 and thus to conductor 131.

The limit switch LS-110 is of a conventional type, having its contacts 803, 811, and 813 movable in unison. When contact 803 is in engagement with the pair of stationary contacts 802, the movable contact 811 is out of engagement with contacts 810, and likewise the movable contact 813 is out of engagement with contacts 812.

Limit switches LS-109 and LS-111 are also of well-known type, each having a single contact movable into and out of engagement with a pair of stationary contacts.

For operating the limit switches LS-109 and LS-110, the drum-actuating shaft may (as shown in Fig. 9) be provided with a threaded portion which passes through a nut 388, having attached thereto a cam 389 adapted to cooperate with operating elements 109' and 110' of said limit switches. Said nut, like the nut 386, is constrained in any suitable manner to move longitudinally when its operating shaft is rotated.

When the shaft 354 is rotated sufficiently to raise the hoist frame into its completely elevated position (wherein the upper ends 300 of the coupler tubes are fully engaged with the hoist car sockets 301) the nut 388 is in the position shown in Fig. 9, wherein the cam 389 thereon has engaged and operated the element 109' of switch LS-109. Thereby the movable contact 797 of said switch is disengaged from the stationary contacts 796, breaking the circuit for energizing the motor 361 in the direction for raising said hoist frame.

When said shaft 354 is turned in the opposite direction, for lowering the hoist frame, the cam 389 moves away from switch element 109', releasing the switch, so that its movable contact 797 returns into engagement with said stationary contacts 796. When said hoist frame is fully lowered, the cam 389 actuates the element 110' whereby the limit switch LS-110 is operated to remove its movable contact 803 from engagement with stationary contacts 802, thus breaking the circuit for energizing motor 361 in the direction for lowering said hoist frame. Concurrently, the movable contact 811 of said switch LS-110 is engaged with contacts 810, and contact 813 is engaged with contacts 812.

Upon subsequent rotation of shaft 354 in the direction for raising the hoist frame, the cam 389 is moved away from the switch operating element 110', releasing the contacts of switch LS-110 so that they return to the positions shown in Fig. 53A.

The limit switch LS-111 has an operating element 111' which is positioned for operation by the tail 390' of the pawl 390 (Fig. 10) when said pawl is removed from engagement with ratchet wheel 391 upon energization of solenoid 393. As long as said pawl is engaged with said ratchet wheel, the movable contact 801 of the switch LS-111 is out of engagement with the associated pair of stationary contacts 800, as shown in Fig. 53A. When, however, the solenoid 393 is energized, and pawl 390 thereupon disengaged from ratchet wheel 391, the tail 390' of said pawl actuates the element 111', whereby the contact 801 aforementioned is moved into engagement with stationary contacts 800. A circuit is thereby closed for energizing the motor 361 in the direction for lowering the hoist frame, provided that the contact 803 of limit switch LS-110 engages the contacts 802 (as it does in the normal position of said switch).

*Limit switches operable by delivery and receiving transfer cars*

The delivery station 49 is provided with a limit switch LS-1 (Fig. 56), while the stalls 31—36 in the aisle B are provided with limit switches designated LS-2 through LS-7, respectively. Likewise, the receiving station 29 has a limit switch LS-11, while the stalls 61—66 in the aisle E are provided with limit switches designated LS-12 through LS-17, respectively.

Each of the aforementioned limit switches is of conventional type, and, as shown in Fig. 53C, comprises a movable contact normally engaged with a pair of stationary contacts, designated A, and a movable contact operable in unison with the first-mentioned movable contact and normally disengaged from another pair of stationary contacts, designated B. One of the pair of the stationary contacts A of switch LS-1 is connected by a wire 816 to one of a pair of normally closed contacts 817 of a relay TCP-1. The other of said pair of normally closed contacts 817 is connected to a wire 818, which in turn is connected as hereinafter described.

The other of the pair of contacts A of switch LS-1 is connected by a wire 819 to one terminal of a relay TCD, the opposite terminal of which relay is connected by wire 820 to the negative supply line.

One of the pair of contacts B of switch LS-1 is connected by wire 821 to the aforementioned wire 816. The other of said pair of contacts B is connected by wire 822 to one of a pair of contacts B of the limit switch LS-11. The other of said contacts B of the switch LS-11 is connected by wire 823 to one terminal of a relay TCP, the opposite terminal of which relay is connected by wire 824 to wire 820 and hence to said negative supply line.

One of the pair of contacts A of switch LS-11 is connected by wire 825 to wire 816, while the other of said pair of contacts is connected by wire 825' to a terminal of a relay TCR. The other terminal of said relay is connected to the negative supply through wires 824 and 820.

It will thus be noted that the relays TCD, TCR, and TCP are connected in parallel; relay TCD being controlled by the contacts A of switch LS-1, relay TCR by the contacts A of switch LS-11, and relay TCP by the contacts B of both switches LS-1 and LS-11.

Another relay, designated TCP-1, has one terminal connected to the negative line through wires 824 and 820, and its opposite terminal connected to the positive supply line by wire 826, contacts 827 of said relay TCP-1, wire 828, normally closed contacts 829 of relay TCP, and wire 830. The contacts 827 of relay TCP-1 are normally open, but may be bridged by depression of push-botton switch PB-2. The latter has a pair of stationary contacts 831, one of which is connected to wire 826 and the other to wire 828. On depression of said push-button switch, its movable contact engages said stationary contacts with resultant energization of relay TCP-1. The contacts 827 of said relay thereupon close and maintain said relay TCP-1 energized despite release of the push-button switch PB-2.

One of the pair of contacts A of switch LS-2 is connected by wire 832 to contact 833 of a normally open hand switch designated 1. The movable contact of said hand switch is connected by wire 834 to the positive supply line. Connected in parallel with said hand switch, between wires 832 and 834, are normally open contacts 835 of relay TCP-1.

The other of the pair of contacts A of switch LS-2 is connected by wires 836 and 837 to the aforementioned wire 819.

One of the pair of contacts A of switch LS-12 is connected to wire 832 and the other to a wire 838 which in turn is connected to the previously mentioned wire 825'.

One of the pair of contacts B of switch LS-2 is connected to wire 832 and the other to one of the contacts B of switch LS-12. The other of the pair of contacts B of switch LS-12 is connected to a wire 839, connected to the previously mentioned wire 823.

It will be apparent that the hand switch 1 controls the supply of current through the limit switches LS-2 and LS-12, so long as relay TCP-1 is deenergized.

Other hand switches, designated 2, 3, 4, 5, and 6, control the supply of current from the positive supply line to the respective pairs of limit switches LS-3 and LS-13, LS-4 and LS-14, LS-5 and LS-15, LS-6 and LS-16, and LS-7 and LS-17. More specifically, the movable contacts of the respective hand switches 2-6, inclusive, are connected by wires 840—844 with the positive supply line, while the stationary contacts of said hand switches are connected by wires 845—849 with respective ones of the pairs of contacts A of the switches LS-3 through LS-7. The others of said pairs of contacts A are connected to wire 837.

One of the contacts A of each switch LS-13 through LS-17 is connected to a corresponding one of the aforementioned wires 845—849, while each of the other of said contacts A is connected to wire 838.

One of the contacts B of each switch LS-3 through LS-7 is connected to a corresponding one of said wires 845—849, while each of the other of said contacts B is connected to a contact B of a respective one of the switches LS-13 through LS-17. The others of the pairs of contacts B of switches LS-13 through LS-17 are connected to wire 839.

It will be noted that the hand switches 1–6 correspond respectively to the rows I-VI in which the stalls of aisles B and E are located. If, for instance, the hand switch 2 be closed, current is supplied to contacts A of switches LS-3 and LS-13 in the stalls (32 and 62) in row II of said aisles B and E, and so long as said contacts A are closed the relays TCD and TCR will be energized. As will be more particularly noted hereinafter, said relays TCD and TCR control the supply of power to the delivery and receiving transfer cars.

Similarly, if, for example, the hand switch 4 be closed, relays TCD and TCR will be energized by way of contacts A of limit switches LS-5 and LS-15 in the fourth row of stalls (34 and 64) in aisles B and E so long as contacts A of said limit switches are closed.

As previously noted, the contacts A of the limit switches LS-1 through LS-7, and LS-11 through LS-17, are normally closed, while contacts B of said switches are normally open. The limit switches LS-11 through LS-17 are adapted to be actuated by a cam 622 on the receiving transfer car 37. Thus, in Fig. 58, said transfer car is shown in the first stall beyond the receiving station in aisle E, in which position the cam 622 engages and operates the element 12' of the limit switch LS-12. Thereby the movable contact of said switch normally engaging the contacts A is disengaged from said contacts, and the other movable contact is engaged with contacts B.

It will be understood that the delivery transfer car is provided with a similar cam for operating any of the switches LS-1 through LS-7 and thereby opening the contacts A and closing the contacts B of such switch.

*Limit switches operable by hoist car*

Each of the stalls in the aisles A, C, D, and F is provided with a limit switch operable by the aforementioned cam 625 on the hoist car. As shown in Fig. 53C, these limit switches are of a conventional type, having a single movable contact normally engaging a pair of stationary contacts.

The stalls 21–26 in aisle A have limit switches designated LS-21 through LS-26, respectively, in Figs. 53B and 56. Likewise, the stalls 41–46 in aisle C have limit switches designated LS-41 through LS-46, the stalls 51–56 in aisle D have limit switches LS-51 through LS-56, and the stalls 71–76 in aisle F have limit switches LS-71 through LS-76.

The pairs of stationary contacts of switches LS-21 through LS-26 are connected in series with a hand switch A, as shown in Fig. 53C, between the positive supply line and a wire 861. Connected between said wire 861 and the negative supply line are normally closed contacts 862 of a relay HCP-1 and, in series therewith, a relay HCP-2. Thus, when hand switch A is closed, the relay HCP-2 will be energized as long as the switches LS-21 through LS-26 are closed and contacts 862 are closed.

Similarly, the pairs of stationary contacts of limit switches LS-41 through LS-46 are connected in series with a hand switch C, between the positive supply line and wire 861; the pairs of contacts of switches LS-51 through LS-56 are connected in series with hand switch D, between said positive line and said wire 861; and the pairs of contacts of switches LS-71 through LS-76 are in series with hand switch F between said positive line and said wire 861. Thus, upon closing of any of said hand switches C, D, or F, the relay HCP-2 will be energized so long as the series of limit switches in the corresponding aisle are all closed and the contacts 862 of relay HCP-1 are closed.

The limit switch LS-31 on the delivery transfer car, as previously noted, has one of its stationary contacts connected by wire 716 to a brush B'' engaging a feed rail that is connected to conductor 38C, while the other stationary contact is connected to a wire 717. The latter is connected to a brush B'' that engages a feed rail which is connected to conductor 39C, which in turn is connected to a terminal of a relay HCP-1. The other terminal of said relay is connected to the negative supply line.

Connected to the positive supply line by a wire 863 is the movable contact of a hand switch B, the stationary contact of which is connected to said conductor 38C. Normally open contacts 864 of relay HCP-1 are connected across said switch B, between wires 863 and 38C. In addition a push-button switch PB-1 is connected between said wires and across said switch B, as shown.

It is apparent that relay HCP-1 will be energized by closing either switch B or push-button switch PB-1 so long as limit switch LS-31 is closed.

Limit switch LS-61 on the receiving transfer car, as previously described, has one of its stationary contacts 676 connected by wire 677 to a brush E'' engaging a feed rail which receives current from conductor 52C, while the other of said stationary contacts is connected to a wire 678. The latter wire is connected to a brush E'' which engages a feed rail connected to a conductor 36C, which, in turn, is connected to wire 861.

Connected to the positive supply line by a wire 865 is the movable contact of a hand switch E, the stationary contact of which is connected to wire 52C. When said hand switch E is closed, it is apparent that relay HCP-2 will be energized, so long as switch LS-61 is closed and the contacts 862 of relay HCP-1 are closed.

*The receiving sequence switch*

The switch for controlling the "receiving sequence," later to be described, is shown in Fig. 53B. It is hand-operated, and comprises seventeen pairs of contacts designated R-1 through R-17; each pair comprising a movable contact and a stationary contact engageable thereby. The movable contacts are mechanically connected for actuation in unison by the operator, into and out of engagement with the corresponding stationary contacts.

The movable contact R-1 is connected directly to one end of the previously mentioned conductor 52C which in turn is connected at its other end to the feed rail of the receiving transfer car that is engaged by the brush E''' connected to limit switch LS-61 (Fig. 53C).

The stationary contact R-1 is connected directly to one end of a wire 866, the other end of which is connected to the positive feed line. Thus, whenever the movable contact R-1 engages its stationary contact, the conductor 52C, the wire 677 (Fig. 53B), and corresponding contacts 676 of limit switch LS-61 on the receiving transfer car are connected to the positive supply, even though hand-switch E (Fig. 53C) be open.

Movable contact R-2 is connected to the previously mentioned wire 818, an end of which is connected to one of the normally closed contacts 817 of relay TCP-1 (Fig. 53C). The stationary contact R-2 is connected to the positive supply line, as shown in Fig. 53B. Hence, whenever contact R-2 engages its stationary contact, the wire 818 and corresponding contact 817 of relay TCP-1 are connected to the positive supply.

Movable contact R-3 is connected to one of a pair of normally open contacts 869 of relay HCP-2, the other contact of which is connected to one of a pair of normally open contacts 871 of relay TCP-1. The other of the last mentioned pair of contacts is connected to one of a pair of normally closed contacts 872 of the relay TCP. The other of said normally closed contacts is connected to the positive supply line (Fig. 53B).

The stationary contact R-3 is connected to a wire 63', which in turn is connected by a wire 63" to the conductor 63C. The latter, as previously noted, is connected to the feed rail engaged by that one of the brushes E" (Fig. 53A) which is connected to one of the contacts 660 of limit switch LS-104 on the receiving transfer car. Said conductor is also connected to the feed rail B' (Fig. 53A) engaged by brush B" of the delivery transfer car that is connected to one of the contacts 702 of limit switch LS-102.

Movable contact R-4 is connected with one of a pair of normally open contacts 874 of relay TCD, the other contact of said pair 874 being connected to the first mentioned contact of the normally open pair 871 of relay TCP-1. Also, said other contact of said pair 874 is connected to one of a pair of normally open contacts 877 of relay TCR.

The stationary contact R-4 is connected to a wire 68', which in turn is connected to the conductor 68C previously referred to. The latter, as hereinbefore noted, is connected to the feed rail B' of the delivery transfer car engaged by the brush B" which is connected by wire 679 to the drive motor 455' to supply current to the latter for driving said delivery transfer car in the forward direction.

Movable contact R-5 is connected with the other of the aforementioned pair of normally open contacts 877 of relay TCR, the first-mentioned one of which is connected to one of the aforementioned normally open contacts 871 of relay TCP-1, and to one of the normally open contacts 874 of relay TCD. The stationary contact R-5 is connected to a wire 69', which is connected to the conductor 69C (Fig. 53A), which, as noted hereinbefore, is connected to that one of the receiving transfer feed rails E' that is engaged by the brush E" connected through wire 630 to the "forward" terminal of the drive motor 455.

Movable contact R-6 is connected by conductor 123 to one of a pair of normally open contacts 878 of relay HCP-2, the other of which contacts is connected to one of a pair of normally closed contacts 880 of relay TCP-1. The other of the normally closed contacts 880 is connected to one of a pair of normally open contacts 881 of relay HCP-2, the other of which contacts 881 is connected to the positive supply line. The stationary contact R-6 is connected to wire 71', which in turn is connected by a wire 71" to the conductor 71C. The latter is connected (Fig. 53A) to the feed rail and brush connected to one of the contacts 650 of the receiving transfer car limit switch LS-103, and also to the feed rail and brush connected to one of the contacts 693 of the limit switch LS-101 of the delivery transfer car.

Movable contact R-7 is connected to conductor 75C, which is connected to the feed rail and brush of the receiving transfer car that are connected to one of the contacts 665 of limit switch LS-103. The stationary contact R-7 is connected to wire 73' which in turn is connected to the aforementioned conductor 73C. The latter (Fig. 53A), as previously noted, is connected to hoist car brush 727 which is connected to one of the contacts 759 of the hoist car limit switch LS-106.

Movable contact R-8 is connected by wire 883 to conductor 70C and one of the aforementioned normally closed contacts 880 of relay TCP-1. The stationary contact R-8 is connected by wire 78' to conductor 78, which in turn is connected (Fig. 53A) to the hand-operated hoist-car direction-switch 884, engageable either with contact F-1 or contact R'-1. Said contact F-1 is connected with hoist-car brush 719 and wire 718 for supplying current to the "forward" terminal of the hoist-car drive motor 414. Contact R-1 is connected through wire 897, conductor 80, and hoist-car brush 720, with wire 762 for supplying current to the "reverse" terminal of said motor.

Movable contact R-9 is connected with one of a pair of normally closed contacts 886 of relay HCP-2, the other of which contacts is connected to the positive supply line. Stationary contact R-9 is connected through a wire 84' to conductor 84, which (Fig. 53A) is connected through hoist car brush 723 to one of the contacts 751 of limit switch LS-105 on said hoist car.

Movable contact R-10 is connected through normally closed contacts 887 of relay HCP-2, and a wire 88', to the conductor 88 which (Fig. 53A) is connected through hoist-car brush 726 to one of the contacts 763 of limit switch LS-105. The other of said limit switch contacts, as previously observed, is connected through hoist car brush 724 to conductor 87. Said conductor 87, in turn, is connected to a wire 87' (Fig. 53B) which is connected to the positive supply line through normally closed contacts 890 of relay TCP, and previously mentioned normally-closed contacts 886 of relay HCP-2. The stationary contact R-10 is connected through the aforementioned wire 63", conductor 63C, and a brush of the receiving transfer car, to one of the contacts 660 of limit switch LS-104; and is also connected, through said conductor 63C and a brush of the delivery transfer car, to one of the contacts 702 of limit switch LS-102.

Movable contact R-11 is connected to one of a pair of normally open contacts 888 of relay TCD. The other of said contacts 888 is connected by a wire 889 to the wire 87', which, as has been noted is connected to the positive supply line through normally closed contacts 890 of relay TCP, and the normally closed contacts 886 of relay HCP-2. Stationary contact R-11 is connected to conductor 117, which, as hereinbefore pointed out, is connected through one of the delivery transfer car brushes B" and wire 705 (Fig. 53A) to the "reverse" terminal of the drive motor 455' for said transfer car.

Movable contact R-12 is connected to one of a pair of normally open contacts 891 of relay TCR, the other of which contacts is connected by wire 889 to the normally closed contacts 890 of relay TCP and thence to the positive supply line through the normally closed contacts 886 of relay HCP-2. The stationary contact R-12 is connected to conductor 118, which, as noted previously, is connected through a brush E'' of the receiving transfer car and wire 664 to the "reverse" terminal of the drive motor 455 for said transfer car.

Movable contact R-13 is connected to one of a pair of normally closed contacts 892 of relay HCP-2 and thence to one of a pair of normally open contacts 893 of relay TCP, the other of which pair of contacts is connected to the positive supply line by way of the normally closed contacts 886 of relay HCP-2. Stationary contact R-13 is connected by wire 71'' through wire 71'' to conductor 71C, which, as previously described, is connected through a brush E''' of the receiving transfer car to one of the contacts 650 of limit switch LS-103, and through a brush B'' of the delivery transfer car to one of the contacts 693 of limit switch LS-101.

Movable contact R-14 is connected through wire 130' to conductor 130, which, as described hereinbefore, is connected through a brush of the delivery transfer car to one of the contacts 708 of limit switch LS-101. Stationary contact R-14 is connected through wire 89'' to conductor 89 which is in turn connected, through hoist car brush 734 to one of the contacts 802 of limit switch LS-110.

Movable contact R-15 is connected through wire 92' to conductor 92, which is in turn connected through hoist car brush 726 to one of the pair of stationary contacts 812 of switch LS-110. The other of said stationary contacts 812 is connected through wire 772 and brush 725 to conductor 131, and thence through wire 131' to one of the normally open contacts 893 of relay TCP and to one of the normally closed contacts 892 of relay HCP-2. The stationary contact R-15 is connected by wire 111'' with conductor 111, which is connected through hoist-car brush 728 with one of the pair of stationary contacts 774 of switch LS-107. As noted hereinbefore, the other of said contacts 774 is connected by wire 112'' with the "engage" terminal of coupler motor 383.

The movable contact R-16 is connected through wire 108'' to conductor 108, which, through hoist-car brush 729, is connected to one of the contacts 780 of switch LS-107. The stationary contact R-16 is connected through wire 96'' to conductor 96, and thence, through hoist-car brush 733, to one of the contacts 796 of switch LS-109.

Movable contact R-17 is connected to the positive supply line. The stationary contact R-17 is connected by wire 151' to conductor 151, and thence through hoist-bar brush 721 (Fig. 53A) to the contacts 744, 746, 747 of the respective brake-relays HCB-1, HCB-2, and HCB-3. Also, as previously described, said conductor 151 is connected through wire 808 with contacts 804 and 807 of brake-relays HDB-1 and HLB-2, and with contacts 803 of relay HLB-2. In addition, it will be noted that conductor 151 is connected, through a brush B'' with contacts 687, 689, and 690 (Fig. 53A) of the respective brake-relays DTCB-1, DTCB-2, AND DTCB-3, of the delivery transfer car. Said conductor 151 is further connected, through a brush E'', with contacts 643, 645, and 646 of the respective brake relays RTCB-1, RTCB-2, and RTCB-3 of the receiving transfer car.

The receiving sequence

The "Receiving" sequence covers the operation of transporting the empty hoist frame 270 on the hoist car 38 from the delivery station 49 to the receiving station 29, lowering the hoist frame on to a loaded dolly, coupling the hoist frame to the dolly, and hoisting the dolly and load to a raised position in readiness for the "Park" sequence.

At the outset of the receiving sequence the conditions are as follows:

1. The receiving transfer car 37 is at the receiving station 29. Switch LS-11 (Fig. 53C) is thus actuated by cam 622 on said transfer car, so that contacts A of said switch are opened and contacts B are closed.

2. Aligning plungers of the receiving transfer car are engaged with the corresponding aligning guides at the receiving station 29. Through cam 620 on aligning plunger 490 (Fig. 4) of said transfer car the limit switch LS-103 (Fig. 53A) is actuated, opening contacts 650, and closing contacts 665 and 667.

3. The delivery transfer car 37' is at the delivery station 49. Switch LS-1 (Fig. 53C) is thus actuated by a cam on the delivery transfer car, so that contacts A of said switch are opened and contacts B are closed.

4. Aligning plungers of the delivery transfer car are engaged with the corresponding aligning guides at the delivery station 49. Through a cam on one of said aligning plungers similar to cam 620 on a plunger of the receiving transfer car, the limit switch LS-101 (Fig. 53A) is actuated, opening contacts 693 and closing contacts 706 and 708.

5. The hoist car is in raised position on the delivery transfer car. Its cam 625 has actuated limit switch LS-31 on said transfer car, opening the contacts 715 of said switch.

6. The hoist car plungers 428, 429 are engaged with the corresponding aligning guides on the delivery transfer car. Cam 623 on plunger 428 (Fig. 55) has thus actuated the limit switch LS-105, opening contacts 751, and closing contacts 763 and 765.

7. The hoisting frame 270 is empty and in raised position. Since said frame is raised, the cam 309 (Fig. 9) has actuated the limit switch LS-109, opening its contacts 796.

8. The hoist-frame coupler-tubes 281, being disengaged from the dolly sockets, cam 387 (Fig. 9) has operated the limit switch LS-108, opening the contacts 778 and 788 of said switch, and closing the contacts 786.

Figure 59A:
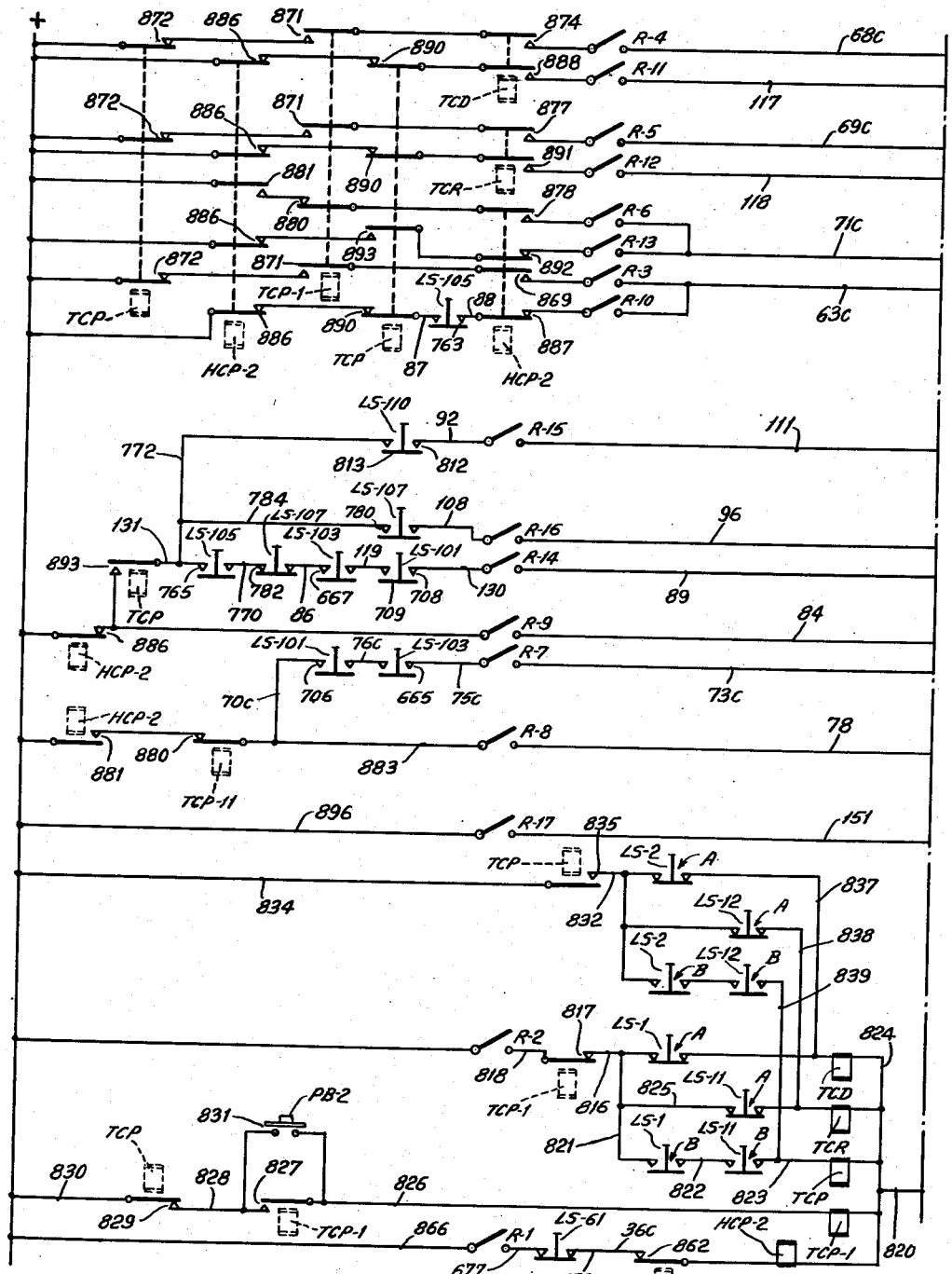
Fig. 59A is a simplified wiring diagram showing connections between the contacts of the "receiving" sequence switch and contacts of various relays and limit switches.
Figure 59B:
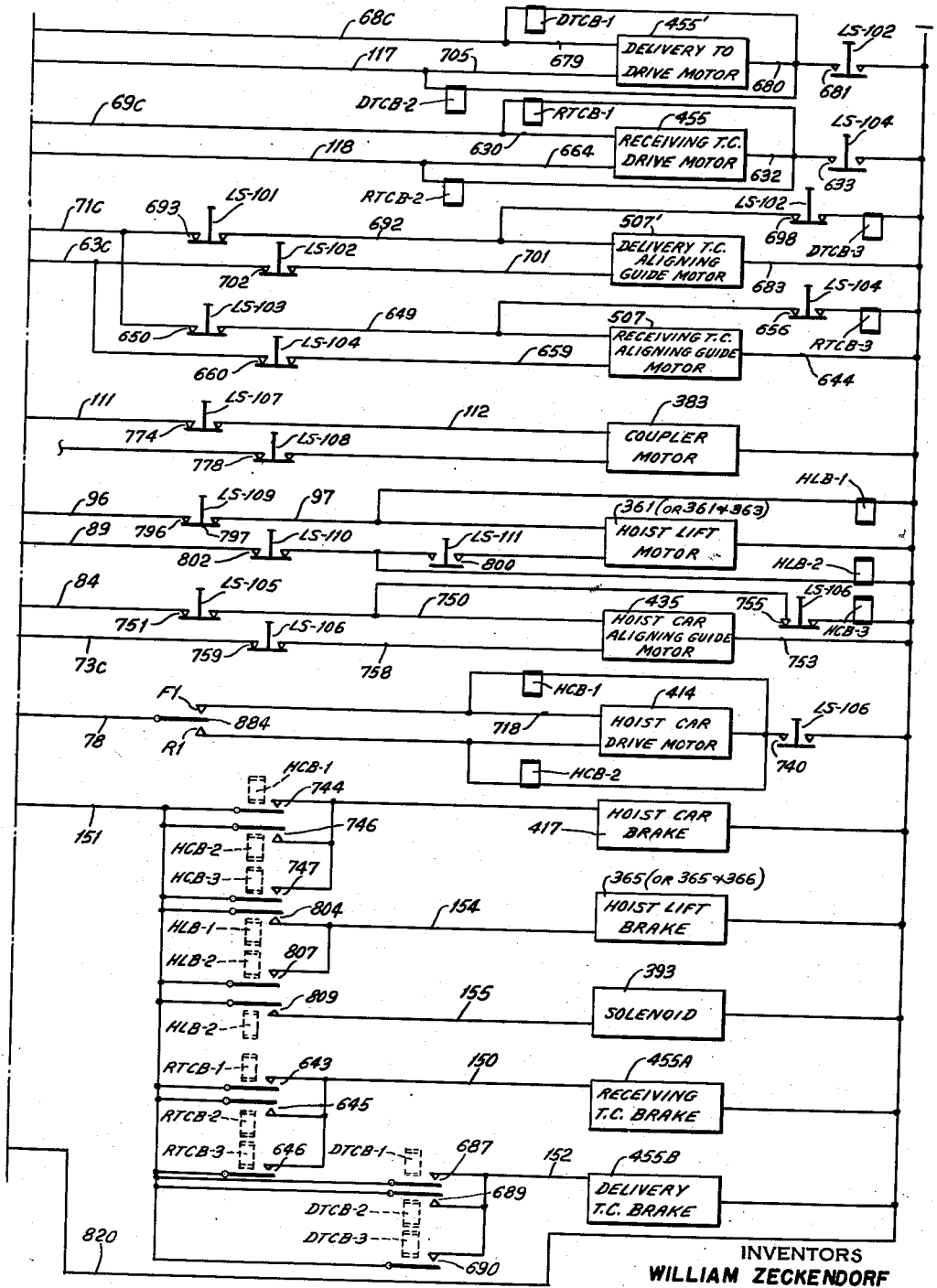
Fig. 59B is a continuation of Fig. 59A, showing connections between the "receiving" sequence switch contacts and apparatus on the hoist and transfer cars.

To assist in tracing the various circuits involved in the receiving sequence, reference may be made to the wiring diagram in Figs. 59A and 59B, in which the connections involved in said sequence are shown in simplified form.

The receiving sequence is initiated by the operator or attendant as follows:

1. Switch blade 884 (Figs. 53A and 59B) is engaged with contact F-1.

2. The push-button switch PB-2 (Figs. 53C and 59A) is depressed.

3. The "receiving sequence" switch is closed.

The engagement of switch blade 884 with contact F-1 connects the wire 78 with wire 718.

The depression of the push-button switch PB-2 closes its contacts 831, so that relay TCP-1 is energized. Current flows from the positive supply line through wire 830, the normally closed contacts 829 or relay TCP, wire 828, closed contacts 831 of switch PB-2, wire 826, relay TCP-1, and wire 820 to the negative line. The energization of relay TCP-1 closes its contacts 827 so that the circuit through said relay remains established even though the operator now releases the pushbutton switch PB-2.

The energization of relay TCP-1 also closes the contacts 835 of said relay, with resultant energization of relays TCD and TCR. Current from the positive line flows through wire 834, said closed contacts 835 of relay TCP-1, wire 832, the normally closed contacts A of limit switch LS-2 in stall 31, wire 837, relay TCD, wire 824, and wire 820 to the negative line. Current also flows from said closed contacts 835 of relay TCP-1 through the normally closed contacts A of limit switch LS-12 in stall 61, wire 838, relay TCR, wire 824, and wire 820 to the negative line. It will be noted, in Fig. 53C, that a normally open hand switch 1 is shown connected in parallel with said contacts 835 of relay TCP-1; but this hand switch has been omitted in Fig. 59A, since it is not operated in the receiving sequence, and the closing of said contacts 835 suffices to energize the relays TCD and TCR through the closed contacts A of the respective switches LS-2 and LS-12.

The closing of the "receiving sequence" switch simultaneously closes all of its contacts R-1 through R-17 previously described.

The closing of contacts R-1 energizes the relay HCP-2. Current flows from the positive line through wire 866, contacts R-1, wire 52C, wire 677, limit switch LS-61, wire 678, wire 36C, normally closed contacts 862 of relay HCP-1, and relay HCP-2 to the negative line.

Closing of the contacts R-3 establishes a "disengage" circuit to the aligning guide motor 507 of the receiving transfer car. This circuit is from the positive line through normally closed contacts 872 of relay TCP, closed contacts 871 of energized relay TCP-1, closed contacts 869 of energized relay HCP-2, contacts R-3, wire 63C, the closed contacts 660 (Fig. 59A) of the limit switch LS-104 on the receiving transfer car, wire 659, and motor 507 to the negative line.

Concurrently, the closing of said contacts R-3 establishes a "disengage" circuit to the aligning guide motor 507' of the delivery transfer car by way of the same relay contacts above referred to, in series with said contacts R-3, and thence through wire 63C, the closed contacts 702 (Fig. 59A) of limit switch LS-102, wire 701, and motor 507' to the negative line.

Said aligning guide motors 507 and 507' of the respective transfer cars thus operate to disengage the aligning plungers of said cars from the associated aligning guides at the receiving and delivery stations. When the receiving transfer car plungers are disengaged from the sockets at the receiving station and arrive in their fully retracted positions, the aforementioned cam 621 (Fig. 4) on plunger 493 actuates the limit switch LS-104, opening the contacts 660 of said switch and breaking the circuit through the motor 507. Said motor thereupon stops.

Likewise, the complete retraction of the plungers of the delivery transfer car from the associated guides at the delivery station effects operation of limit switch LS-102 (by a cam on one of said plungers as previously mentioned), so that the contacts 702 of said switch are opened, and motor 507' is deenergized. That motor thus also stops.

The aforementioned operation of switches LS-104 and LS-102 also brings automatically into action the motors 455 and 455' of the transfer cars to drive the latter forwardly, i. e., away from the respective receiving and delivery stations. Specifically, the operation of switch LS-104 to open its contacts 660 also closed its contacts 633, with resultant establishment of a circuit through drive motor 455 by way of the sequence switch contacts R-5 as follows: from the positive line through the normally closed contacts 872 of relay TCP, closed contacts 871 of energized relay TCP-1, closed contacts 877 of energized relay TCR, contacts R-5, wire 69C, wire 630, the "forward" terminal of drive motor 455, through said motor and wire 632, and thence through closed contacts 633 of actuated switch LS-104 to the negative line.

Likewise, the operation of limit switch LS-102 to open its contacts 702 closed its contacts 681, with resultant establishment of a circuit through drive motor 455' by way of sequence switch contacts R-4 as follows: from the positive line through the normally closed contacts 872 of relay TCP, the closed contacts 871 of energized relay TCP-1, closed contacts 874 of energized relay TCD, contacts R-4, wire 68C, wire 679, the "forward" terminal of drive motor 455' for the delivery transfer, through said motor and wire 680, and thence through closed contacts 681 of actuated switch LS-102 to the negative line.

The closing of the contacts 633 of switch LS-104 also energizes the brake relay RTCB-1, which, as previously observed, is connected in parallel with drive motor 455 of the receiving transfer car, between wires 630 and 632. The contacts 643 of relay RTCB-1 are thus closed, establishing a circuit through the brake mechanism 455A of the receiving transfer car as follows: from the positive supply line through wire 896, contacts R-17, wire 151, contacts 643 of relay RTCB-1, wire 150, and brake mechanism 455A to the negative supply line.

Likewise, the closing of the contacts 681 of switch LS-102 energizes the brake relay DTCB-1, which is connected in parallel with drive motor 455'. A circuit is thus established from the positive line through wire 896, contacts R-17, wire 151, contacts 687 of relay DTCB-1, wire 152, and the brake mechanism 455B of the delivery transfer car to the negative line.

Thus said brake mechanisms are released concurrently with the energization of the drive motors 455 and 455'. The transfer cars are thus driven by said motors, away from the respective receiving and delivery stations 29 and 49.

During the movement of the receiving transfer car away from the receiving platform 29, the cam 622 on said car moves away from the limit switch LS-11, releasing the latter so that its contacts A close and its contacts B open. When the car moves over the stall 61 (i. e., the first stall in aisle E) the cam 622 operates the limit switch LS-12, opening the contacts A, and thereby breaking the circuit through relay TCR. The contacts 877 of said relay thus open, breaking the circuit through the drive motor 455, as well as the circuit through the brake relay RTCB-1. The drive motor 455 thus stops and the brakes are applied, stopping the receiving transfer car over the stall 61.

Similarly, as the delivery transfer car moves away from the delivery platform 49, a cam thereon moves away from the limit switch LS-1, releasing the latter so that its contacts A close and its contacts B open. When said car moves over the stall 31 (i. e., the first stall in aisle B) the said cam operates the limit switch LS-2, opening its contacts A and thus deenergizing the relay TCD. The contacts 874 of relay TCD are thus opened, breaking the circuit through drive motor 455' as well as through the brake relay DTCB-1. Said drive motor thus stops and the brakes are applied, stopping the delivery transfer car over the stall 31.

The aforementioned operation of the limit switches LS-2 and LS-12 in the respecting stalls 31 and 61 not only opens their contacts A, but also closes their contacts B. Thereupon, the relay TCP is energized, through wire 834, contacts 835 of relay TCP-1, contacts B of switch LS-2, contacts B of switch LS-12, and wire 839. Upon energization of said relay TCP, relay TCP-1 is deenergized, due to the opening of the contacts 829 of relay TCP. The energization of relay TCP then ceases, due to the opening of contacts 835 of relay TCP-1. Relay TCP-1, however, remains deenergized, despite the deenergization of relay TCP and closing of the contacts 829, because as soon as relay TCP-1 is deenergized its contacts 827 are opened, so that current cannot flow to said relay TCP-1 (assuming that the operator has in the meantime released the push-button switch PB-2, as is intended since said switch may be released promptly after its depression).

Relays TCR and TCD are now again energized by way of the sequence switch contacts R-2, the contacts 817 of relay TCP-1 which are closed upon deenergization of said relay, and the closed contacts A of the respective limit switches LS-1 and LS-11 at the delivery and receiving stations.

Upon deenergization of said relay TCP-1 its contacts 880 are also closed, so that the transfer car aligning motors 507 and 507' are energized in the direction for engaging aligning plungers of the respective transfer cars with the associated sockets in the stalls 61 and 31. Specifically, current now flows from the positive line through sequence switch contacts R-6, by way of closed contacts 881 of energized relay HCP-2, normally closed contacts 880 of relay TCP-1, and closed contacts 878 of energized relay HCP-2; and thence from said sequence switch contacts R-6, to wire 71C, whence the current divides; part of it flowing through contacts 693 (Fig. 59A) of limit switch LS-101, wire 692, the engage" terminal of the aligning motor 507' of the delivery transfer car, and then through said motor and wire 683 to the negative line. Another part of said current flows from wire 71C through contacts 650 of limit switch LS-103, wire 649, the "engage" terminal of aligning motor 507 of the receiving transfer car, and thence through said motor and wire 644 to the negative line.

Thus, the transfer car aligning motors 507 and 507' aforesaid are set in operation and extend outwardly the aligning plungers of their respective transfer cars toward the associated aligning sockets in stalls 61 and 31. It has been noted that, when said plungers were previously moved into their completely retracted positions a cam 621 on plunger 493 of the receiving transfer car actuated the limit switch LS-104, opening the contacts 660 of said switch (the limit switch LS-102 being similarly actuated by a cam on one of the plungers of the delivery transfer car to open its contacts 702). In the same operation, the contacts 656 of switch LS-104 were opened, and contacts 698 of switch LS-102 were also opened. Now in the first portion of the reverse or outward movement of said plungers the respective limit switches LS-104 and LS-102 are released as the associated plunger cams move away from said switches, and the respective pairs of switch contacts 656 and 698 are closed before the plungers reach the aligning sockets.

The closing of said contacts 656 establishes a flow of current through brake relay RTCB-3, which, as previously noted, is connected at one terminal to the negative line and at its other terminal, through contacts 656, to the wire 649. Thus, the brake relay RTC-3 is energized, and through its contacts 646, a circuit is closed through the brake mechanism 455A, so that the brakes of the receiving transfer car are released before the plungers of said car engage any aligning sockets. Thereby, during the further outward movement of the plungers into engagement with the sockets, said transfer car is free to move in one direction or the other to such extent as may be necessary for full engagement of the plungers and sockets, so that said car is brought into precise alignment with the stall.

Likewise, the closing of contacts 698 of switch LS-102 establishes a flow of current through brake relay DTCB-3, connected at one terminal to the negative line and at its other terminal, through said contacts 698, to wire 692. Thus said brake relay DTCB-3 is energized, and, through its contacts 690, establishes a circuit through the brake mechanism 455B so that the brakes of the delivery transfer car are released before engagement of its plungers with the aligning sockets. The delivery transfer car is thus freed for such movement as may be necessary in order for full engagement of said plungers and sockets to be effected.

When the aligning sockets in said stall 61 are fully engaged by plungers on the receiving transfer car, the cam 629 on plunger 490 actuates the switch LS-103, opening the contacts 650 of said switch and thereby deenergizing both the aligning motor 507 and the brake relay RTCB-3. Said motor thus stops and the brakes are reapplied to said transfer car.

Similarly, when the sockets in stall 31 are fully engaged by plungers on the delivery transfer car, a cam on one of the plungers of said car actuates the limit switch LS-101, opening its contacts 693, and deenergizing both the aligning motor 507' and the brake relay DTCB-3. Said motor thus stops and the brakes are reapplied to the delivery transfer car.

The operation of switch LS-103 to open its contacts 650 also closed its contacts 665; while the operation of switch LS-101 to open contacts 693 closed its contacts 706. A "disengage' circuit is thereby established through the hoist car aligning motor 435, by way of sequence-switch contacts R-7 as follows: from the positive line through contacts 881 of relay HCP-2, contacts 880 of relay TCP-1, wire 70C, contacts 706 of switch LS-101, wire 76C, contacts 665 of switch LS-103, and wire 75C, thence through said sequence switch contacts R-7, wire 73C, contacts 759 of hoist car limit switch LS-106, wire 758, to the "disengage" terminal of said motor 435, and then through said motor and wire 753 to the negative line.

Said aligning motor 435 thus operates to withdraw the hoist car aligning plungers 428 and 429 from the aligning sockets on the delivery transfer car. When said plungers are fully retracted, the cam 624 on the plunger 429 actuates the limit switch LS-106, opening its contacts 759, and deenergizing said motor. At the same time, the contacts 740 of said switch LS-106 are closed, energizing the motor 414 in the direction to drive the hoist car forwardly, i. e., from the delivery transfer car toward the receiving transfer car. The circuit thus established through said motor is by way of sequence switch contacts R-8, as follows: from the positive supply line through contacts 881 of relay HCP-2, and contacts 880 of relay TCP-1, thence through said sequence switch contacts R-8, wire 78, hand switch contact 884, contact F-1, wire 718, to the "forward" terminal of motor 414, and then through said motor, wire 739 and contacts 740 of switch LS-106 to the negative supply line. Also, a circuit is completed through the brake relay HCB-1, connected in parallel with motor 414 between wires 718 and 739. The hoist car brake mechanism 417 is thus released, through contacts 744 of relay HCB-1, and the motor 414 drives the hoist car from the delivery transfer car to the receiving transfer car.

As the hoist car starts moving away from the delivery transfer car, its cam 625 releases the limit switch LS-31 on said transfer car, so that the contacts 715 of said switch are closed. When the hoist car moves into position on the receiving transfer car, said cam 625 actuates the limit switch LS-61, opening the contacts 676 of said switch and breaking the circuit through the relay HCP-2. The contacts 881 of said relay HCP-2 are thus opened, with resultant deenergization of both the motor 414 and the brake relay HCB-1. Said motor thus stops and the brakes are applied.

Upon deenergization of the relay HCP-2, its contacts 886 (Fig. 59A) are closed, establishing a circuit through the aligning motor 435 so that the latter actuates the plungers 428 and 429 into engagement with the corresponding aligning sockets on the receiving transfer car. Specifically, said circuit is by way of sequence switch contacts R-9, as follows: from the positive line through said contacts 886 of relay HCP-2, sequence switch contacts R-9, wire 84, contacts 751 of hoist-car limit-switch LS-105, wire 750, the "engage" terminal of motor 435, and thence through said motor and wire 753 to the negative line. As the aligning plungers 428 and 429 move toward the aligning sockets on said transfer car, the cam 624 on plunger 429 (Fig. 55) releases the limit-switch LS-106, so that its contacts 755 are closed, causing current to flow through the brake relay HCB-3, which is connected in parallel with motor 435 between the wire 750 and the negative supply line. Said relay HCB-3 is thus energized, and, through its contacts 747, establishes a circuit through the brake mechanism 417. The hoist car brakes are thus released so that, as the plungers 428 and 429 enter the aligning sockets, said hoist car may move to such extent as necessary to enable said plungers to engage said sockets fully and thus effect precise alignment of the hoist car on the receiving transfer car.

When said plungers 428 and 429 are fully engaged with said aligning sockets, the cam 623 on plunger 428 actuates the limit-switch LS-105, opening its contacts 751, and deenergizing both said motor 435 and brake relay HCB-3. Said motor thus stops and the hoist car brake mechanism 417 is reapplied.

In said operation of the limit-switch LS-105 by cam 623, the contacts 763 of said switch are closed, establishing "disengage" circuit through the aligning motors 507 and 507' of the respective delivery and receiving transfer cars, by way of the sequence switch contacts R-10. Specifically, current flows from the positive line, through contacts 886 of relay HCP-2, contacts 890 of relay TCP, wire 87, contacts 763 of switch LS-105, wire 88, contacts 887 of relay HCP-2, sequence switch contacts R-10, wire 63C, contacts 702 of switch LS-102, wire 701, the "disengage" terminal of the aligning motor 507' of the delivery transfer car, and thence through said motor and wire 683 to the negative line. Current also flows from said wire 63C through contacts 660 of switch LS-104, wire 659, the "disengage" terminal of the aligning motor 507 of the receiving transfer car, and thence through said motor and wire 644 to the negative line.

The aligning motors 507 and 507' thus operate to withdraw the aligning plungers of the transfer cars from engagement with the sockets in the stalls 31 and 61. When the plungers of said cars are fully disengaged from the stall sockets, cams on certain of the plungers actuate the respective limit switches LS-102 and LS-104, as previously described, opening the contacts 702 of switch LS-102 and also the contacts 660 of switch LS-104. The circuits through said motors 507 and 507' are thus broken, and the motors stop.

At the same time, the contacts 681 of switch LS-102 and contacts 633 of switch LS-104 are closed, energizing the drive motors 455' and 455 of the respective transfer cars to drive the latter reversely, or toward the respective delivery and receiving stations. The circuit thus closed through motor 455 is by way of sequence-switch contacts R-12, as follows: from the positive line, through contacts 886 of relay HCP-2, contacts 899 of relay TCP, contacts 891 of relay TCR, sequence switch contacts R-12, wires 118 and 664, the "reverse" terminal of motor 455, and thence through said motor, wire 632, and contacts 633 of switch LS-104, to the negative line. The circuit through motor 455' is by way of sequence-switch contacts R-11, as follows: from the positive line, through contacts 886 of relay HCP-2, contacts 890 of relay TCP, contacts 888 of relay TCD, sequence switch contacts R-11, wires 117 and 705, the "reverse" terminal of motor 455', and thence through said motor, wire 680, and contacts 681 of switch LS-102, to the negative line.

Concurrently with the aforementioned energization of said motors 455 and 455', the respective brake relays RTCB-2 and DTCB-2 in parallel with said motors are also energized, closing their contacts 645 and 689 and releasing the brakes of the receiving and delivery transfer cars.

In the initial portion of the movement of the receiving transfer car toward the receiving station, the cam 622 on said car releases the switch LS-12 in the stall 61, with resultant closing of the contacts A of said switch. When said car arrives at the receiving station, said cam actuates the limit switch LS-11, opening its contacts A and thus deenergizing the relay TCR. There by the contacts 891 of said relay are opened, and the motor 455 and brake-relay RTCB-2 are deenergized. The receiving transfer car is thus stopped at the receiving station.

Similarly, as the delivery transfer car starts moving from stall 31 toward the delivery station 49, the limit switch LS-2 in said stall 31 is released, and its contacts A are closed. When said car arrives at the delivery station, its cam actuates the limit switch LS-1, opening its contacts A and deenergizing the relay TCD. Thereby the contacts 888 of said relay are opened, and the motor 455' and brake-relay DTCB-2 are deenergized. The delivery transfer car is thus stopped at the delivery station.

In the aforementioned operations of the limit switches LS-1 and LS-11 by the cams of the respective transfer cars upon the arrival of said cars at the delivery and receiving stations, the contacts B of said switches are closed, with resultant energization of relay TCP. Contacts 893 of said relay thus close, establishing an "engage" circuit through the aligning motor 507 of the receiving transfer car by way of sequence-switch contacts R-13, as follows: from the positive line, through contacts 886 of relay HCP-2, contacts 893 of relay TCP, contacts 892 of relay HCP-2, sequence switch contacts R-13, wire 17C, contacts 650 of limit-switch LS-103, wire 649, the "engage" terminal of motor 507, and thence through said motor and wire 644 to the negative line. The motor 507 is thus energized and extends the transfer car plungers 490—493 outwardly. In the first portion of the outward movement of said plungers, the cam 621 on plunger 493 (Fig. 4) releases the limit-switch LS-104, whereupon the contacts 656 of said switch are closed, and current flows through the brake-relay RTCB-3, as previously noted. Thus the brakes of the receiving transfer car are released while the plungers move into full engagement with the associated aligning sockets at the receiving station. Upon complete engagement of the plungers and sockets, cam 620 on plunger 490 actuates limit switch LS-103, opening its contacts 650 and thus deenergizing both the motor 507 and brake-relay RTCB-3.

Likewise, the previously noted energization of relay TCP and closure of its contacts 893 closes an "engage" circuit through the delivery transfer car aligning motor 507', by way of said sequence switch contacts R-13, wire 71C, contacts 693 of switch LS-101, and wire 692. As said motor extends the plungers of said car outwardly toward the aligning sockets at the delivery station, the switch LS-102 is released, closing its contacts 698 and energizing the relay DTCB-3 so that the brakes of the delivery transfer car are released during the engagement of the plungers with the aligning sockets. Upon full engagement of said plungers and sockets, the switch LS-101 is actuated, opening its contacts 693 and deenergizing both the motor 507' and brake-relay DTCB-3.

Both transfer cars are thus stopped at the respective delivery and receiving stations and are locked in proper alignment therewith.

Upon the operation of the limit switches LS-101 and L-103 by the cams of the respective transfer cars, the contacts 708 and 667 of said switches are closed. Thereupon a circuit is closed through relay HLB-2, by way of sequence switch contacts R-14, as follows: from the positive line through contacts 886 of relay HCP-2, contacts 893 of relay TCP, wire 131, contacts 765 of hoist-car limit-switch L-105, wire 770, contacts 782 of hoist-car switch LS-107, wire 86, contacts 667 of limit-switch LS-103, wire 119, contacts 708 of limit-switch LS-101, wire 130, sequence switch contacts R-14, wire 89, contacts 802 of hoist-car limit switch LS-110, and relay HLB-2 to the negative supply line.

Upon energization of said relay HLB-2 its contacts 807 and 809 are closed. Contacts 807 establish a circuit through the brake mechanism 365 of the hoist left motor 361 (or through brake mechanisms 365 and 366 of motors 361 and 363) as follows: from the positive supply line through wire 896, sequence switch contacts R-17, wire 151, contacts 807 of said relay HLB-2, wire 154, said brake mechanism 365 (or 365 and 366), and thence to the negative line. The brakes associated with the hoist-drum shaft 354 are thus released.

The closure of contacts 809 of relay HLB-2 establishes a circuit through solenoid 393 (Fig. 10) on the hoist car as follows: from the positive line through wire 896, sequence switch contacts R-17, wire 151, contacts 809, wire 155, solenoid 393 and thence to the negative line. Said solenoid is thus energized and disengages pawl 390 from the ratchet-wheel 391 on the drum shaft 354. In moving out of engagement with the ratchet wheel 391, the pawl 390 actuates the limit-switch LS-111, closing its contacts 800 and completing a "down" circuit through the hoist car motor 361 (or 361 and 363 when two such motors are employed for operating the shaft 354). This circuit is by way of sequence-switch contacts R-14, as follows: from the positive line through contacts 886 of relay HCP-2, contacts 893 of relay TCP, wire 131, contacts 765 of switch LS-105, wire 770, contacts 782 of switch LS-107, wire 86, contacts 667 of switch LS-103, wire 119, contacts 708 of switch LS-101, wire 130, sequence switch contacts R-14, wire 89, contacts 802 of switch LS-110, contacts 800 of switch LS-111, the "down" terminal of motor 361 (or 361 and 363), and thence through said motor or motors to the negative supply line.

The drum shaft 354 is thus now operated to lower the hoisting frame 270 and bring its coupler-tube lugs 298 into the socket recesses 266 of the dolly at the receiving station. When said hoist-frame 270 is fully lowered, the limit switch LS-110 is actuated by the previously mentioned cam 389 on nut 388 which engages a threaded portion of the drum shaft 354. Contacts 802 of said switch LS-110 are thus opened, breaking the circuit through the drum shaft motor (or motors) as well as through the relay HLB-2. The drive for said drum shaft is thus stopped and the brakes associated therewith are reapplied. Also, the solenoid 393 is deenergized, releasing the pawl 390, which thereupon reengages the ratchet wheel 391.

In the operation of the switch LS-110 in which its contacts 802 are opened, its contacts 812 are closed, establishing an "engage" circuit through the hoist-car coupler-motor 383 by way of sequence switch contacts R-15, as follows: from the positive line through contacts 886 of relay HCP-2, contacts 893 of relay TCP, wire 131, wire 772, contacts 812 of switch LS-110, wire 92, sequence switch contacts R-15, wire 111, contacts 774 of switch LS-107, wire 112 to the "engage" terminal of motor 383, and thence through said motor to the negative supply line.

The motor 333 now rotates the hoist-frame coupler-tubes to bring their lugs 298 beneath the ledge portions of the dolly sockets. When said lugs are brought fully beneath said ledge portions, the limit-switch LS-107 is actuated by cam 387 carried by the traveling nut 386 on the shaft 382' driven by said motor. The contacts 774 of said limit-switch LS-107 are thus opened, and the operation of the motor 383 is terminated. At the same time, contacts 780 of said switch LS-107 are closed, establishing an "up" circuit through hoist motor 361 (or 361 and 363) by way of sequence switch contacts R-16, as follows:

from the positive line through contacts 886 of relay HCP-2, the contacts 893 of relay TCP, wire 131, wires 772 and 784, contacts 780 of switch LS-107, wire 108, sequence switch contacts R-16, wire 96, contacts 796 of switch LS-109, wire 97, to the "up" terminal of motor 361 (or 361 and 363), and thence through said motor or motors to the negative side of the line. At the same time, current flows by way of wire 97 through the brake relay HLB-1, in parallel with said hoist motor or motors, energizing said relay and closing its contacts 804, so that the brake-mechanism 365 (or 365 and 366) associated with the drive for the drum shaft 354 is released. It will be noted that the contacts 782 of the switch LS-107, which were opened at the same time as contacts 774 of said switch (i. e., when the coupler lugs were fully engaged with the dolly socket ledges) remain open so that the "down" circuit cannot be completed to the hoist motor 361 (or motors 361 and 363).

The drum shaft 354 is thus now operated to raise the hoist-frame 270, together with the dolly and automobile thereon at the receiving station. When said hoist-frame is fully raised, so that the ends 300 of its tubes 282 are in full engagement with the hoist-car sockets 301, the limit switch LS-109 is actuated by the aforementioned cam 389, opening its contacts 796, and breaking the circuit through the hoist motor 361 (or motors 361 and 363). Concurrently the brake-relay HLB-1 is deenergized. Rotation of the drum shaft 354 is thus terminated and the brakes associated therewith are reapplied.

Thus the dolly and automobile at the receiving station are raised above the tops of the other automobiles on the floor, and are securely attached to the hoist car, ready for transportation to the desired stall.

The "park" sequence switch

Before discussing the "park" sequence in which the dolly and automobile thereon are transported from the receiving station to the selected stall, a description of the "park" sequence switch is in order. This switch (Fig. 53B) comprises eleven pairs of contacts, designated P-1 through P-11. The movable contacts of the respective pairs are mechanically connected together for movement in unison by the operator.

The movable contact of the pair of contacts P-1 is connected, through wire 60C and a pair of normally closed contacts 900 of relay TCP, to the positive supply line. The stationary one of the contacts P-1 is connected through wire 63" to wire 63C, which, as hereinbefore noted, is connected to contacts 660 of limit switch LS-104 on the receiving transfer car and to contacts 702 of limit switch LS-102 on the delivery transfer car.

Movable contact P-2 is connected to one of a pair of normally open contacts 901 of relay TCD, the other of which contacts is connected to the aforementioned wire 60C. The stationary contact P-2 is connected by wire 68' to wire 68C, which in turn is connected through wire 679 to the "forward" terminal of the delivery transfer car drive motor 455'.

Movable contact P-3 is connected to one of a pair of normally open contacts 902 of relay TCR, the other of which contacts is connected to said wire 60C. Stationary contact P-3 is connected through wire 69' to wire 69C. The latter, as previously noted, is connected through wire 630 to the "forward" terminal of the receiving transfer car drive motor 455.

Movable contact P-4 is connected through wire 70' to one of a pair of normally open contacts 903 of relay TCP, the other of said contacts 903 being connected to the positive supply line. Said wire 70' is also connected by wire 70C to one of the contacts 706 of switch LS-101. The stationary contact P-4 is connected through wire 71", with wire 71C, which, in turn, is connected to contacts 650 of limit-switch LS-103 on the receiving transfer car and to contacts 693 of limit switch LS-101 on the delivery transfer car.

The movable contact P-5 is connected through wire 77 with one of a pair of normally open contacts 904 of relay HCP-1, the other of which contacts 904 is connected by wire 75' with wire 75C. The latter, as previously noted, is connected to one of the contacts 665 of the limit-switch LS-103. The stationary contact P-5 is connected through wire 73' with wire 73C. As has been pointed out, said wire 73C is connected to contacts 759 of the hoist-car limit-switch LS-106.

Movable contact P-6 is connected by wires 77', and 77" with the aforementioned wire 77. Stationary contact P-6 is connected through wire 78' to wire 78. The latter, as previously observed, is connected to the switch contact 884, movable by hand into engagement with either contact F-1 or contact R'-1 for controlling the hoist-car drive motor 414.

One of a pair of normally open contacts 905 of relay HCP-2 is connected by wire 77" to wire 77 and thence to one of the contacts 904 of relay HCP-1. The other contact 905 is connected to the other of said contacts 904 by a wire 906.

The movable contact P-7 is connected to one of a pair of normally closed contacts 907 of relay HCP-2; the other of said contacts 907 being connected to one of a pair of normally closed contacts 908 of relay HCP-1. The other of said pair of contacts 908, is connected to the previously mentioned wire 906 and thence to wires 75' and 75C. The first-mentioned one of the contacts 907 of relay HCP-2 is also connected by wire 88' to wire 88 and thence to one of the contacts 763 of the hoist-car limit-switch LS-105. As previously described, said wire 88 is also connected, through wire 791, with contacts 786 of switch LS-108 and contacts 810 of switch LS-110. The stationary contact P-7 is connected through wire 84' to wire 84, and thence to one of the contacts 751 of the hoist-car limit-switch LS-105.

Movable contact P-8 is connected by wire 130' to the wire 130, which, as previously noted, is connected to one of the contacts 708 of limit-switch LS-101 on the delivery transfer car. The stationary contact P-8 is connected through wire 89' to wire 89 and thence to one of the contacts 802 of hoist-car limit-switch LS-110.

The movable contact P-9 is connected through wires 132' and 132 to one of the contacts 810 of the hoist-car limit switch LS-110. The other of said contacts 810 is connected through wires 791, 88, and 88' to one of the previously mentioned contacts 907 of relay HCP-2. Stationary contact P-9 is connected through wires 93' and 93 with one of the contacts 778 of the hoist-car limit-switch LS-108.

Movable contact P-10 is connected through wires 95' and 95 with one of the contacts 786 of hoist-car limit-switch LS-108. The other contact 786 is, as previously observed, connected through wires 790 and 791 to wire 88 and thus, through wire 88' to one of the aforementioned contacts 907 of relay HCP-2. Stationary contact P-10 is connected through wires 96' and 96 to one of the contacts 796 of hoist-car limit-switch LS-109.

Movable contact P-11 is connected directly to the positive supply line, while the stationary contact P-11 is connected to the wire 151. The latter, as previously described, is connected to the contacts of the various brake relays.

The "park" sequence

It has been noted that, at the end of the receiving sequence, the dolly and automobile at the receiving station are in elevated position, ready for transportation to a selected stall. More specifically, the conditions are as follows:

1. The receiving transfer car is at the receiving station 29. Switch LS-11 remains actuated and its contacts A are open.
2. The delivery transfer car is at the delivery station. Switch LS-1 remains actuated and its contacts A are open.
3. The aligning sockets at the receiving station are engaged by plungers of the receiving transfer car. Limit-switch LS-103 remains actuated.
4. The aligning sockets at the delivery station are engaged by plungers of the delivery transfer car. Limit-switch LS-101 remains actuated.
5. The hoist-car is on the receiving transfer car. Limit switch LS-61 on said transfer car remains actuated.
6. The hoist-car plungers engage the aligning sockets on the receiving transfer car. Limit-switch LS-105 on the hoist-car remains actuated.
7. The hoisting-frame is loaded and in raised position. Hoist-car limit switch LS-109 remains actuated.
8. The coupler tubes of the hoisting-frame are interlocked with the dolly sockets. The hoist-car limit-switch LS-107 remains actuated.

Let it be assumed for purposes of illustration that the automobile at the receiving station is to be parked in stall No. 43. The operator then makes the following switch settings:

1. Opens the "receiving" sequence switch.
2. Closes the hand switch 3 (Fig. 53C), connecting the wire 841 with wire 846 and thus with contacts A of switch LS-4 in stall 33, and with contacts A of switch LS-14 in stall 63. Relay TCD in series with contacts A of switch LS-4 is thus energized, as is also relay TCR in series with contacts A of switch LS-14.
3. Closes hand-switch C (Figs. 53C and 60A) connecting to the positive line, the contacts of the limit switches LS-41 through LS-46 in the stalls in aisle C (i. e., stalls 41–46, inclusive). Relay HCP-2, in series with the contacts of said switches, is thereby energized.
4. Engages the switch contact 884 with the contact R'-1 (Figs. 53A and 60B), thus connecting conductor 78 to wire 762 and the "reverse" terminal of the hoist-car drive motor 414.
5. Closes the "park" sequence switch.

Figure 60A:
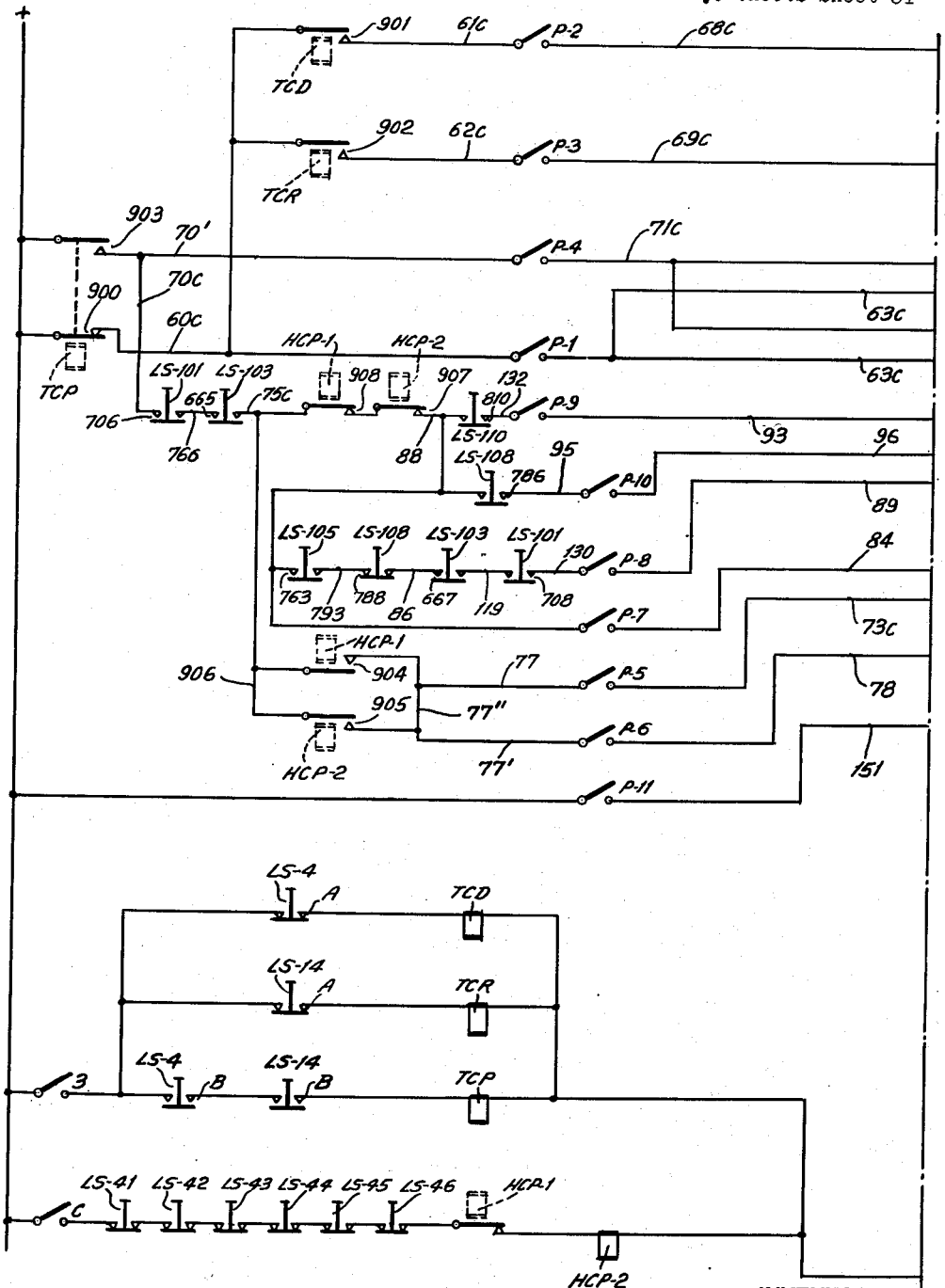
Fig. 60A is a simplified wiring diagram showing connections between the contacts of the "park" sequence switch and contacts of various relays and limit switches.
Figure 60B:
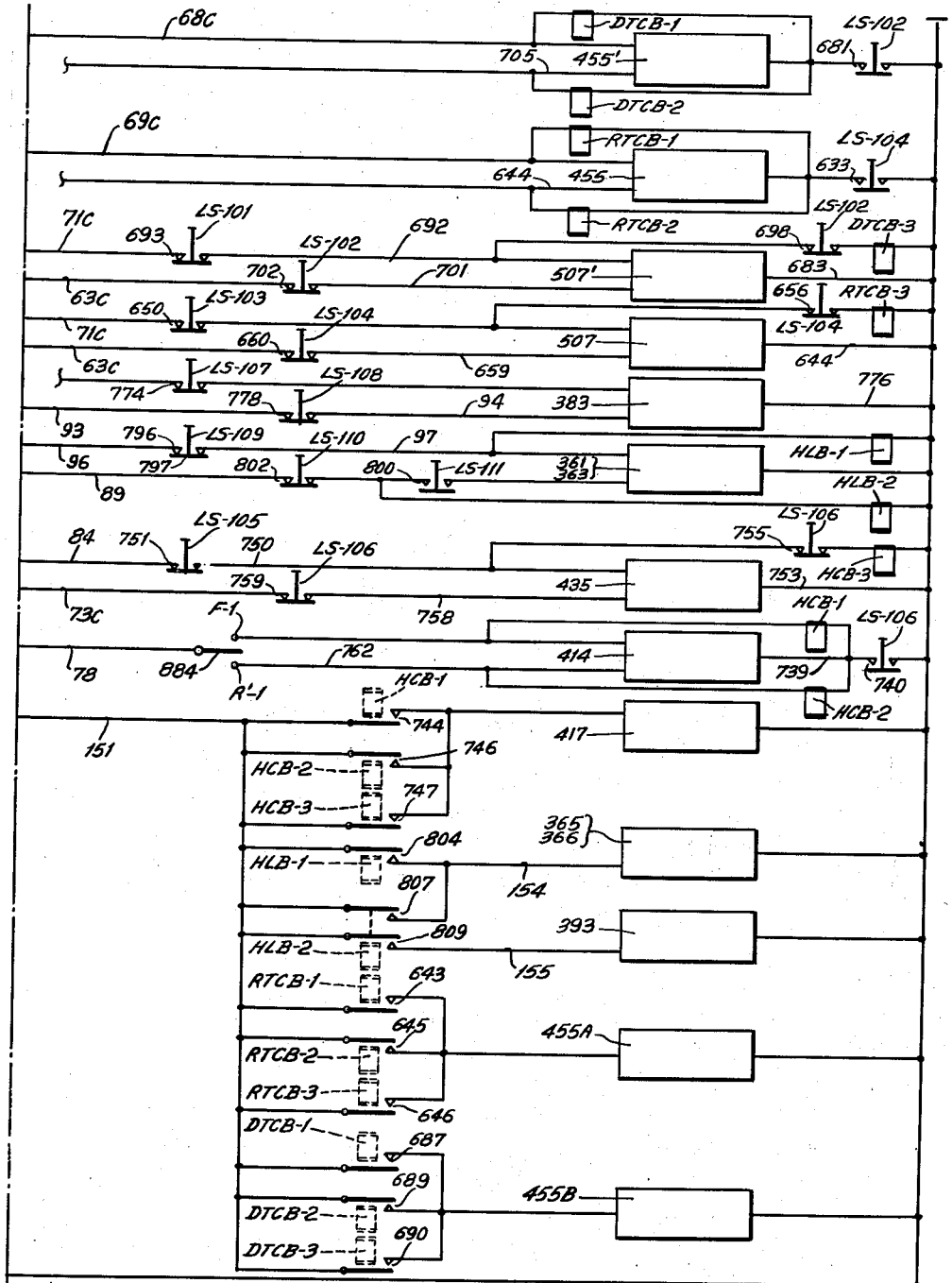
Fig. 60B is a continuation of Fig. 60A, showing connections between the "park" sequence switch contacts and apparatus on the hoist and transfer cars.

For convenience in following the circuit connections involved in the "park" sequence, reference may be made to the simplified wiring diagram in Figs. 60A and 60B.

Upon closing of the "park" sequence switch, the contacts P-1 establish a "disengage" circuit through the aligning motor 501 of the receiving transfer car, and also through the aligning motor 501' of the delivery transfer car. This circuit is from the positive line through the normally closed contacts 900 of relay TCP, wire 60C, sequence switch contacts P-1, wire 63'', wire 63C, and said motors 507 and 507' in parallel. Current from wire 63C flows through contacts 702 of the limit-switch 102 and wire 701 to the "disengage" terminal of motor 507', and thence through said motor and wire 683 to the negative line. Current also flows from wire 63C through contacts 660 of limit-switch LS-104 and wire 659 to the "disengage" terminal of the motor 507, and thence through said motor and wire 644 to the negative supply line.

Said motors 507 and 507' thus disengage the plungers of said transfer cars from the aligning sockets at the respective receiving and delivery stations. When the plungers of the receiving transfer car are fully disengaged from the associated aligning sockets the cam 621 on plunger 493 actuates the limit-switch LS-104, opening its contacts 660 and stopping the motor 507. Likewise, when the plungers of the delivery transfer car are fully disengaged from the aligning sockets at the delivery station, a cam on one of its plungers actuates the limit switch LS-102, opening its contacts 702 and stopping the motor 507'.

In the aforementioned operations of limit-switches LS-104 and LS-102 to open their contacts 660 and 702, their contacts 633 and 681 are closed, establishing circuits through the motors 455 and 455' of the respective transfer cars to drive said cars forwardly, i. e., away from the respective receiving and delivery stations. The circuit through motor 455 of the receiving transfer car is by way of sequence switch contacts P-3, as follows: from the positive line through the normally closed contacts 900 of relay TCP, wire 60C, closed contacts 902 of energized relay TCR, wire 62C, sequence switch contacts P-3, wire 69C, the "forward" terminal of motor 455, and thence through said motor and contacts 633 of switch LS-104 to the negative line. The circuit through the drive motor 455' of the delivery transfer car runs from the positive line through contacts 900 of relay TCP, wire 60C, contacts 901 of relay TCD, wire 61C, sequence switch contacts P-2, wire 68C, the "forward" terminal of motor 455', and thence through said motor and contacts 681 of switch LS-102 to the negative line. Concurrently with the energization of said motors 455 and 455' the brake relays RTCB-1 and DTCB-1 in parallel therewith are energized, with resultant release of the respective brake mechanisms of the transfer cars.

The receiving and delivery transfer cars are thus moved by their motors 455 and 455' to positions overlying the respective stalls 63 and 33. When the receiving transfer car arrives in position over the stall 63, the cam 622 on said car actuates limit switch LS-14, opening its contacts A and thus deenergizing relay TCR, whereupon contacts 902 of said relay are opened, deenergizing both the motor 455 and the brake-relay RTCB-1. Likewise, upon the arrival of the delivery transfer car in the proper position above the stall 33, the cam on said car actuates the limit switch LS-4, opening its contacts A and deenergizing relay TCD, whereupon contacts 901 of said relay are opened, and the motor 455' and brake-relay DTCB-1 are deenergized. The transfer cars are thus stopped in the appropriate positions above the aforementioned stalls 33 and 63.

In the above-mentioned operation of switches LS-4 and LS-14 by the cams on the transfer cars, the contacts B of said switches are closed, with consequent energization of relay TCP. The latter opens its contacts 900 and closes its contacts 903. Closing of said contacts 903 establishes an "engage" circuit through the aligning motors 507 and 507' of the transfer cars, by way of wire 70', sequence switch contacts P-4, and wire 71C. From said wire 71C current flows through contacts 693 of switch LS-101 and wire 692 to motor 507', and through contacts 650 of switch LS-103 to motor 507. Said motors thus operate to extend the transfer car plungers outwardly for engagement with the associated aligning guides in the respective stalls. As said plungers move outwardly, the cams on certain of said plungers release the respective limit switches LS-102 and LS-104, as previously described, so that the contacts 698 and 656 of said switches are closed and the brake relays DTCB-3 and RTCB-3 are energized prior to engagement of the plungers with the aligning sockets. Thus, the transfer brakes of the transfer cars are released so that said cars can be moved freely to such extent as may be necessary for full engagement of the plungers in the sockets.

When said plungers are fully engaged with the aligning sockets in the stalls 33 and 63, the limit switches LS-101 and LS-103 are actuated, as previously described, opening their contacts 693 and 650, and deenergizing the motors 507 and 507' as well as the brake-relays DTCB-3 and RTCB-3. Said motors are thus stopped and the transfer car brakes are reapplied. Also, said operation of the switches LS-101 and LS-103 closes their contacts 706 and 665 respectively, establishing a "disengage" circuit through the hoist-car aligning motor 435 as follows: from the positive line, through contacts 903 of relay TCP, wire 70C, contacts 706 of switch LS-101, wire 76C, contacts 665 of switch LS-103, wires 75C, and 906, contacts 905 of relay HCP-2, wire 77, sequence switch contacts P-5, wire 73C, contacts 759 of hoist-car switch LS-106, wire 758, to the "disengage" terminal of said motor 435, and thence through said motor and wire 753 to the negative line. The hoist car plungers 428 and 429 are thus disengaged from the aligning sockets of the receiving transfer car; and, when said plungers are fully retracted, the limit switch LS-106 is operated, opening its contacts 759, and closing its contacts 740.

Opening of said contacts 759 of limit switch LS-106 breaks the aforementioned circuit through the aligning motor 435 of the hoist-car. Closing of the contacts 740 establishes a "reverse" circuit through the hoist-car drive motor 414, as follows: from the positive line through contacts 903 of relay TCP, wire 70C, contacts 706 of switch LS-101, wire 76C, contacts 665 of switch LS-103, wires 75C, and 906, contacts 905 of relay HCP-2, wire 77', sequence-switch contacts P-6, wire 78, hand switch contact 884, contact R'-1, wire 762, the "reverse" terminal of motor 414, and thence through said motor, wire 739, and contacts 740 of switch LS-106 to the negative line. At the same time, current flows through brake-relay HCB-2, connected in parallel with motor 414, releasing the hoist-car brakes 417.

The hoist-car is thus driven from stall 63 (aisle E) to stall 43 (aisle C). As said hoist-car starts moving away from the receiving transfer car its cam 625 releases the switch LS-61, which returns to normal closed position. When the hoist-car arrives in the proper position over stall 43, its cam 625 actuates the limit-switch LS-43, opening its contacts and deenergizing the relay HCP-2. Contacts 905 of said relay HCP-2 thereupon open and break the circuit through said hoist-car drive motor 414, as well as the circuit through the brake relay HCB-2. The hoist car thus stops over the stall 43.

The deenergization of relay HCP-2 also closes the contacts 907 of said relay, establishing an "engage" circuit through the hoist-car aligning motor 435, as follows: from the positive supply line through contacts 903 of relay TCP, wire 70C, contacts 706 of switch LS-101, wire 76C, contacts 665 of switch LS-103, wire 75C, the normally closed contacts 908 of relay HCP-1, normally closed contacts 907 of relay HCP-2, sequence-switch contacts P-7, wire 84, contacts 751 of switch LS-105, wire 750, the "engage" terminal of motor 435, and thence through said motor and wire 753 to the negative supply line. The motor 435 thus extends the hoist-car plungers 428 and 429 upwardly for engagement with the aligning sockets of the stall 43; and, as cam 624 on plunger 429 (Fig. 55) moves away from limit switch LS-106, it releases said switch, so that the contacts 755 thereof are closed and brake relay HCB-3 in parallel with motor 435 is energized, before said plungers engage said aligning sockets. Thus the hoist car is freed for movement to such extent as may be necessary for complete engagement of said plungers with said sockets.

When the hoist-car plungers are fully engaged with the aligning sockets of said stall 43, the cam 623 on plunger 428 actuates the limit switch LS-105, opening the contacts 751 of said switch and deenergizing both said motor 435 and brake-relay HCB-3. Said motor thus stops and the brakes 417 are reapplied to the hoist-car. Also, the contacts 763 of switch LS-105 are closed, closing a circuit through the relay HLB-2 as follows: from the positive line through contacts 903 of relay TCP, wire 70C, contacts 706 of limit switch LS-101, wire 76C, contacts 665 of limit switch LS-103, wire 75C, contacts 908 of relay HCP-1, contacts 907 of relay HCP-2, wire 88, contacts 763 of switch LS-105, wire 793, contacts 788 of switch LS-108, wire 86, contacts 667 of switch LS-103, wire 119, contacts 708 of switch LS-101, wire 130, sequence-switch contacts P-8, wire 89, contacts 802 of switch LS-110, and relay HLB-2 to the negative line.

The energized relay HLB-2 closes its contacts 807, establishing a circuit through the hoist-lift brake mechanism 365 (or 365 and 366) by way of sequence-switch contacts P-11, and wires 151 and 154. Said brake mechanism is thus released. Also, the contacts 809 of relay HLB-2 are closed, energizing the solenoid 393, by way of said sequence-switch contacts P-11, and wires 151 and 155. The pawl 390 is thus withdrawn from engagement with the ratchet wheel 391 on the drum shaft 354.

In moving out of engagement with the ratchet-wheel 391, the pawl 390 actuates the limit-switch LS-111, as previously described, and thereby closes a "down" circuit through the hoist-lift motor 361 (or motors 361 and 363), by way of the previously mentioned sequence-switch contacts P-8, contacts 802 of switch LS-110, wire 90, and contacts 800 of switch LS-111.

The hoist-lift motor 361 (or 361 and 363) is thus energized and operates the drum shaft 354 to lower the hoisting-frame 270. When said hoisting-frame is lowered sufficiently to deposit the dolly and automobile thereon in the stall 43, the cam 389, on the nut 388 driven by said drum shaft 354, actuates the limit-switch LS-110, opening the contacts 802 of said switch and thereby deenergizing both the motor 361 (or 361 and 363) and the relay HLB-2, thereby stopping the hoist lift motor and applying the brake. Also, the contacts 810 of the limit-switch LS-110 are closed, establishing a "disengage" circuit through the coupler-tube rotating motor 383, as follows: from the positive line through contacts 903 of relay TCP, wire 70C, contacts 706 of switch LS-101, wire 76C, contacts 665 of switch LS-103, wire 75C, contacts 908 of relay HCP-1, contacts 907 of relay HCP-2, wire 88, contacts 810 of switch LS-110, wire 132, sequence-switch contacts P-9, wire 93, contacts 778 of switch LS-108, wire 94, the "disengage" terminal of motor 383, and thence through said motor and wire 776 to the negative line.

The motor 383 thus rotates the coupler tubes to disengage their lugs from beneath the ledges of the dolly sockets and to bring said lugs into alignment with the passages 266 in said sockets. When said coupler tubes have been so rotated the cam 387 on nut 386 driven by said motor 383 actuates the limit-switch LS-108, opening its contacts 778 and closing its contacts 786. Opening of said contacts 778 breaks the circuit through said motor, while closing of the contacts 786 establishes an "up" circuit through the hoist-lift motor 361 (or 361 and 363) as follows: from the positive line through contacts 903 of relay TCP, wire 70C, contacts 706 of switch LS-101, wire 76C, contacts 665 of switch LS-103, wire 75C, contacts 908 of relay HCP-1, contacts 907 of relay HCP-2, wire 88, contacts 786 of switch LS-108, wire 95, sequence switch contacts P-10, wire 96, contacts 796 of switch LS-109, wire 97, the "up" terminal to motor 361 (or 361 and 363), and thence through said motor (or motors) to the negative line. A circuit is also established through the brake-relay HLB-1, connected in parallel with said motor 361, so that the brakes associated with the motor drive for the shaft 354 are released.

Said shaft 354 is thus rotated in the direction for elevating the hoisting-frame, and the latter is raised to the hoist-car, leaving the dolly and automobile in the stall 43. It will be noted that during this operation the contacts 788 of the switch LS-108 are open, maintaining broken the "down" circuit for said motor 361 (or 361 and 363).

When the hoist-frame 270 is raised sufficiently for the ends 300 of the tubes 292 to be fully engaged with the sockets 301 on the hoist car, the limit-switch LS-109 is actuated by cam 389 on the nut driven by said shaft 354, opening the contacts 796 of said switch, and braking the circuit through the hoist-lift motor 361 (or 361 and 363), as well as through the brake-relay HLB-1. The ascent of the hoist-frame is thus terminated, and the hoist-lift brakes are reapplied.

The automobile received at the receiving station 29 has thus now been parked in the selected stall 43 and the hoist-frame restored to its elevated position on the hoist-car above said stall.

*The "unpark" sequence switch*

In the "unpark" sequence, the empty hoist-frame is transported on the hoist-car to a preselected stall, lowered onto the loaded dolly in said stall, coupled to said dolly, and then raised to bring the dolly and automobile thereon above the tops of parked automobiles on the floor, ready for transportation to the delivery station.

Prior to describing the operations involved in the "unpark" sequence, a description of the "unpark" sequence switch is in order. This switch (Fig. 53B) comprises fourteen pairs of contacts, designated U-1 through U-14. The movable contacts of the respective pairs are mechanically connected together for movement by the operator in unison.

The movable contact of the pair of contacts U-1 is connected through wire 101 to one of a pair of normally open contacts 910 of relay HCP-1, the other of said contacts 910 being connected to the positive supply line. The stationary one of the contacts U-1 is connected by wires 73'' and 73' to wire 73C, which, as hereinbefore noted, is connected to one of the contacts 759 of the hoist-car limit-switch LS-106.

Movable contact U-2 is connected by wire 911 to the aforementioned wire 101. Stationary contact U-2 is connected through wires 78'' and 78' to wire 78, which in turn is connected to the hand-switch contact 884.

Movable contact U-3 is connected to one of a pair of normally open contacts 912 of relay HCP-2, the other of which contacts 912 is connected by wire 913 to one of the normally closed contacts 914 of relay HCP-1. The other of the contacts 914 of relay HCP-1 is connected to one of the normally open contacts 915 of relay TCP, the other of the contacts 915 being connected to the positive line. The first-mentioned one of the contacts 914 of relay HCP-1, and the second mentioned one of the contacts 912 of relay HCP-2, are also connected through wire 913 with wire 88', and thence, by wire 88, to contacts 763 of the hoist-car limit-switch LS-105, as well as (through wire 791) to contacts 786 of switch LS-108 and contacts 810 of switch LS-110. Stationary contact U-3 is connected by wires 84'', 84', and 84 to one of the contacts 751 of the hoist car limit switch LS-105.

Movable contact U-4 is connected by wires 87' and 87 to one of the contacts 763 of hoist car limit switch LS-105, and also, through wire 793, with one of the contacts 788 of switch LS-108. The stationary contact U-4 is connected by wires 63''', 63'', and 63C to one of the contacts 660 of limit switch LS-104 and one of the contacts 702 of limit switch LS-102.

Movable contact U-5 is connected to one of a pair of normally open contacts 918 of relay TCD, the other of which contacts 918 is connected to the previously mentioned wire 913. The stationary contact U-5 is connected to a wire 105 which in turn is connected to the movable blade of a hand switch 919 (Figs. 53A and 61B), operable into engagement with either a contact 920 on conductor 68C or 921 on conductor 117.

Figure 61B:
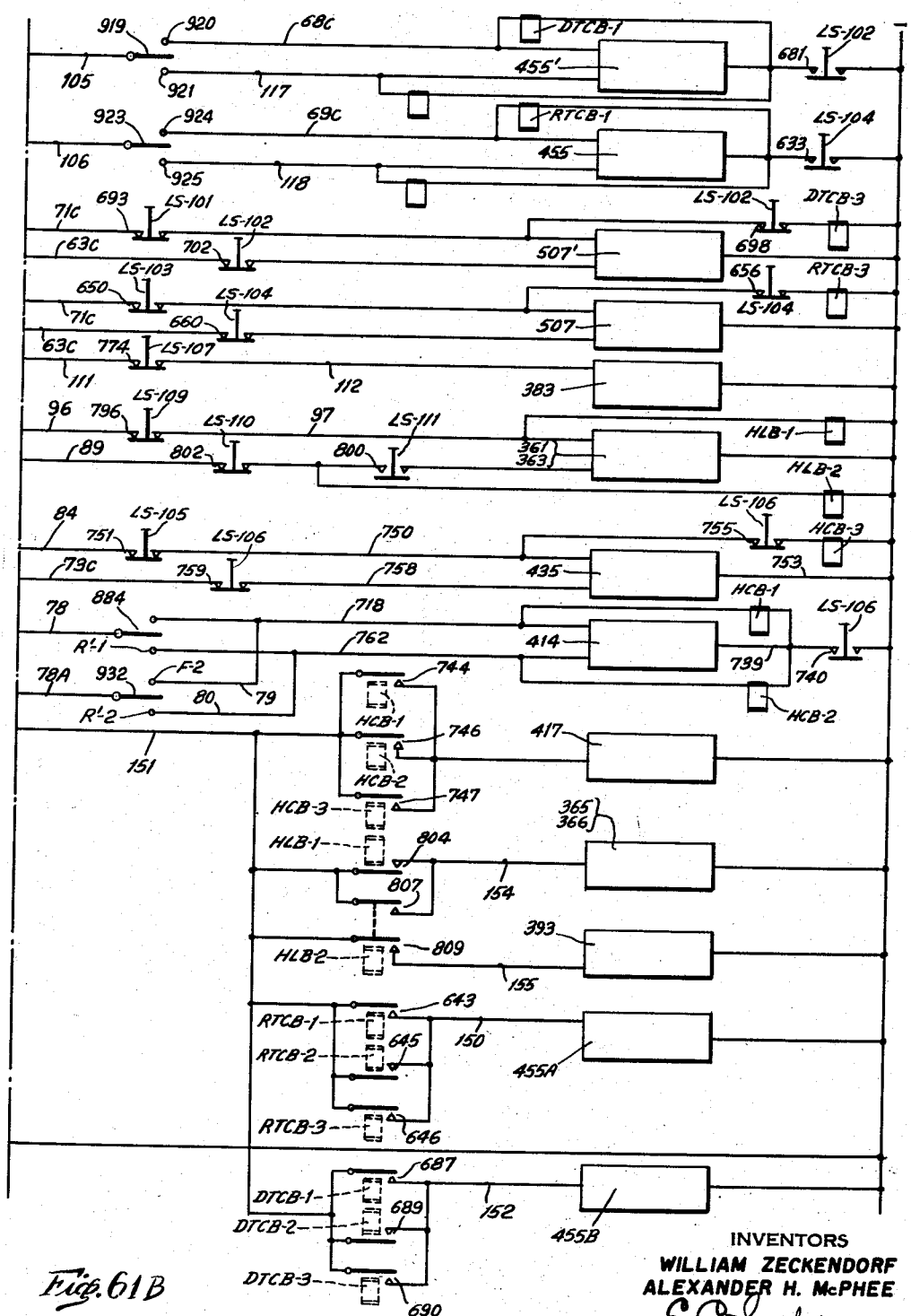
Fig. 61B is a continuation of Fig. 61A, showing connections between the "unpark" sequence switch contacts and apparatus on the hoist and transfer cars.

Movable contact U-6 is connected with one of a pair of normally open contacts 922 of relay TCR, the other of which contacts is connected to wire 913. The stationary contact U-6 is connected by wire 106 to the movable switch blade 923 operable by hand into engagement with either contact 924 on wire 69C or contact 925 on wire 118 (Figs. 53A and 61B).

Movable contact U-7 is connected by wire 926 to one of a pair of normally open contacts 927 of relay TCP, the other of which contacts 927 is connected to the positive line. The first-mentioned one of the contacts TCP is also connected through wire 928 with wire 70', which, as previously noted, is connected by wire 70C to one of the contacts 706 of switch LS-101. The stationary contact U-7 is connected by wire 929 with wire 71'' and thereby through wire 71C with contacts 650 of limit switch LS-103 on the receiving transfer car and contacts 693 of limit switch LS-101 on the delivery transfer car.

Movable contact U-8 is connected with one of a pair of normally open contacts 930 of relay HCP-2, the other of which contacts is connected by wires 75" and 75' with wire 75C, and thus to one of the contacts 665 of limit switch LS-103 on the receiving transfer car. The stationary contact U-8 is connected by wire 73" with wires 73' and 73C, and thus with one of the contacts 759 of the hoist car limit switch LS-106.

Movable contact U-9 is connected by wire 931 with one of the contacts 930 of relay HCP-2. The stationary contact U-9 is connected to wire 78A and thus to the movable switch blade 932 (Figs. 53A and 61B) operable by hand into engagement F-2 on wire 79 or contact R'-2 on wire 80. Said wires 79 and 80 are connected respectively to wires 118 and 762 connected to the respective forward and reverse terminals of the hoist car drive motor 414.

Movable contact U-10 is connected to one of a pair of normally closed contacts 933 of relay HCP-2, the other of which contacts 933 is connected by wires 131', 131, and 771 with one of the contacts 765 of switch LS-105, and also by wire 772 with contact 780 of switch LS-107 and contacts 812 of switch LS-110. Also, said other one of said contacts 933 is connected by wire 934 with one of a pair of normally closed contacts 935 of relay HCP-2. The second of the contacts 935 of relay HCP-2 is connected by wires 75" and 75' to conductor 75C. The stationary contact U-10 is connected through wires 84" and 84' with wire 84 and thence to contacts 751 of hoist car limit switch LS-105.

The movable contact U-11 is connected through wires 130" and 130' with wire 130 and thence with contacts 708 of limit switch LS-101 on the delivery transfer car. Stationary contact U-11 is connected by wires 89", 89' and 89 with contacts 802 of the hoist car limit switch LS-110.

The movable contact U-12 is connected by wires 92' and 92 with one of the contacts 812 of hoist car limit switch LS-110. Stationary contact U-12 is connected by wires 111''' and 111 to one of the contacts 774 of hoist car limit switch LS-107.

Movable contact U-13 is connected through wires 168" and 108 with one of the contacts 780 of hoist car limit switch LS-107. Stationary contact U-13 is connected by wires 96", 96', and 96 to one of the contacts 796 of hoist car limit switch LS-109.

Movable contact U-14 is connected to the positive line while stationary contact U-14 is connected through wire 151" to wire 151.

As previously noted, one of the contacts 780 of hoist-car limit-switch LS-107 is connected through wires 784 and 772 (Fig. 53A) to the conductor 131. The latter in turn is connected, as shown in Figs. 63 and 64, to a wire 131' connected to one of the normally closed contacts 933 of relay HCP-2 and also through wire 934 to one of the normally closed contacts 935 of that relay.

The "unpark" sequence

It has been noted that, at the end of the "park" sequence, the automobile which was picked up by the hoist-car at the receiving station has been parked in the selected stall 43, and the hoist-frame has been restored to its elevated position on the hoist car above said stall. More specifically, the conditions are as follows:

1. The receiving transfer car is at row III in aisle E (over stall 63). Limit switch LS-14 remains actuated by the cam 622 on said car.
2. The delivery transfer car is at row III in aisle B (over stall 33). Limit switch LS-4 remains actuated by the cam on said car.
3. The aligning sockets of stall 63 are engaged by plungers of the receiving transfer car. Limit switch LS-103 remains actuated.
4. The aligning sockets of stall 33 are engaged by plungers of the delivery transfer car. Limit switch LS-101 remains actuated.
5. The hoist-car is over the stall 43. Limit switch LS-43 remains actuated.
6. The hoist-car plungers engage the aligning sockets of stall 43. Limit switch LS-105 remains actuated.
7. The coupler-tubes of the hoist-frame are disengaged from the dolly. Limit switch LS-108 remains actuated.
8. The hoist-frame is empty and in raised position. Limit switch LS-109 remains actuated.

It may be noted that the previously mentioned switch blades 919 and 923 are preferably connected together for movement in unison by the operator. These blades thus form part of a switch movable to different positions for controlling forward or reverse movement of the transfer cars.

Let it be assumed for purposes of illustration that an automobile in stall 54 is to be raised therefrom, preparatory to transporting it to the delivery station. The operator then makes the following switch settings:

1. Opens the "park" sequence switch, the hand-switch 3, and the hand-switch C, which had been closed in the preceding operation.
2. Closes the hand switch 4 (Fig. 53C), connecting wire 842 with wire 847 and thus with contacts A of switch LS-5 of stall 34, and with contacts A of switch LS-15 in stall 64. Relay TCD in series with contacts A of switch LS-5 is thus energized; as is relay TCR in series with contacts A of switch LS-15.
3. Depresses the push button of switch PB-1 (Fig. 53C), energizing the relay HCP-1. Thereupon, the contacts 864 (Fig. 53C) of said relay are closed. Switch PB-1 may now be released, since said contacts 864 are connected in parallel with said switch PB-1 between the wires 863 and 38C, thus maintaining said relay HCP-1 energized despite the release of said switch.
4. Closes the hand-switch D (Figs. 53C and 61A), connecting to the positive line the contacts of the limit switches LS-51 through LS-56 in the stalls in aisle D (i. e., the stalls 51—56, inclusive).
5. Engages the switch blades 919 and 923 with contacts 920 and 924, respectively; thus connecting wire 105 with the "forward" terminal of the delivery transfer car drive motor 455', and wire 106 with the "forward" terminal of the receiving transfer car drive motor 455.
6. Closes the hoist-car switch comprising the blade 884, engaging said blade with the contact R'-1, and thereby connecting the wire 78 with the "reverse" terminal of the hoist-car drive motor 414.
7. Closes the hoist-car switch comprising the blade 932, engaging said blade with contact F-2, and thereby connecting the wire 78A with the "forward" terminal of said hoist-car drive motor.
8. Closes the "unpark" sequence switch.

For convenience in following the circuit connections involved in the "unpark" sequence, reference may be made to the simplified wiring diagram in Figs. 61A and 61B.

Upon closing of the "unpark" sequence switch, the contacts U-1 establish a "disengage" circuit through the hoist-car aligning guide motor 435, as follows: from the positive line, through contacts 910 of relay HCP-1, wire 101, said sequence switch contacts U-1, wire 73C, contacts 759 of hoist-car limit switch LS-106, wire 758 to the "disengage" terminal of said motor 435, and thence through said motor and wire 753 to the negative line. The motor 435 thus disengages the hoist-car plungers 428 and 429 from the aligning sockets of the stall 43. When said plungers are fully disengaged from said sockets, the cam 624 on plunger 429 actuates the limit switch LS-106, opening said contacts 759 and deenergizing said motor.

Said operation of switch LS-106 by cam 624 also closes the contacts 740 of said switch, establishing a "reverse" circuit as follows through the hoist-car drive motor 414: from the positive line through contacts 910 of relay HCP-1, wires 101 and 911, sequence switch contacts U-2, wire 78, hand switch blade 884, contact R'-1, wire 762 to the "reverse" terminal of motor 414, and thence through said motor, wire 739, and contacts 740 of switch LS-106 to the negative line. Concurrently, current flows through the brake relay HCB-2, in parallel with motor 414, with resultant release of the hoist-car brake mechanism 417. The hoist-car is thus moved by said motor 414 to the left (Fig. 1) from stall 43 to the delivery transfer car, which, as previously noted, is over stall 33.

As said hoist-car moves away from stall 43, the limit switch LS-43 returns to its normal position. When said hoist-car arrives in its proper position on the delivery transfer car, the cam 625 on said hoist-car operates limit-switch LS-31 on said transfer car, opening the contacts 715 of said switch and deenergizing the relay HCP-1. Contacts 910 of said relay thus open, breaking the circuit through said hoist-car drive motor, as well as through the brake relay HCB-2. The hoist-car thus stops.

The deenergization of relay HCP-1 also closes its contacts 862 and 914. The closing of contacts 862 energizes the relay HCP-2 by way of the closed hand switch D and the contacts of the limit switches LS-51 through LS-56 in the stalls of aisle D. An "engage" circuit is now established through the hoist-car aligning motor 435 by way of sequence switch contacts U-3, as follows: from the positive line through contacts 915 of relay TCP, contacts 914 of relay HCP-1, wire 913, contacts 912 of relay HCP-2, sequence-switch contacts U-3, wire 84, contacts 751 of limit-switch LS-105, wire 750, the "engage" terminal of motor 435, and thence through said motor and wire 753 to the negative line. The hoist car plunger 428 and 429 are thus moved upwardly. During the first part of this movement the cam 624 on plunger 429 releases the limit-switch LS-106, with resultant closing of the contacts 755 of said switch and energization of brake-relay HCB-3 to release the hoist-car brakes 417 before the plungers engage the aligning sockets on the delivery transfer car. Thus the hoist-car is free to move to such extent as may be necessary to enable said plungers to engage said sockets fully and thus obtain precise alignment between said hoist and transfer cars.

When the plungers 428 and 429 are fully engaged with said aligning sockets on the delivery transfer car, the cam 623 on plunger 428 actuates limit-switch LS-105, opening the contacts 751 of said switch and breaking the circuit through motor 435, as well as through the brake-relay HCB-3. At the same time, contacts 763 of said switch are closed, establishing "disengage" circuits through the receiving and delivery transfer car aligning motors 507 and 507', as follows: from the positive line through contacts 915 of relay TCP, contacts 914 of relay HCP-1, wires 913 and 88, contacts 763 of switch LS-105, wire 87, sequence-switch contacts U-4, wire 63C, and thence in parallel through the "disengage" terminals of the respective motors 507 and 507' to the negative line, by way of contacts 660 of switch LS-104 and contacts 702 of switch LS-102, respectively.

When the plungers of the receiving transfer car are fully disengaged from the aligning sockets of the stall 63, the cam 621 on plunger 493 actuates switch LS-104, opening the contacts 660 to deenergize the motor 507, and closing the contacts 633 to energize the drive motor 455 of said transfer car. This circuit is from the positive line through contacts 915 of relay TCP, contacts 914 of relay HCP-1, contacts 922 of relay TCR, sequence-switch contacts U-6, wire 106, hand-switch contact 923, contact 924, wire 69C, the "forward" terminal of motor 455, and thence through said motor and the contacts 633 of switch LS-104 to the negative line. At the same time, current flows through the brake-relay RTCB-1, in parallel with said motor 455, releasing the brake mechanism 455A. The receiving transfer car is thus driven forwardly from the stall 63.

Likewise, when the plungers of the delivery transfer car are fully disengaged from the aligning sockets of stall 33, a cam on one of said plungers actuates switch LS-102, opening the contacts 702 to deenergize the motor 507', and closing the contacts 681 to energize the drive motor 455' of said transfer car. This circuit is from the positive line through contacts 915 of relay TCP, contacts 914 of relay HCP-1, contacts 918 of relay TCD, sequence-switch contacts U-5, wire 105, hand-switch contact 919, contact 920, wire 68C, the "forward" terminal of the motor 455', and thence through said motor and the contacts 681 of switch LS-102 to the negative side of the line. At the same time, current flows through the brake-relay DTCB-1, in parallel with said motor 455', releasing the brake-mechanism 455B. The delivery transfer car is thus driven forwardly from the stall 33.

As the transfer cars move away from the stalls 33 and 63, the respective switches LS-4 and LS-14 of said stalls return to normal position. When the receiving transfer car arrives over stall 64, the cam 622 on said car actuates the limit-switch LS-15, opening its contacts A and deenergizing the relay TCR. The contacts 922 of that relay are thus opened, breaking the circuits through the drive motor 455 and brake-relay RTCB-1. The receiving transfer car thus stops.

Similarly, when the delivery transfer car arrives over the stall 34, a cam on said car actuates switch LS-5, opening its contacts A and deenergizing relay TCD. The contacts 918 of said relay are thus opened, breaking the circuits through the drive motor 455' and the brake-relay DTCB-1. The delivery transfer car thus stops.

In the aforementioned operation of the switches LS-5 and LS-15 by the transfer cars, the contacts B of said switches are closed, with resultant energization of relay TCP. "Engage"

circuits are thereby closed through the transfer car aligning motors 507 and 507' as follows: from the positive line through contacts 927 of relay TCP, wire 926, sequence-switch contacts U-7, wire 71C, and thence in parallel through said motors 507 and 507' to the negative line by way of contacts 650 of switch LS-103 and contacts 693 of switch LS-101, respectively. As the plungers of said transfer cars move outwardly toward the associated aligning guides, the respective switches LS-104 and LS-102 are released, closing their contacts 656 and 698, so that the brake-relays RTCB-3 and DTCB-3 in parallel with said aligning motors are energized and the brakes are released prior to engagement of the aligning plungers and sockets. The transfer cars are thus free to move to permit full engagement of the sockets and plungers.

When the transfer car plungers are fully engaged with the aligning sockets of the stalls 34 and 64, the aforementioned cams on certain of said plungers actuate the switches 101 and 103, opening the contacts 693 and 650 and breaking the circuits through the aligning motors 507', 507, as well as through said brake relays DTCB-3 and RTCB-3. The transfer cars are thus retained in fully aligned positions over the respective stalls 34 and 64.

In the aforementioned operation of the switches 101 and 103 to open their contacts 693 and 650, the contacts 706 and 665 of said switches are closed, establishing a "disengage" circuit through the hoist-car aligning motor 435 as follows: from the positive line through contacts 927 of relay TCP, wire 70C, contacts 706 of switch LS-101, wire 76C, contacts 665 of switch LS-103, wires 75C and C75'', contacts 930 of relay HCP-2, sequence-switch contacts U-8, wire 73C, contacts 759 of hoist-car limit-switch LS-106, a wire 758 to the "disengage" terminal of the hoist-car aligning motor 435, and thence through said motor and wire 753 to the negative line. The motor 435 is thus energized and retracts the hoist-car plungers 428 and 429 from engagement with the aligning sockets on the delivery transfer car. When said plungers are fully disengaged from said sockets, the cam 624 on plunger 429 actuates the switch LS-106, opening its contacts 759 and closing its contacts 740. Thus the aligning motor 435 is deenergized and the hoist-car drive-motor 414 is energized. The circuit now established through said drive motor is from the positive line through contacts 927 of relay TCP, wire 70C, contacts 706 of switch LS-101, wire 76C, contacts 665 of switch LS-103, wires 75C and 75'', contacts 930 of relay HCP-2, wire 931, sequence-switch contacs U-9, wire 78A, hand-switch contacts 932 and F-2, wires 79 and 718 to the "forward" terminal of said motor 414, and thence through said motor, wire 739, and the contacts 740 of switch LS-106 to the negative line. Concurrently, the brake-relay HCB-1, in parallel with motor 414, is energized and the hoist-car brake 417 is released.

The motor 414 now drives the hoist-car forwardly, (i. e., toward the receiving transfer car) along row IV. The switch LS-31 on said transfer car now returns to normal position. Relay HCP-1 will not be reenergized, because of normally open contact 864, and because push button switch PB1 has been opened upon release by the operator. When the hoist-car arrives over the stall 54, the limit-switch LS-54 of said stall is opened by cam 625 on said hoist-car, with resultant de-energization of relay HCP-2 and opening of its contacts 930, so that the drive-motor 414 and brake-relay HCB-1 are deenergized. The hoist-car is thus stopped above said stall 54.

The deenergization of said relay HCP-2 closes its contacts 933 and 935 and thus establishes an "engage" circuit through the hoist-car aligning-motor 435, as follows: from the positive line through contacts 927 of relay TCP, wire 70C, contacts 706 of switch LS-101, wire 76C, contacts 665 of switch LS-103, wire 75C, contacts 935 of relay HCP-2, wire 934, contacts 933 of relay HCP-2, sequence-switch contacts U-10, wire 84, contacts 751 of hoist-car limit-switch LS-105, wire 750 to the "engage" terminal of said motor 435, and thence through said motor and wire 753 to the negative line. The motor 435 thus extends the hoist-car plungers 428 and 429 upwardly for engagement with the aligning sockets of said stall 54. In the first part of this movement of said plungers, the cam 624 on plunger 429 releases switch LS-106, with resultant closing of the contacts 755 of said switch and energization of brake-relay HCB-3, in parallel with said motor 435. Thus the hoist-car brakes are released prior to the engagement of said plungers and sockets, to permit movement of the hoist-car to such extent as may be necessary to enable said plungers to move into full engagement with said sockets. When said plungers and sockets are fully engaged, the cam 623 on plunger 428 operates limit-switch LS-105, opening the contacts 751 of said switch and thus de-energizing the motor 435 and brake-relay HCB-3.

The aforementioned operation of switch LS-105 by said cam 623 also closes the contacts 763 of said switch, establishing a circuit through relay HLB-2, as follows: from the positive line, through contacts 927 of relay TCP, wire 70C, contacts 706 of switch LS-101, wire 76C, contacts 665 of switch LS-103, wire 75C, contacts 935 of relay HCP-2, wire 131, wire 771, contacts 765 of switch LS-105, wire 770, contacts 782 of switch LS-107, wire 86, contacts 667 of switch LS-103, wire 119, contacts 708 of switch LS-101, wire 130, sequence-switch contacts U-11, wire 89, contacts 802 of switch LS-110, and relay HLB-2 to the negative line.

The contacts 807 of said relay HLB-2 thus close, establishing a circuit through the hoist-lift brake mechanism 365 (or 365 and 366) and releasing the brakes associated with the drum shaft 354 of the hoist-car. Also, the contacts 809 of relay HLB-2 close, establishing a circuit through the solenoid 393, which thereupon disengages the pawl 390 from the ratchet-wheel 391 on said drum shaft. In moving out of engagement with said ratchet-wheel, the pawl 391 actuates the limit-switch LS-111 to complete a "down" circuit through the hoist-car motor 361 (or 361 and 363) as follows: from the positive line through contacts 927 of relay TCP, wire 70C, contacts 706 of switch LS-101, wire 76C, contacts 665 of switch LS-103, wire 75C, contacts 935 of relay HCP-2, wire 131, wire 771, contacts 765 of switch LS-105, wire 770, contacts 782 of switch LS-107, wire 86, contacts 667 of switch LS-103, wire 119, contacts 708 of switch LS-101, wire 130, sequence-switch contacts U-11, wire 89, contacts 802 of switch LS-110, contacts 800 of switch LS-111, to the "down" terminal of motor 361 (or motors 361 and 363) and thence through said motor or motors to the negative line.

The drum shaft 354 is thus operated to lower the hoisting-frame. When said frame is lowered sufficiently to bring its coupler tube lugs 298 into the sloth or passages 266 in the dolly sockets, the cam 389 driven by said drum shaft actuates the switch LS-110, opening the contacts 802 and closing the contacts 812 of said switch. Opening of said contacts 802 de-energizes the hoist-lift motor 361 (or 361 and 363), as well as the relay HLB-2. The lowering of the hoisting-frame thus ceases, the brakes of the hoist-lift mechanism 365 (or 365 and 366) are reapplied, and the pawl 390 reengages the ratchet wheel 391.

The closing of the contacts 812 of switch LS-110 establishes an "engage" circuit through the coupler motor 383 as follows: from the positive line through contacts 927 of relay TCP, wire 70C, contacts 706 of switch LS-101, wire 76C, contacts 665 of switch LS-103, wire 75C, contacts 935 of switch HCP-2, wire 131, wire 772, contacts 812 of switch LS-110, wire 92, sequence-switch contacts U-12, wire 111, contacts 774 of switch LS-107, wire 112, the "engage" terminal of motor 383, and thence through said motor to the negative line. The coupler tubes of the hoisting frame are thus rotated and their lugs 298 are brought beneath the ledge portions of the dolly sockets.

Thereupon the cam 387, driven by the coupler-controlling shaft 382' operated by said motor 383, actuates the limit switch LS-107. Contacts 774 of said switch are thus opened and contacts 780 are closed. The opening of contacts 774 de-energize said motor 383, while the closing of contacts 780 establishes an "up" circuit through the hoist-lift motor 361 (or 361 and 363) as follows: from the positive line through contacts 927 of relay TCP, wire 70C, contacts 706 of switch LS-101, wire 76C, contacts 665 of switch LS-103, wire 75C, contacts 935 of relay HCP-2, wire 131, wire 772, contacts 780 of switch LS-107, wire 108, sequence-switch contacts U-13, wire 96, contacts 796 of switch LS-109, wire 97, the "up" terminal of motor 361 (or 361 and 363), and hence through said motor or motors to the negative line. Concurrently the brake-relay HLB-1 is energized, releasing the brakes associated with the drum shaft 354.

Said drum shaft is thus operated to raise the hoisting-frame, together with the dolly in stall 54 and the automobile thereon. When said hoisting frame is raised sufficiently to bring the upper ends of the tubes 282 into full engagement with the hoist-car sockets 301, the aforementioned cam 389 driven by the shaft 354 actuates the limit-switch LS-109, opening its contacts 796 and breaking the circuit through the motor 361 (or motors 361 and 363) and also the circuit through the brake relay HLB-1. The rotation of the drum shaft 354 is thus stopped and the brakes are reapplied.

The dolly and automobile in stall 54 are thus now elevated above the tops of the other automobiles on the floor, ready for transportation to the delivery station.

*The "delivery" sequence switch*

In the "delivery" sequence the loaded hoisting-frame on the hoist-car is transported to the delivery station, lowered to deposit the loaded dolly on the station platform, uncoupled from said dolly, and returned empty to raised position on the hoist-car.

Before describing the operations involved in the "delivery" sequence, a description of the "delivery" sequence-switch is in order. This switch (Fig. 53B) comprises thirteen pairs of contacts, designated D-1 through D-13. The movable contacts of the respective pairs are mechanically connected together for movement by the operator in unison.

The movable contact of the pair of contacts D-1 is connected to the aforementioned wire 818, which in turn is connected to one of the contacts 817 of relay TCP-1 (Fig. 53C). The stationary one of the contacts D-1 is connected through wire 867 to the positive supply line.

Movable contact D-2 is connected to the positive supply line through wire 940 (Fig. 53B). Stationary contact D-2 is connected to the previously mentioned wire 38C.

The movable contact D-3 is connected through wire 113 with one of a pair of normally-open contacts 941 of relay HCP-1, the other of which contacts 941 is connected to the positive line. Stationary contact D-3 is connected through wire 73' with wire 73C, which in turn is connected to one of the contacts 759 of the hoist-car limit-switch LS-106.

Movable contact D-4 is connected by a wire 942 to the wire 113 and thus to the first-mentioned one of the contacts 941 of relay HCP-1. The stationary contact D-4 is connected through wires 78'', 78', and 78 to the hand-switch contact 884, which, as previously noted, is movable into engagement with either contact F-1 or contact R'-1 for controlling the direction of the hoist-car drive-motor 414.

The movable contact D-5 is connected through wire 114 to one of a pair of normally closed contacts 943 of relay HCP-1, the other of which contacts 943 is connected to the positive supply line. Stationary contact D-5 is connected by wires 84'' and 84' to wire 84, and thus to one of the contacts 751 of the hoist-car limit-switch LS-105.

Movable contact D-6 is connected through wires 131'' and 131' with wire 131, which is connected to one of the contacts 765 of hoist-car limit-switch LS-105. The other of said contacts 765 is connected through wire 110 to one of the normally closed contacts 944 of relay TCP, the other of which contacts 944 is connected to one of the aforementioned contacts 943 of relay HCP-1. The stationary contact D-6 is connected by wires 945 and 63'' with wire 63C, which in turn is connected to contacts 660 of limit-switch LS-104 on the receiving transfer car and to contacts 792 of limit-switch LS-102 on the delivery transfer car.

The movable contact D-7 is connected with one of a pair of normally open contacts 946 of relay TCD, the other of which contacts is connected by wire 947 with one of the contacts 944 of relay TCP. Stationary contact D-7 is connected through wire 117' with wire 117 and thus with the "reverse" terminal of the delivery transfer car drive motor 455'.

Movable contact D-8 is connected with one of the normally open contacts 948 of relay TCR, the other of which contacts is connected through the aforementioned wire 947 with one of the contacts 944 of relay TCP. Stationary contact D-8 is connected through wires 118' and 118 with the "reverse" terminal of the receiving transfer car drive motor 455.

The movable contact D-9 is connected through wire 949 with one of the normally open contacts 950 of relay TCP, the other of which contacts 950 is connected through wire 951 with one of the contacts 943 of relay HCP-1. The first-mentioned one of the contacts 950 is also connected, through wires 949, 939, 88', and 88, with one of the contacts 763 of the hoist-car limits switch LS-105. Stationary contact D-9 is connected through wires 952 and 71" with wire 71C and thence to contacts 650 of switch LS-103 on the receiving transfer car and to contacts 693 of switch LS-101 on the delivery transfer car.

Movable contact D-10 is connected through wires 953 and 130' to wire 130 and thence to one of the contacts 700 of switch LS-101 of the delivery transfer car. Stationary contact D-10 is connected through wires 954 and 89' to wire 89 and thus to one of the contacts 802 of hoist-car limit-switch LS-110.

Movable contact D-11 is connected through wires 132" and 132' with wire 132 and thus with one of the contacts 810 of limit-switch LS-110. Stationary contact D-11 is connected through wires 93", 93', and 93 to one of the contacts 778 of limit-switch LS-108.

Movable contact D-12 is connected through wires 95' and 95 with one of the contacts 786 of switch LS-108. The stationary contact D-12 is connected through wires 96'", 96', and 96, to one of the contacts 796 of the switch LS-109.

The movable contact D-13 is connected to the positive line. Stationary contact D-13 is connected through wire 151'" to wire 151.

The "delivery" sequence

It has been noted that, at the end of the "unpark" sequence, the automobile and dolly which were picked up by the hoisting-frame at the stall 54 have been raised to the hoist-car, above the tops of the other automobiles on the floor, ready for transportation to the delivery station. More specifically, the conditions are as follows:

1. The receiving transfer car is at row IV, over stall 64. Switch LS-15 remains actuated.
2. The aligning sockets of stall 64 are engaged by plungers of the receiving transfer car. Switch LS-103 remains actuated.
3. The delivery transfer car is at row IV, over stall 34. Switch LS-5 remains actuated.
4. The aligning sockets of stall 34 are engaged by plungers of the delivery transfer car. Switch LS-101 remains actuated.
5. The hoist-car is over stall 54. Switch LS-54 remains actuated.
6. The hoist-car plungers are engaged with aligning sockets of stall 54. Switch LS-105 remains actuated.
7. The hoisting-frame is loaded and in raised position. Switch LS-109 remains actuated.
8. The lugs of the coupler-tubes 282 of the hoisting-frame are beneath the ledges of the dolly-sockets. Switch LS-107 remains actuated.

Figure 62A:
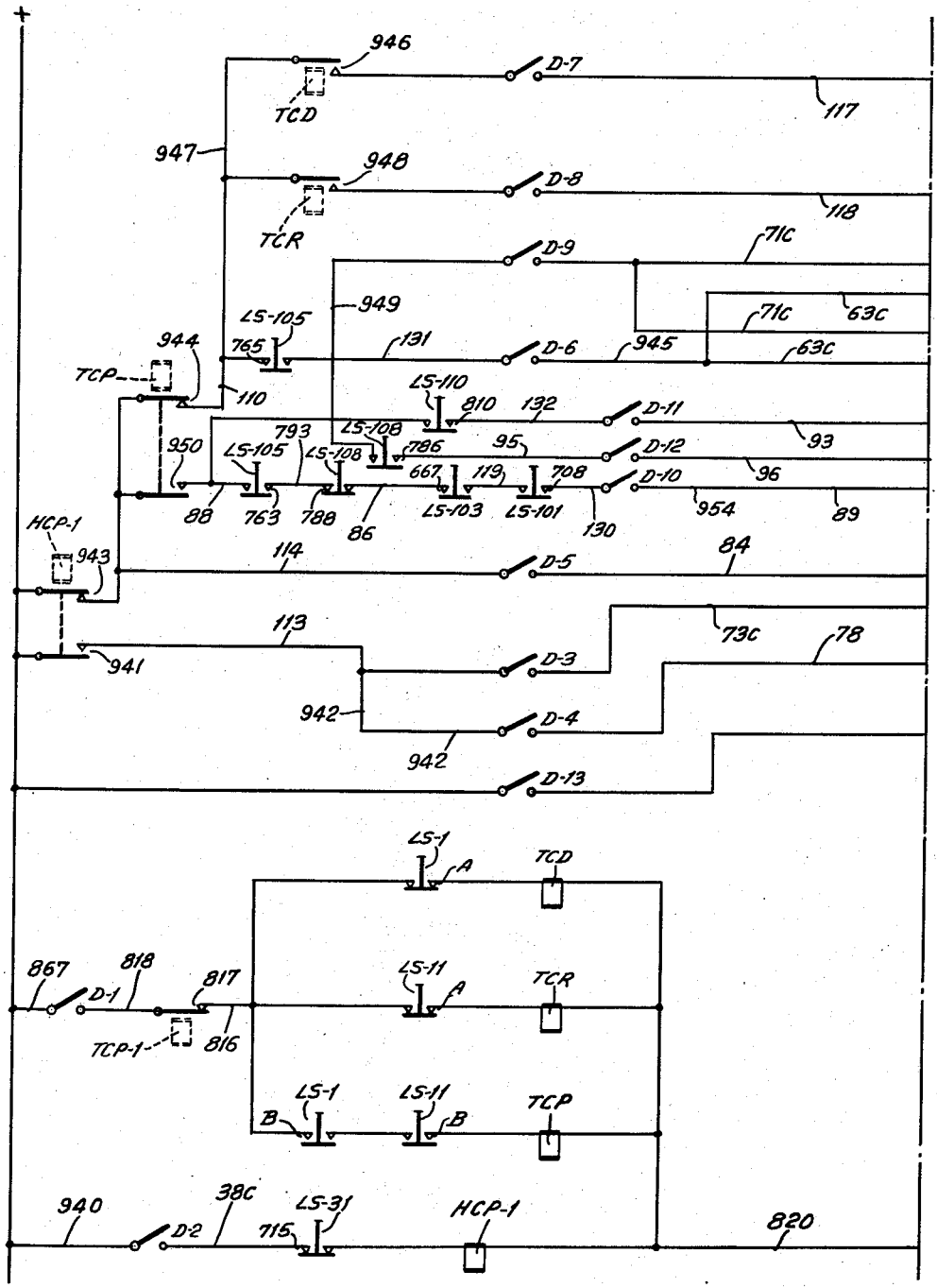
Fig. 62A is a simplified wiring diagram showing connections between the contacts of the "delivery" sequence switch and contacts of various relays and limit switches.
Figure 62B:
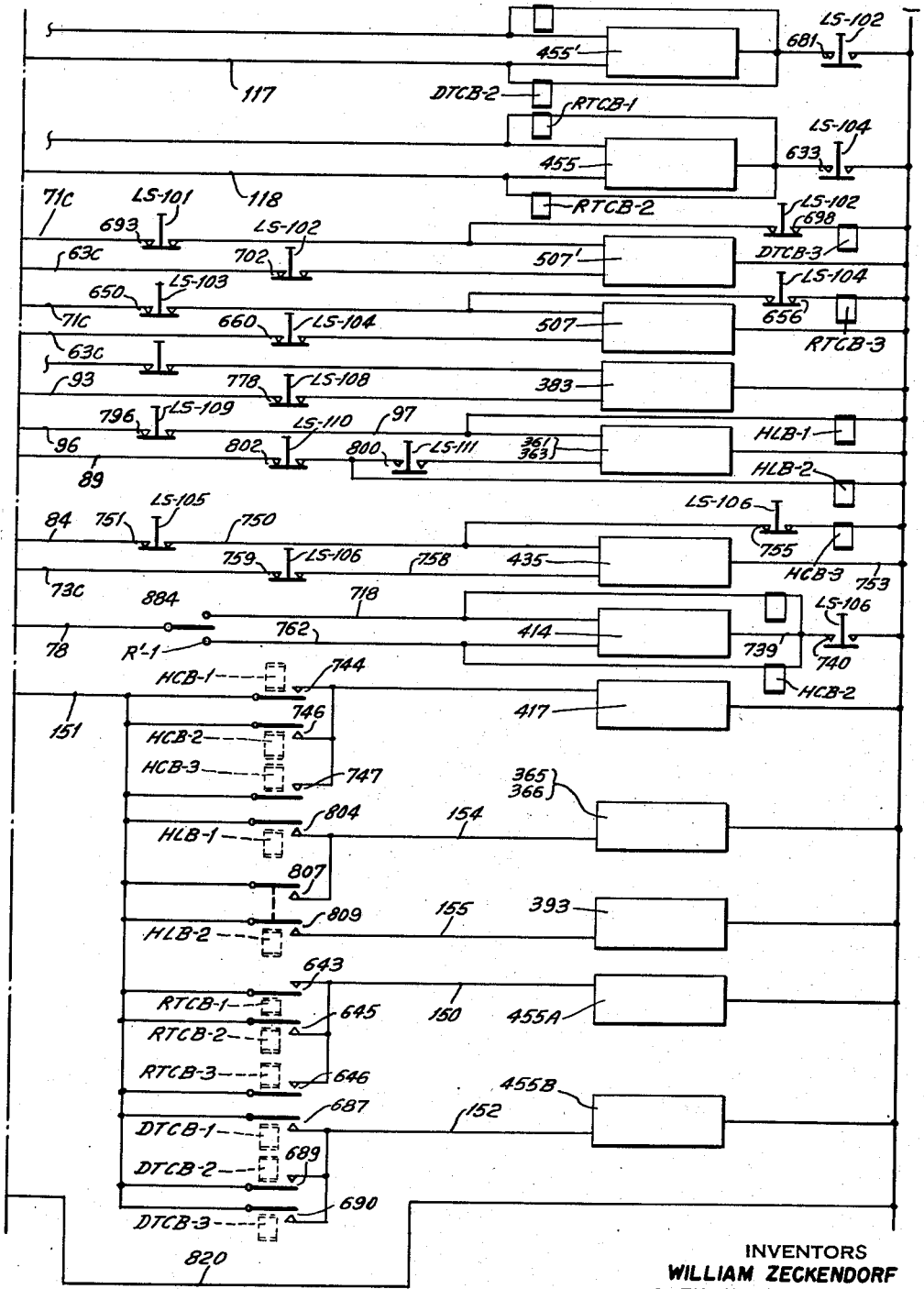
Fig. 62B is a continuation of Fig. 62A, showing connections between the "delivery" sequence switch and apparatus on the hoist and transfer cars.

For convenience in following the operations involved in the "delivery" sequence, reference may be made to the simplified wiring diagram in Figs. 62A and 62B.

Let it be assumed for purposes of illustration that the automobile which has been raised from the stall 54 is to be delivered to the delivery station. The operator then makes the following switch settings:

1. Opens the "unpark" sequence switch, as well as the hand switches 4, D, 884, 919, 923, and 932, which had been closed in the preceding operation.
2. Engages switch blade 884 with contact R'-1, thus connecting wire 78 with the "reverse" terminal of the hoist-car drive motor 414.
3. Closes the "delivery" sequence switch.

Through contacts D-1 of said "delivery" sequence switch, the relay TCD is energized, as follows: from the positive line through wire 867, through contacts D-1, wire 818, contacts 817 of relay TCP-1, wire 816, contacts A of switch LS-1 at the delivery station, through relay coil TCD and wire 820 to the negative line.

Also the relay TCR, connected in parallel with relay TCD between wires 816 and 820, is energized by way of said sequence-switch contacts D-1 and the contacts A of switch LS-11 at the receiving station.

The sequence-switch contacts D-2 close a circuit through the relay HCP-1, by way of the contacts 715 of the limit switch LS-31 on the delivery transfer car.

Contacts 941 of relay HCP-1 now close, establishing a "disengage" circuit through the hoist-car aligning motor 435, as follows: from the positive line through said contacts 941, wire 113, sequence-switch contacts D-3, wire 73C, contacts 759 of hoist-car limit-switch LS-106, wire 758, the "disengage" terminal of motor 435, and thence through said motor and wire 753 to the negative line. The motor 435 thus retracts the hoist-car aligning plungers 428 and 429 from the aligning sockets of the stall 54. When said plungers are fully retracted, the cam 624 on plunger 429 actuates the switch LS-106, opening its contacts 759 and closing its contacts 740.

Opening of said contacts 759 breaks the circuit through the motor 435, and the latter thus stops. Closing of the contacts 740 establishes a "reverse" circuit through the hoist-car drive motor 414, as follows: from the positive line through contacts 941 of relay HCP-1, wires 113 and 942, sequence-switch contacts D-4, wire 78, hand-switch contacts 884 and R'-1, wire 762, the "reverse" terminal of motor 414, and thence through said motor, wire 739, and contacts 740 of switch LS-106 to the negative line. Concurrently, the brake relay HCB-2, in parallel with said motor, is energized, releasing the brakes of the brake-mechanism 417. The motor 414 thereupon drives the hoist-car to the left from the stall 54, toward the delivery transfer car.

As said hoist-car moves away from the stall 54, the switch LS-54 of said stall returns to its normal closed position. When the hoist-car arrives over the delivery transfer car, the cam 625 on said hoist-car actuates the limit-switch LS-31 on said transfer car, opening the contacts 715 of said switch and deenergizing the relay HCP-1.

Contacts 941 of said relay HCP-1 thus open, deenergizing the motor 414 and brake relay HCB-2. Said motor thus stops and the brakes are reapplied to the hoist car.

Contacts 943 of relay HCP-1 are closed when said relay is deenergized, establishing an "engage" circuit to the hoist-car aligning motor 435, as follows: from the positive line through said contacts 943, wire 114, sequence-switch contacts D-5, wire 84, contacts 751 of switch LS-105, wire 750, the "engage" terminal of motor 435, and thence through said motor and wire 753 to the negative line. Said motor thereupon moves the hoist-car plungers upwardly toward the aligning sockets on the delivery transfer car. As said plungers start upwardly, the cam 624 on plunger 429 releases the switch LS-106, whereupon the contacts 755 of said switch are closed and the brake relay HCB-3 is energized, with consequent release of the hoist-car brakes prior to engagement of said plungers with said aligning sockets. The hoist-car is thus freed for movement to such extent as may be necessary to permit full engagement of said sockets by said plungers.

When said hoist-car plungers engage fully the aligning sockets on the delivery transfer car, the cam 623 on plunger 428 actuates limit switch LS-105, opening the contacts 751 of said switch and thus de-energizing both the motor 435 and brake relay HCB-3. Said motor thus stops and the brakes are reapplied to the hoist car. The aforesaid actuation of switch LS-105 also closes its contacts 765, establishing "disengage" circuits through the aligning motors 507 and 507' of the receiving and delivery transfer cars, as follows: from the positive line through contacts 943 of relay HCP-1, contacts 944 of relay TCP, wire 110, contacts 765 of switch LS-105, wire 131, sequence-switch contacts D-6, wire 945, wire 63C, and thence through motors 507 and 507' in parallel by way of the contacts 660 and 702 of the respective limit switches LS-104 and LS-102. Said motors now retract the plungers of the transfer cars from engagement with the aligning sockets of the respective stalls 34 and 64.

When the plungers of the receiving transfer car are fully retracted, the cam 621 on plunger 493 actuates limit switch LS-104, opening said contacts 660 and braking the circuit through the aligning motor 507. Likewise, when the plungers of the delivery transfer car are fully retracted, a cam on one of them actuates limit switch LS-102, opening contacts 702 and breaking the circuit through the aligning motor 507'.

The aforementioned operation of the switch LS-104 closes its contacts 633 and establishes a "reverse" circuit through the drive motor 455 of the receiving transfer car, as follows: from the positive line through contacts 943 of relay HCP-1, contacts 944 of relay TCP, wire 947, contacts 948 of relay TCR, sequence-switch contacts D-8, wire 118, the "reverse" terminal of motor 455, and thence through said motor and contacts 633 of switch LS-104 to the negative line. Concurrently, the brake-relay RTCB-2 is energized, releasing the brakes of the receiving transfer car.

Similarly, the aforementioned operation of switch LS-102 by the full retraction of the aligning plungers of the delivery transfer car closes the contacts 681 of said switch and establishes a "reverse" circuit through the drive motor 455' of said delivery transfer car as follows: from the positive line through contacts 943 of relay HCP-1, contacts 944 of relay TCP, wire 947, contacts 946 of relay TCD, sequence-switch contacts D-7, wire 117, the "reverse" terminal of the delivery transfer car drive motor 455', and thence through said motor and the contacts 681 of switch LS-102 to the negative line. Concurrently, the brake-relay DTCB-2 is energized, releasing the brakes of the delivery transfer car.

The receiving and delivery transfer cars are thus driven by their motors 507 and 507' toward the respective receiving and delivery stations. In the movement of said cars away from the stalls 64 and 34, respectively, their cams release the switches LS-15 and LS-5 of said stalls. Upon the arrival of said cars at the receiving and delivery stations, the aforementioned cams actuate the respective switches LS-11 and LS-1, opening the contacts A of said switches and de-energizing the respective relays TCR and TCD. The motors 455 and 455' are thus de-energized, together with the brake relays RTCB-2 and DTCB-2. The drive motors of both transfer cars are thus stopped and the brakes are applied.

In said operation of the switches LS-11 and LS-1 their contacts B are closed, with consequent energization of the relay TCP. Contacts 944 of said relay now open and contacts 950 close. "Engage" circuits are thereby established through the aligning motors 507 and 507' of the transfer cars, as follows: from the positive line through contacts 943 of relay HCP-1, contacts 950 of relay TCP, wire 949, sequence-switch contacts D-9, wire 952, wire 71C, and thence through motors 507 and 507' in parallel by way of the contacts 650 and 693 of the respective limit-switches LS-103 and LS-101. Said motors now project the transfer car plungers outwardly for engagement with the aligning sockets at the respective receiving and delivery stations.

As the plungers of the receiving transfer car move outwardly, the cam 621 on plunger 493 releases the switch LS-104, so that the contacts 656 of said switch are closed and the brake-relay RTCB-3, in parallel with motor 507, is energized prior to engagement of the plungers with the aligning sockets. Thus the brakes of the receiving transfer car are released and the car freed for movement to such extent as may be necessary for full engagement of the plungers with the sockets at the receiving station.

Likewise, as the plungers of the delivery transfer car move outwardly the switch LS-102 is released, so that the contacts 698 of said switch are closed and the brake relay DTCB-3, in parallel with motor 507', is energized prior to engagement of the plungers with the aligning sockets. Thus the brakes of the delivery transfer car are released and the car freed for movement to such extent as may be necessary for full engagement of the plungers with the sockets at the delivery station.

Upon full engagement of the sockets at the receiving station by plungers of the receiving transfer car, the cam 620 on plunger 490 actuates switch LS-103, opening its contacts 650, and de-energizing both the motor 507 and brake-relay RTCB-3. Said motor thus stops and the brakes of said car are reapplied.

Similarly, upon full engagement of the sockets at the delivery station by plungers of the delivery transfer car, the switch LS-101, is acuated by a cam on one of said plungers, opening the contacts 693 of said switch and deenergizing both the motor 507' and the brake-relay DTCB-3. Said motor thus stops and the brakes of said delivery transfer car are reapplied.

In the aforementioned operation of said switches LS-103 and LS-101 to open their contacts 650 and 693, their contacts 667 and 708 are closed. A circuit is thereby established through relay HLB-2, as follows: from the positive line through contacts 943 of relay HCP-1, contacts 950 of relay TCP, wire 949, wire 939, wire 88, contacts 763 of switch LS-105, wire 793, contacts 788 of switch LS-108, wire 86, contacts 667 of switch LS-103, wire 119, contacts 708 of switch LS-101, wire 130, wire 953, sequence-switch contacts D-10, wire 954, wire 89, contacts 802 of switch LS-110, and relay HLB-2 to the negative line. Said relay HLB-2 is thus energized and closes its contacts 807 and 809.

The closing of said contacts 807 establishes a circuit through the hoist-lift brake mechanism 365 (or 365 and 366) associated with the hoist-drum shaft 354, releasing the brakes of said mechanism. Closing of the contacts 809 energizes the solenoid 393, retracting the pawl 390 from engagement with ratchet-wheel 391 on said drum shaft 354.

In moving out of engagement with said ratchet-wheel 391, the pawl 390 actuates the limit-switch LS-111, completing a "down" circuit through the hoist-car motor 361 (or 361 and 363) as follows: from the positive line through the previously mentioned relay contacts 943 and 950, limit-switch contacts 763, 788, 667, 708, sequence-switch contacts D-10, and limit-switch contacts 802, the contacts 800 of limit-switch LS-111, to the "down" terminal of motor 361 (or motors 361 and 363), and thence through said motor or motors to the negative line.

The hoisting-frame 270 is now lowered, depositing the dolly, and automobile thereon, on the delivery station platform. The cam 389 operated by said shaft 354 now actuates the switch LS-110, opening its contacts 802 and deenergizing both the relay HLB-2 and the hoist motor 361 (or 361 and 363). The solenoid 393, being now deenergized, releases the pawl 390, which thereupon returns into engagement with ratchet-wheel 391.

The aforementioned operation of switch LS-110 to open its contacts 802 also closed its contacts 810, establishing a "disengage" circuit through the hoist-car coupler motor 383, as follows: from the positive line through contacts 943 of relay HCP-1, contacts 950 of relay TCP, contacts 810 of switch LS-110, wire 132, sequence-switch contacts D-11, wire 93, contacts 778 of switch LS-108, the "disengaged" terminal of motor 383, and thence through said motor to the negative line.

Said coupler motor 383 now rotates the coupler tubes 282 of the hoisting-frame to disengage their lugs 298 from beneath the ledges of the dolly sockets, bringing said lugs into alignment with the socket passages 266. When this is done, the cam 387, driven through the shaft 382' by motor 383, actuates the limit-switch LS-108, opening its contacts 778, and deenergizing said motor. In said actuation of the switch LS-108, the contacts 786 of said switch are closed, establishing an "up" circuit through the hoist-lift motor 361 (or motors 361 and 363) as follows: from the positive line through contacts 943 of relay HCP-1, contacts 950 of relay TCP, wire 88, contacts 786 of switch LS-108, wire 95, sequence-switch contacts D-12, wire 96, contacts 796 of switch LS-109, wire 97, the "up" terminal of motor 361 (or motors 361 and 363), and thence through said motor or motors to the negative line. At the same time the brake relay HLB-1 is energized, establishing a circuit through the hoist-lift brake mechanism 365 (or 365 and 366), releasing the brakes associated with the hoist-drum shaft 354.

The shaft 354 is thus now operated, raising the hoisting-frame 270 and leaving the dolly, and automobile thereon, on the platform of the delivery station. It may be noted that, in the above-mentioned operation of switch LS-108 by cam 387, its contacts 788 are opened, thus maintaining broken the "down" circuit through motor 361 (or 361 and 363). When the hoisting-frame is raised sufficiently for the ends 300 of its tubes 282 to engage fully the sockets 301 on the hoist car, the cam 389 driven by the shaft 354 actuates the limit-switch LS-109, opening the contacts 796 of said switch and deenergizing the motor 361 (or motors 361 and 363) as well as the brake-relay HLB-1.

The dolly and automobile which were parked in stall 54 have thus now been deposited at the delivery station, and the empty hoisting frame has been raised into engagement with the sockets 301 on the hoist-car.

While, for convenience in the tracing of various circuits, reference has been made in the foregoing description to positive and negative supply lines, it will, of course, be understood that the current supplied to said lines may be either direct or alternating.

Also where circuits have been shown directly to motors or solenoids, it is further understood that said circuits may control relays or magnetic contactors which will in turn complete or interrupt the power to said motors or solenoids.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. An automobile parking system comprising a plurality of parking stalls on the same level, dollies for receiving automobiles, a hoist car movable over said stalls, a hoisting frame adapted to be lowered from said hoist car to surround an automobile on said dolly and to engage portions of said dolly, means for locking said hoisting frame to said dolly portions, means for lowering said frame into engagement with said dolly and for raising said frame and dolly above the tops of parked automobiles, means for propelling said hoist car to carry said frame and automobile over the tops of parked automobiles to a position for delivery to a desired space on said level, guide means on said hoist car engaged by said frame when in raised position for preventing movement of said frame both longitudinally and transversely with respect to said car and means adjacent said stalls for cooperating with said frame for guiding the latter during its vertical movements when said frame is out of engagement with said guide means on said hoist car.

2. An automobile parking system comprising a plurality of parking stalls on the same level, dollies for receiving automobiles, a hoist car movable over said stalls, a hoisting frame adapted to be lowered from said hoist car to surround an automobile on said dolly and to engage portions of said dolly, means for locking said hoisting frame to said dolly portions, means on said hoist car for lowering said frame into engagement with said dolly and for raising said frame and dolly above the tops of parked automobiles, means for propelling said hoist car to carry said frame and automobile over the tops of parked automobiles to a position for delivery to a desired space on said level, sockets on said hoist car engaged by portions of said frame when in raised position for preventing movement of said frame both longitudinally and transversely with respect to said car, and means extending upwardly adjacent said stalls for cooperating with portions of said frame to guide the latter during its vertical movements when said frame is out of engagement with said hoist car sockets, said guide means adjacent said stalls extending upwardly sufficiently to be engaged by said frame during its downward movement before said frame is disengaged from said hoist car sockets.

3. An automobile parking system comprising a plurality of parking stalls, dollies for receiving automobiles, a hoist car movable over said stalls, a frame adapted to be lowered from said hoist car to surround an automobile on said dolly and to engage portions of said dolly, cables connected to said frame, drum means on said hoist car receiving said cables, means for operating said drum means to raise or lower said frame, means carried by said frame and movable with respect thereto for locking said frame to said dolly portions following engagement of said frame with said dolly portions, and means on said hoist car for operating said locking means to and from locking position while said frame is in engagement with said dolly portion.

4. An automobile parking system comprising a plurality of parking stalls, dollies for receiving automobiles, a hoist car movable over said stalls, a frame adapted to be lowered from said hoist car to surround an automobile on said dolly and to engage portions of said dolly, cables connected to said frame, drum means on said hoist car receiving said cables, means for operating said drum means to raise or lower said frame, means carried by said frame and movable with respect thereto for locking said frame to said dolly portions, cables extending from said locking means to said hoist car, and means on said hoist car cooperating with said cables for operating said locking means.

5. An automobile parking system comprising a plurality of parking stalls, dollies for receiving automobiles, a hoist car movable over said stalls, a frame adapted to be lowered from said hoist car to surround an automobile on said dolly and to engage portions of said dolly, cables connected to said frame, drum means on said hoist car receiving said cables, means for operating said drum means to raise or lower said frame, means carried by said frame and movable with respect thereto for locking said frame to said dolly portions, cables extending from said locking means to said drum means for operation concurrently with the first mentioned cables, and means on said hoist car for additionally actuating the second mentioned cables to operate said locking means.

6. An automobile parking system comprising a plurality of parking stalls, dollies for receiving automobiles, a hoist car movable over said stalls, a frame adapted to be lowered from said hoist car to surround an automobile on said dolly and to engage portions of said dolly, cables connected to said frame, drum means on said hoist car receiving said cables, means for operating said drum means to raise or lower said frame, means carried by said frame and movable with respect thereto for locking said frame to said dolly portions, cables extending from said locking means to said drum means for operation concurrently with the first mentioned cables, guiding means on said hoist car for the second mentioned cables, said guiding means including floatably mounted sheaves, and means on said hoist car for bodily moving said sheaves to effect operation of said cables to actuate said locking means.

7. An automobile parking system comprising a plurality of parking stalls on the same level, dollies for receiving automobiles, a hoist car, tracks above said stalls on which said hoist car is movable, a frame mounted on said hoist car and adapted to be lowered over an automobile on said dolly, means on said frame engaging portions of said dolly for locking said frame to said dolly, means in each stall for engaging a dolly to prevent movement thereof out of a predetermined relation to the stall, means on said hoist car engaging said frame for maintaining said frame in a predetermined relation to said car when said frame is raised a certain distance above a stall, means extending upwardly adjacent a stall for cooperating with said frame during its vertical movements when said frame is disengaged from the hoist car engaging means for maintaining said frame in a predetermined alignment with a dolly in said stall, and means on said hoist car for raising and lowering said frame.

8. An automobile parking system comprising a plurality of parking stalls on the same level, dollies for receiving automobiles, a hoist car, tracks above said stalls on which said hoist car is movable, a frame mounted on said hoist car and adapted to be lowered over an automobile on said dolly, means on said frame engaging portions of said dolly for locking said frame to said dolly, means in each stall for engaging a dolly to prevent movement thereof out of a predetermined relation to the stall, means on said hoist car engaging said frame for maintaining said frame in a predetermined relation to said car when said frame is raised a certain distance above a stall, means adjacent a stall engageable with said hoist car for maintaining the latter in a predetermined position with respect to said stall, means extending upwardly adjacent said stall for cooperating with said frame during its vertical movements out of engagement with the hoist car for maintaining said frame in a predetermined alignment with a dolly in said stall, and means on said hoist car for raising and lowering said frame.

9. An automobile parking system comprising a plurality of aisles each containing a plurality of parking stalls, a plurality of automobile-carrying dollies, a station at an end of one of said aisles for receiving a dolly and automobile, a transfer car movable over said aisle to a position over said receiving station, a hoist car carried by said transfer car, a frame carried by said hoist car, means on said hoist car for lowering said frame into engagement with a dolly at said receiving station and for thereafter raising said frame to elevate said dolly and the automobile thereon to a position above the tops of parked automobiles, means on said transfer car for propelling the latter over said aisle to bring the hoist car and dolly into line with a selected vacant stall, the stalls in an aisle adjoining said transfer car aisle having rails above the same transverse to the path of travel of said transfer car and adapted to receive said hoist car, a second transfer car, said second transfer car being movable over another of said aisles, an automobile delivery station at an end of the last mentioned aisle, said second transfer car having transverse rails for receiving said hoist car, and means for propelling said second transfer car to position said hoist car above said delivery station.

10. An automobile parking system comprising a plurality of aisles each containing a plurality of parking stalls, dollies for receiving automobiles, rails extending above one of said aisles, a transfer car movable along said rails, rails above the stalls in others of said aisles, the second mentioned rails extending transversely with respect to the first mentioned rails, rails carried by the said transfer car and extending transversely of the first mentioned rails, a hoist car on said rails carried by the transfer car and movable therefrom on to the rails of a stall in an adjacent aisle, means for propelling said transfer car along the first mentioned rails to bring said transfer car to a position wherein its rails are aligned with those of any desired stall in an adjacent aisle, interengageable means between said transfer car and said stall for locking said transfer car in said position, interengageable means between said transfer car and said hoist car and operable to and from a position for locking said hoist car to said transfer car, means adjacent stalls in said other aisles for maintaining said hoist car in predetermined positions with respect to said stalls, and means carried by said hoist car for engagement with a dolly to raise and lower the latter and an automobile thereon.

11. An automobile parking system comprising a plurality of aisles each containing a plurality of parking stalls, dollies for receiving automobiles, rails extending above one of said aisles, a transfer car movable along said rails, rails above the stalls in others of said aisles, the second mentioned rails extending transversely with respect to the first mentioned rails, rails carried by the said transfer car and extending transversely of the first mentioned rails, a hoist car on said rails carried by the transfer car and movable therefrom on to the rails of a stall in an adjacent aisle, means for propelling said transfer car along the first mentioned rails to bring said transfer car to a position wherein its rails are aligned with those of any desired stall in an adjacent aisle, retractible means for locking said transfer car in said position, means operable to and from a position for locking said hoist car to said transfer car, a hoist frame carried by said hoist car and movable vertically with respect thereto to raise a dolly and an automobile thereon, and to lower them into a desired stall, and means adjacent the stalls for guiding said hoist frame in its vertical movements with respect to said hoist car.

12. An automobile parking system comprising a plurality of parking stalls, a receiving station, a delivery station, a transfer car movable to and from said receiving station over a row of said stalls, another transfer car movable to and from said delivery station over another row of said stalls, a hoist car movable over rows of stalls transverse to the first mentioned rows and also movable on to either of said transfer cars, a hoist frame carried by said hoist car and movable vertically with respect thereto for raising an automobile at said receiving station or in any of said stalls to an elevation above the tops of parked automobiles, and electrical means for controlling movements of said transfer and hoist cars to transport a raised automobile from said receiving station to a selected stall or from a selected stall to said delivery station and for controlling said hoist frame to deposit said automobile in a selected stall or at said delivery station.

13. An automobile parking system comprising a plurality of parking stalls, a receiving station, a delivery station, a transfer car movable to and from said receiving station over a row of said stalls, another transfer car movable to and from said delivery station over another row of said stalls, a hoist car movable over rows of stalls transverse to the first mentioned rows and also movable on to either of said transfer cars, a hoist frame carried by said hoist car and movable vertically with respect thereto for raising or lowering an automobile, and electrical control means for causing said hoist car to travel from said delivery station with one of said transfer cars to a given stall, then to travel from said stall to the other transfer car, and then to travel with said other transfer car to said receiving station, and further electrical means responsive to arrival of said hoist car at said receiving station for causing said hoist frame to travel downwardly to receive an automobile at said station and then to raise said automobile above the tops of automobiles in any of said stalls.

14. An automobile parking system comprising a plurality of parking stalls, a receiving station, a transfer car movable to and from said receiving station over a row of said stalls, a hoist car movable with said transfer car over stalls in said row and also movable over rows of said stalls transverse to the first mentioned row, a hoist frame carried by said hoist car and movable vertically with respect thereto for raising an automobile at said receiving station to an elevation above the tops of parked automobiles, means for propelling said transfer and hoist cars over stalls in the first mentioned row to said receiving station, guide means at said receiving station, means on said transfer car cooperating with said guide means for aligning said car with respect thereto, switch means at said receiving station operable by said transfer car upon arrival at said station, means responsive to said switch means for effecting engagement between said guide means and the cooperating aligning means on said transfer car, switch means responsive to said engagement, and means controlled by said switch means for lowering said hoist frame to receive an automobile at said station.

15. An automobile parking system comprising a plurality of parking stalls, a receiving station, a transfer car movable to and from said receiving station over a row of said stalls, a hoist car movable with said transfer car over stalls in said row and also movable over rows of said stalls transverse to the first mentioned row, a hoist frame carried by said hoist car and movable vertically with respect thereto for raising an automobile at said receiving station to an elevation above the tops of parked automobiles, means for propelling said transfer and hoist cars over stalls in the first mentioned row to said receiving station, guide means at said receiving station, means on said transfer car cooperating with said guide means for aligning said car with respect thereto, switch means at said receiving station operable by said transfer car upon arrival at said station, means responsive to said switch means for effecting engagement between said guide means and the cooperating aligning means on said transfer car, switch means responsive to said engagement, means controlled by said switch means for lowering said hoist frame to receive an automobile at said station, means responsive to lowering of said frame for locking the latter to said automobile, and means responsive to said locking means for raising said frame and automobile to bring the later above the tops of automobiles parked in any of said stalls.

16. An automobile parking system comprising a plurality of parking stalls, a receiving station, a transfer car movable to and from said receiving station over a row of said stalls, a hoist car movable with said transfer car over stalls in said row and also movable over rows of said stalls transverse to the first mentioned row, a hoist frame carried by said hoist car and movable vertically with respect thereto for raising an automobile at said receiving station to an elevation above the tops of parked automobiles, means for propelling said transfer and hoist cars from said receiving station over stalls in the first mentioned row, guide means at the stalls in said first mentioned row, means on said transfer car cooperating with said guide means for aligning said transfer car with respect to any of said stalls, guide means on said transfer car and cooperating means on said hoist car for aligning said hoist car with respect to said transfer car, guide means at stalls outside said first mentioned row for cooperating with said means on said hoist car for aligning the latter with respect to any of the last mentioned stalls, means responsive to the arrival of said transfer car at a given stall in the first-mentioned row for effecting engagement between said stall guide means and the cooperating aligning means on said transfer car, switch means responsive to said engagement for effecting disengagement of said hoist car aligning means from the guide means on said transfer car, means responsive to said disengagement for causing said hoist car to be propelled from said transfer car, and means responsive to the arrival of said hoist car at a given stall for terminating the operation of said propelling means and for effecting engagement between the aligning means of said hoist car and the guide means of said stall.

17. An automobile parking system comprising a plurality of parking stalls, a receiving station, a transfer car movable to and from said receiving station over a row of said stalls, a hoist car movable with said transfer car over stalls in said row and also movable over rows of said stalls transverse to the first mentioned row, a hoist frame carried by said hoist car and movable vertically with respect thereto for raising an automobile at said receiving station to an elevation above the tops of parked automobiles, means for propelling said transfer and hoist cars from said receiving station over stalls in the first mentioned row, guide means at the stalls in said first mentioned row, means on said transfer car cooperating with said guide means for aligning said transfer car with respect to any of said stalls, guide means on said transfer car and cooperating means on said hoist car for aligning said hoist car with respect to said transfer car, guide means at stalls outside said first mentioned row for cooperating with said means on said hoist car for aligning the latter with respect to any of the last mentioned stalls, means responsive to the arrival of said transfer car at a given stall in the first-mentioned row for effecting engagement between said stall guide means and the cooperating aligning means on said transfer car, switch means responsive to said engagement for effecting disengagement of said hoist car aligning means from the guide means on said transfer car, means responsive to said disengagement for propelling said hoist car from said transfer car, means responsive to the arrival of said hoist car at a given stall for terminating the operation of said propelling means and for effecting engagement between the aligning means of said hoist car and the guide means of said stall, and means responsive to the engagement of said hoist car aligning means and said stall guide means for lowering said hoist frame to deposit the automobile in said stall.

18. An automobile parking system comprising a plurality of rows of parking stalls, a receiving station, a hoist car movable over said stalls and said receiving station, a hoist frame carried by said hoist car and movable vertically with respect thereto for raising an automobile at said receiving station above the tops of parked automobiles, means for aligning said hoist car with respect to said receiving station and stalls, means for selecting a stall for receiving an automobile from said station, means controlled by said selecting means for propelling said hoist car, hoist frame, and automobile to said stall, means responsive to the arrival of said hoist car over said stall for stopping said propelling means and operating said aligning means to secure said hoist car over said stall in aligned relation with respect thereto, and means responsive to operation of said aligning means for lowering said hoist frame to deposit said automobile in said stall.

19. An automobile parking system comprising a plurality of rows of parking stalls, a receiving station, a hoist car movable over said stalls and said receiving station, a hoist frame carried by said hoist car and movable vertically with respect thereto for raising an automobile at said receiving station above the tops of parked automobiles, means for aligning said hoist car with respect to said receiving station and stalls, means for selecting a stall for receiving an automobile from said station, means controlled by said selecting means for propelling said hoist car, hoist frame, and automobile to said stall, means responsive to the arrival of said hoist car over said stall for stopping said propelling means and operating said aligning means to secure said hoist car over said stall in aligned relation with respect thereto, means responsive to operation of said aligning means for lowering said hoist frame to deposit said automobile in said stall, and means responsive to lowering of said hoist frame for releasing the same from said automobile.

20. An automobile parking system comprising a plurality of rows of parking stalls, a receiving station, a hoist car movable over said stalls and said receiving station, a hoist frame carried by said hoist car and movable vertically with respect thereto for raising an automobile at said receiving station above the tops of parked automobiles, means for aligning said hoist car with respect to said receiving station and stalls, means for selecting a stall for receiving an automobile from said station, means controlled by said selecting means for propelling said hoist car, hoist-frame, and automobile to said stall, means responsive to the arrival of said hoist car over said stall for stopping said propelling means and operating said aligning means to secure said hoist car over said stall in aligned relation with respect thereto, means responsive to operation of said aligning means for lowering said hoist frame to deposit said automobile in said stall, means responsive to lowering of said hoist-frame for releasing the same from said automobile, and means responsive to said releasing of said hoist-frame for causing the latter to be restored to raised position on said hoist-car.

21. An automobile parking system comprising a plurality of rows of parking stalls, a delivery station, a hoist-car movable over said stalls and said delivery station, a hoist-frame carried by said hoist-car and movable vertically with respect thereto for raising an automobile in any of said stalls above the tops of parked automobiles, means for aligning said hoist car with respect to said delivery station and stalls, means for selecting an automobile in one of said stalls for delivery to said station, means controlled by said selecting means for propelling said hoist-car and hoist-frame to said stall, means responsive to the arrival of said hoist-car over said stall for stopping said propelling means and operating said aligning means to secure said hoist-car over said stall in aligned relation with respect thereto, and means responsive to operation of said aligning means for lowering of said hoist-frame into said stall to retrieve said automobile.

22. An automobile parking system comprising a plurality of rows of parking stalls, a delivery station, a hoist-car movable over said stalls and said delivery station, a hoist-frame carried by said hoist-car and movable vertically with respect thereto for raising an automobile in any of said stalls above the tops of parked automobiles, means for aligning said hoist-car with respect to said delivery station and stalls, means for selecting an automobile in one of said stalls for delivery to said station, means controlled by said selecting means for propelling said hoist-car and hoist-frame to said stall, means responsive to the arrival of said hoist-car over said stall for stopping said propelling means and operating said aligning means to secure said hoist-car over said stall in aligned relation with respect thereto, means responsive to operation of said aligning means for lowering said hoist-frame into said stall, and means responsive to said lowering of said frame for establishing a connection between said frame and said automobile.

23. An automobile parking system comprising a plurality of rows of parking stalls, a delivery station, a hoist-car movable over said stalls and said delivery station, a hoist-frame carried by said hoist-car and movable vertically with respect thereto for raising an automobile in any of said stalls above the tops of parked automobiles, means for aligning said hoist-car with respect to said delivery station and stalls, means for selecting an automobile in one of said stalls for delivery to said station, means controlled by said selecting means for propelling said hoist-car and hoist-frame to said stall, means responsive to the arrival of said hoist-car over said stall for stopping said propelling means and operating said aligning means to secure said hoist-car over said stall in aligned relation with respect thereto, means responsive to operation of said aligning means for lowering said hoist-frame into said stall, means responsive to said lowering of said frame for establishing a connection between said frame and said automobile, and means responsive to operation of said connection-establishing means for causing said frame to be raised to bring said automobile to a position over the tops of parked automobiles.

24. An automobile parking system comprising a plurality of rows of parking stalls, a delivery station, a hoist-car movable over said stalls and said delivery station, a hoist-frame carried by said hoist-car and movable vertically with respect thereto for raising an automobile in any of said stalls above the tops of parked automobiles, means for aligning said hoist-car with respect to said delivery station and stalls, means for selecting an automobile in one of said stalls for delivery to said station, means controlled by said selecting means for propelling said hoist-car and hoist-frame to said stall, means responsive to the arrival of said hoist-car over said stall for stopping said propelling means and operating said aligning means to secure said hoist-car over said stall in aligned relation with respect thereto, means responsive to operation of said aligning means for lowering said hoist-frame into said stall, means responsive to said lowering of said frame for establishing a connection between said frame and said automobile, means responsive to operation of said connection-establishing means for causing said frame to be raised to bring said automobile to a position over parked automobiles, and means for causing disengagement of said aligning means.

25. An automobile parking system comprising a plurality of rows of parking stalls, a delivery station, a hoist-car movable over said stalls and said delivery station, a hoist-frame carried by said hoist-car and movable vertically with respect thereto for raising an automobile in any of said stalls above the tops of parked automobiles, means for aligning said hoist-car with respect to said delivery station and stalls, means for selecting an automobile in one of said stalls for delivery to said station, means controlled by said selecting means for propelling said hoist-car and hoist-frame to said stall, means responsive to the arrival of said hoist-car over said stall for stopping said propelling means and operating said aligning means to secure said hoist-car over said stall in aligned relation with respect thereto, means responsive to operation of said aligning means for lowering said hoist-frame into said stall, means responsive to said lowering of said frame for establishing a connection between said frame and said automobile, means responsive to operation of said connection-establishing means for causing said frame to be raised to bring said automobile to a position over parked automobiles, means for causing disengagement of said aligning means, and means responsive to said disengagement to cause said propelling means to bring said hoist-car, hoist-frame and automobile to a position over said delivery station.

26. An automobile parking system comprising a plurality of rows of parking stalls, a delivery station, a hoist-car movable over said stalls and said delivery station, a hoist-frame carried by said hoist-car and movable vertically with respect thereto for raising an automobile in any of said stalls above the tops of parked automobiles, means for aligning said hoist-car with respect to said delivery station and stalls, means for selecting an automobile in one of said stalls for delivery to said station, means controlled by said selecting means for propelling said hoist-car and hoist-frame to said stall, means responsive to the arrival of said hoist-car over said stall for stopping said propelling means and operating said aligning means to secure said hoist-car over said stall in aligned relation with respect thereto, means responsive to operation of said aligning means for lowering said hoist-frame into said stall, means responsive to said lowering of said frame for establishing a connection between said frame and said automobile, means responsive to operation of said connection-establishing means for causing said frame to be raised to bring said automobile to a position over parked automobiles, means for causing disengagement of said aligning means, means responsive to said disengagement for causing said propelling means to bring said hoist-car, hoist-frame and automobile to a position over said delivery station, and means at said station for causing said hoist-frame to be lowered to deposit said automobile at said station.

27. An automobile parking system comprising a plurality of rows of parking stalls, a delivery station, a hoist-car movable over said stalls and said delivery station, a hoist-frame carried by said hoist-car and movable vertically with respect thereto for raising an automobile in any of said stalls above the tops of parked automobiles, means for aligning said hoist-car with respect to said delivery station and stalls, means for selecting an automobile in one of said stalls for delivery to said station, means controlled by said selecting means for propelling said hoist-car and hoist-frame to said stall, means responsive to the arrival of said hoist-car over said stall for stopping said propelling means and operating said aligning means to secure said hoist-car over said stall in aligned relation with respect thereto, means responsive to operation of said aligning means for lowering said hoist-frame into said stall, means for operating said frame to raise said automobile to a position over parked automobiles, means for causing disengagement of said aligning means, means responsive to said disengagement for causing said propelling means to bring said hoist-car, hoist-frame and automobile to a position over said delivery station, means at said station for causing said hoist-frame to be lowered to deposit said automobile at said station, and means responsive to said lowering of said frame for causing the latter to be detached from said automobile.

28. An automobile parking system comprising a plurality of rows of parking stalls, a delivery station, a hoist-car movable over said stalls and said delivery station, a hoist-frame carried by said hoist-car and movable vertically with respect thereto for raising an automobile in any of said stalls above the tops of parked automobiles, means for aligning said hoist-car with respect to said delivery station and stalls, means for selecting an automobile in one of said stalls for delivery to said station, means controlled by said selecting means for propelling said hoist-car and hoist-frame to said stall, means responsive to the arrival of said hoist-car over said stall for stopping said propelling means and operating said aligning means to secure said hoist-car over said stall in aligned relation with respect thereto, means responsive to operation of said aligning means for lowering said hoist-frame into said stall, means for operating said frame to raise said automobile to a position over parked automobiles, means for causing disengagement of said aligning means, means responsive to said disengagement for causing said propelling means to bring said hoist-car, hoist-frame and automobile to a position over said delivery station, means at said station for causing said hoist-frame to be lowered to deposit said automobile at said station, and means responsive to said lowering of said frame for causing the latter to be detached from said automobile and restored to raised position on said hoist-car.

WILLIAM ZECKENDORF.
ALEXANDER H. McPHEE.

References Cited in the file of this patent

UNITED STATES PATENTS

| Number | Name | Date |
|---|---|---|
| 684,965 | Weimar | Oct. 22, 1901 |
| 1,071,549 | Coffin | Aug. 26, 1913 |
| 1,473,894 | Weatherby | Nov. 13, 1923 |
| 1,528,955 | Smith | Mar. 10, 1925 |
| 1,591,278 | Brush | July 6, 1926 |
| 1,828,308 | Been | Oct. 20, 1931 |
| 1,851,539 | Fitch et al. | Mar. 29, 1932 |
| 1,864,711 | Buettel | June 28, 1932 |
| 1,874,859 | Been | Aug. 30, 1932 |
| 1,903,274 | Watson | Mar. 28, 1933 |
| 1,940,242 | Burgess | Dec. 19, 1933 |
| 1,971,339 | Fitch | Aug. 28, 1934 |
| 2,014,351 | Becker | Sept. 10, 1935 |
| 2,139,182 | Bledsoe | Dec. 6, 1938 |
| 2,349,339 | Thompson | May 23, 1944 |
| 2,363,797 | Lovfald | Nov. 28, 1944 |
| 2,457,135 | Deiters | Dec. 28, 1948 |

FOREIGN PATENTS

| Number | Country | Date |
|---|---|---|
| 530,933 | Germany | Aug. 3, 1931 |
| 382,476 | Great Britain | Oct. 27, 1932 |